United States Patent
Agarwal et al.

(10) Patent No.: US 10,327,185 B2
(45) Date of Patent: Jun. 18, 2019

(54) IUGW ARCHITECTURE WITH RTP LOCALIZATION

(71) Applicant: Parallel Wireless, Inc., Nashua, NH (US)

(72) Inventors: Kaitki Agarwal, Westford, MA (US); Jitender Arora, Westford, MA (US); Rajesh Kumar Mishra, Westford, MA (US); Babu Rajagopal, Bangalore (IN); Praveen Kumar, Pune (IN); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/713,584

(22) Filed: Sep. 22, 2017

(65) Prior Publication Data

US 2018/0041934 A1 Feb. 8, 2018

Related U.S. Application Data

(63) Continuation-in-part of application No. 15/464,333, filed on Mar. 20, 2017.

(Continued)

(51) Int. Cl.
*H04W 36/32* (2009.01)
*H04W 36/14* (2009.01)
(Continued)

(52) U.S. Cl.
CPC ......... *H04W 36/14* (2013.01); *H04L 41/0893* (2013.01); *H04L 41/12* (2013.01);
(Continued)

(58) Field of Classification Search
CPC ... H04W 36/14; H04W 36/32; H04W 64/003; H04W 76/27; H04W 76/30;
(Continued)

(56) References Cited

U.S. PATENT DOCUMENTS 7,170,871 B2 1/2007 Eyuboglu et al.
8,787,331 B2 7/2014 Liu et al.
(Continued)

FOREIGN PATENT DOCUMENTS

EP 1560378 B1 11/2012
EP 2773151 A1 9/2014
(Continued)

OTHER PUBLICATIONS

Schulzrinne, H., Casner, S., Frederick, R., Jacobson, V., "RTP: A Transport Protocol for Real-Time Applications," Network Working Group, RFC 1889, Jan. 1996, retrieved from https://tools.ietf.org/pdf/rfc1889.pdf.

(Continued)

*Primary Examiner* — Lakeram Jangbahadur
(74) *Attorney, Agent, or Firm* — Michael Saji

(57) ABSTRACT

A method for localizing a voice call is disclosed, comprising: receiving an originating leg setup message for an originating leg bearer from the first base station for a first user equipment (UE); creating a first call correlation identifier and storing the first call correlation identifier in association with the first UE; extracting a second call correlation identifier from a terminating leg setup message for a terminating leg bearer received from the core network; determining a real time protocol (RTP) localization status for the originating leg bearer and the terminating leg bearer based on matching the second call correlation identifier of the terminating leg against the stored first call correlation identifier of the originating leg; and sending transport layer assignment messages to the first base station to redirect RTP packets from the first UE to the second UE via the terminating leg bearer without the RTP packets transiting the core network.

20 Claims, 31 Drawing Sheets

Related U.S. Application Data

(60) Provisional application No. 62/398,201, filed on Sep. 22, 2016, provisional application No. 62/310,173, filed on Mar. 18, 2016.

(51) Int. Cl.

| | |
|---|---|
| *H04W 36/00* | (2009.01) |
| *H04W 36/08* | (2009.01) |
| *H04W 64/00* | (2009.01) |
| *H04L 12/24* | (2006.01) |
| *H04W 76/30* | (2018.01) |
| *H04W 76/27* | (2018.01) |
| *H04L 29/06* | (2006.01) |
| *H04W 36/02* | (2009.01) |
| *H04W 88/08* | (2009.01) |
| *H04W 4/24* | (2018.01) |
| *H04W 88/02* | (2009.01) |
| *H04L 12/931* | (2013.01) |
| *H04W 24/04* | (2009.01) |
| *H04W 36/16* | (2009.01) |
| *H04W 88/06* | (2009.01) |
| *H04W 88/12* | (2009.01) |
| *H04W 88/16* | (2009.01) |

(52) U.S. Cl.
CPC ........ *H04L 65/1069* (2013.01); *H04L 65/608* (2013.01); *H04W 36/0016* (2013.01); *H04W 36/0066* (2013.01); *H04W 36/02* (2013.01); *H04W 36/08* (2013.01); *H04W 36/32* (2013.01); *H04W 64/003* (2013.01); *H04W 76/27* (2018.02); *H04W 76/30* (2018.02); *H04L 49/70* (2013.01); *H04W 4/24* (2013.01); *H04W 24/04* (2013.01); *H04W 36/0055* (2013.01); *H04W 36/165* (2013.01); *H04W 88/02* (2013.01); *H04W 88/06* (2013.01); *H04W 88/08* (2013.01); *H04W 88/12* (2013.01); *H04W 88/16* (2013.01)

(58) Field of Classification Search
CPC ......... H04W 36/0016; H04W 36/0066; H04W 36/08; H04W 88/16; H04W 88/12; H04W 88/06; H04W 36/165; H04W 36/0055; H04W 24/04; H04W 4/24; H04W 88/02; H04W 88/08; H04L 41/12; H04L 41/0893; H04L 49/70

See application file for complete search history.

(56) References Cited

U.S. PATENT DOCUMENTS

| | | | |
|---|---|---|---|
| 8,824,430 | B2 | 9/2014 | Ioannidis |
| 9,185,543 | B2 | 11/2015 | Liu et al. |
| 9,198,021 | B2 | 11/2015 | Tomici et al. |
| 9,591,031 | B2 | 3/2017 | Cartmell et al. |
| 2004/0082328 | A1 | 4/2004 | Japenga et al. |
| 2006/0276137 | A1* | 12/2006 | Pummill ............. H04L 63/0853 455/67.11 |
| 2006/0285493 | A1 | 12/2006 | Manuja et al. |
| 2007/0019619 | A1 | 1/2007 | Foster et al. |
| 2008/0002669 | A1 | 1/2008 | O'Brien et al. |
| 2008/0039086 | A1* | 2/2008 | Gallagher ................ H04W 8/04 455/435.1 |
| 2009/0213760 | A1 | 8/2009 | Shin et al. |
| 2010/0130205 | A1 | 5/2010 | Jung et al. |
| 2010/0329210 | A1 | 12/2010 | Shirota et al. |
| 2011/0044285 | A1 | 2/2011 | Jang et al. |
| 2012/0082073 | A1 | 4/2012 | Andreasen et al. |
| 2012/0120831 | A1 | 5/2012 | Gonsa et al. |
| 2012/0263096 | A1 | 10/2012 | Masini et al. |
| 2013/0003697 | A1 | 1/2013 | Adjakple et al. |
| 2013/0143563 | A1 | 6/2013 | Singh et al. |
| 2013/0294403 | A1 | 11/2013 | Srinivasan |
| 2013/0329567 | A1 | 12/2013 | Mathias et al. |
| 2014/0050208 | A1 | 2/2014 | Annaluru et al. |
| 2014/0064156 | A1 | 3/2014 | Paladugu et al. |
| 2014/0241316 | A1 | 8/2014 | Okmyanskiy et al. |
| 2014/0308959 | A1 | 10/2014 | De Benedittis et al. |
| 2015/0063295 | A1 | 3/2015 | Himayat et al. |
| 2015/0173111 | A1* | 6/2015 | Agarwal ................ H04W 8/04 370/329 |
| 2015/0359020 | A1 | 12/2015 | Reynaud et al. |
| 2016/0080431 | A1 | 3/2016 | Reddy et al. |
| 2016/0227449 | A1 | 8/2016 | Sivavakeesar et al. |
| 2016/0373987 | A1 | 12/2016 | Ahmad et al. |
| 2017/0055238 | A1 | 2/2017 | Grayson et al. |
| 2018/0007536 | A1 | 1/2018 | Xu et al. |

FOREIGN PATENT DOCUMENTS

| | | |
|---|---|---|
| WO | 2012120519 A1 | 9/2012 |
| WO | 2014207712 A1 | 12/2014 |
| WO | 2016083524 A1 | 6/2016 |
| WO | 2018104769 A1 | 6/2018 |

OTHER PUBLICATIONS

3rd Generation Partnership Project, 3GPP TS 25.304 V10.0.0 (Mar. 2011), "3rd Generation Partnership Project; Technical Specification Group Radio Access Network; User Equipment (UE) Procedures in Idle Mode and Procedures for Cell Reselection in Connected Mode (Release 10)," Mar. 2011, V10.0.0.

Loughney, J., Sidebottom, G., Coene, L, Verwimp, G., Keller, J., Bidulock, B., "Signaling Connection Control Part User Adaption Layer (SUA)," Network Working Group, RFC 3868, Oct. 2004, retrieved from https://tools.ietf.org/pdf/rfc3868.pdf.

3rd Generation Partnership Project, 3GPP TR 29.903 V6.0.0 (Dec. 2004), "3rd Generation Partnership Project; Technical Specification Group Core Networks; Feasibility Study on SS7 signaling transport in the core network with SCCP-User Adaption (SUA) layer (Release 6)," Dec. 2004, V6.0.0.

Alessandro Guerrieri, "WCDMA RAN IP Backhauling: TIM Network Architecture and Synchronization Aspects," TIM Network Architecture and Synchronization Aspects, ITSF 09—Time & Sync in Telecoms, Nov. 3-5, 2009.

Third Generation Partnership Project, "3rd Generation Partnership Project; Technical Specification Group Core Network and Terminals; Numbering, addressing and identification (Release 13)," 3GPP TS 23.003 V13.4.0 (Dec. 2015).

Third Generation Partnership Project, "3rd Generation Partnership Project; Technical Specification Group Radio Access Network; UTRAN overall description (Release 8)," 3GPP TS 25.401 V8.2.0 (Dec. 2008).

Third Generation Partnership Project, "3rd Generation Partnership Project; Technical Specification Group Radio Access Network; UTRAN Iu interface Radio Access Network Application Part (RANAP) signaling (Release 13)," 3GPP TS 25.413 V13.0.0 (Dec. 2015).

Third Generation Partnership Project, "3rd Generation Partnership Project; Technical Specification Group Radio Access Network; UTRAN architecture for 3G Home Node B (HNB); Stage 2 (Release 11)," 3GPP TS 25.467 V11.1.0 (Dec. 2012).

Third Generation Partnership Project, "3rd Generation Partnership Project; Technical Specification Group Radio Access Network; UTRAN architecture for 3G Home NodeB; Stage 2 (Release 8)," 3GPP TS 25.467 V8.1.0 (Mar. 2009).

Third Generation Partnership Project, "3rd Generation Partnership Project; Technical Specification Group Radio Access Network; UTRAN Iuh Interface RANAP User Adaption (RUA) signalling (Release 10)," 3GPP TS 25.468 V10.1.0 (Mar. 2011).

Third Generation Partnership Project, "3rd Generation Partnership Project; Technical Specification Group Radio Access Network; UTRAN Iuh interface Home Node B (HNB) Application Part (HNBAP) signalling (Release 13)," 3GPP TS 25.469 V13.0.1 (Jan. 2016).

(56) References Cited

OTHER PUBLICATIONS

Third Generation Partnership Project, "3rd Generation Partnership Project; Technical Specification Group Core Network and Terminals; General Packet Radio Service (GPRS); GPRS Tunnelling Protocol (GTP) across the Gn and Gp interface (Release 10)," 3GPP TS 29.060 V10.1.0 (Mar. 2011).

Third Generation Partnership Project, "3rd Generation Partnership Project; Technical Specification Group Core Network and Terminals; General Packet Radio System (GPRS) Tunnelling Protocol User Plane (GTPv1-U) (Release 9)," 3GPP TS 29.281 V9.2.0 (Mar. 2010).

European Telecommunications Standards Institute, Digital cellular telecommunications system (Phase 2+); Universal Mobile Telecommunications System (UMTS); Numbering, addressing and identification (3GPP TS 23.003 version 9.15.0 Release 9), ETSI TS 123 003 V9.15.0 (Oct. 2014).

J. Loughney, G. Sidebottom, L. Coene, G. Verwimp, J. Keller, B. Bidulock, "Signalling Connection Control Part User Adapation Layer (SUA)," Network Working Group, IETF RFC 3868, Oct. 2004.

Third Generation Partnership Project, "3rd Generation Partnership Project; Technical Specification Group Core Network; Feasibility Study on SS7 signalling transport in the core network with SCCP-User Adaption (SUA) layer (Release 6)," 3GPP TR 29.903 V6.0.0 (Dec. 2004).

Third Generation Partnership Project, "3rd Generation Partnership Project; Technical Specification Group Radio Access Network; User Equipment (UE) procedures in idle mode and procedures for cell reselection in connted mode (Release 13)," 3GPP TS 25.304 V13.0.0 (Dec. 2015).

H. Schulzrinne, S. Casner, R. Frederick, V. Jacobson, "RTP: A Transport Protocol for Real-Time Applications," Network Working Group, IETF RFC 1889 Jan. 1996.

\* cited by examiner

IUGW ARCHITECTURE WITH RTP LOCALIZATION

CROSS-REFERENCE TO RELATED APPLICATIONS

This application is a continuation-in-part of, and claims priority under 35 U.S.C. § 120 to, U.S. patent application Ser. No. 15/464,333, titled "IuGW Architecture" and filed on Mar. 20, 2017, itself a non-provisional conversion of U.S. Provisional Pat. App. No. 62/310,173, each hereby incorporated by reference in its entirety for all purposes; and is also a non-provisional conversion of, and claims priority under 35 U.S.C. § 119(e) to, U.S. Provisional Pat. App. No. 62/398,201, titled "RTP Localization for Multi-Core Networks," and filed on Sep. 22, 2016, also hereby incorporated by reference in its entirety for all purposes.

This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015, each in its entirety for all purposes. This document also hereby incorporates by reference U.S. Pat. Nos. 9,107,092, 8,867,418, and 923547 in their entirety. This document also hereby incorporates by reference U.S. patent application Ser. No. 14/822,839 in its entirety.

BACKGROUND

In the Third Generation (3G) Universal Mobile Telecommunications System (UMTS) system, when a voice call is established from one mobile subscriber to another mobile subscriber, even though both the mobile subscribers are camped on to the same base station or NodeB, the signaling and RTP messages flow between mobile subscribers and mobile operators' core networks via a base station and a radio network controller over a wired or wireless backhaul system. This causes inefficient use of backhaul bandwidth and blocking of various types of resources at radio network controllers and core networks.

SUMMARY

Systems and methods for a telecommunications network are disclosed.

In a first embodiment, a method may be disclosed, comprising: at a coordinating server situated as a gateway between a first base station and a core network, receiving an originating leg setup message for an originating leg bearer from the first base station for a first user equipment (UE) attached to the first base station, the first UE registered with the coordinating server, sent when the first UE initiates a voice call to a second UE, the second UE also registered with the coordinating server; creating a first call correlation identifier and storing the first call correlation identifier in association with the first UE; extracting a second call correlation identifier from a terminating leg setup message for a terminating leg bearer received from the core network; determining a real time protocol (RTP) localization status for the originating leg bearer and the terminating leg bearer based on matching the second call correlation identifier of the terminating leg against the stored first call correlation identifier of the originating leg; and sending transport layer assignment messages to the first base station to redirect RTP packets from the first UE to the second UE via the terminating leg bearer without the RTP packets transiting the core network, thereby localizing the RTP packets.

The method may further comprise encoding the first call correlation identifier into the originating leg setup message. The setup message may be a non-access stratum (NAS) setup message, the first base station may be a nodeB, the bearer modification message may be a Universal Mobile Telecommunications Service (UMTS) radio access bearer (RAB) modification message. The first call correlation identifier may be encoded in a User-User information element (IE) in the originating leg setup message, and the method may further comprise forwarding, by the core network, the originating leg setup message as the terminating leg setup message. The transport layer assignment messages to the first base station include an Internet Protocol (IP) address of a serving base station for the second UE, and the method may further comprise sending transport layer assignment messages to the serving base station for the second UE to redirect second RTP packets from the second UE to the first UE via the originating leg bearer without the second RTP packets transiting the core network.

The method may further comprise performing radio access bearer (RAB) modification based on the determination of the RTP localization status by sending RAB assignment requests to the base station for the first UE, and the transport layer assignment messages may be RAB modification messages. The second UE may be also attached to the first base station, and the method may further comprise performing radio access bearer (RAB) modification based on the determination of the RTP localization status by sending RAB assignment requests to the base station for the first UE and the second UE. The second UE may be also attached to the first base station and the RTP packets may be redirected internally within the first base station. The first base station and the second base station may be a single base station using a single radio access technology.

The method may further comprise redirecting the RTP packets as an RTP stream routed from the first base station to a second base station via a mesh network. The method may further comprise sending comfort noise RTP packets to the core network from the coordinating server based on the determination of the RTP localization status. The first call correlation identifier may be generated based on an equipment identifier of, or an Internet Protocol (IP) address of, a caller and a called party. The first call correlation identifier may be generated based on a radio area network (RAN) identifier of the base station. The method may further comprise receiving a Relocation Required message from the first base station for the first UE in a RTP localized call between the first UE and the second UE, caused by the first UE being handed over to a second base station.

The method may further comprise providing an inter-RAT handover of the first UE to one of a Wi-Fi radio access technology (RAT), a Long Term Evolution RAT using Voice over LTE (VoLTE), or a 2G RAT, and providing transcoding of the RTP packets to enable the inter-RAT handover. The method may further comprise: creating, at the coordinating server, an association between an International Mobile Subscriber Identity (IMSI) of the second UE and a Mobile Station International Subscriber Directory Number (MSISDN) of the second UE; creating the first call correlation identifier based on a called party MSISDN; receiving the terminating leg setup message from a core network, the terminating leg setup message containing an IMSI of the second UE; extracting the second call correlation identifier by retrieving the MSISDN of the second UE based on the association of the IMSI and MSISDN of the second UE at the coordinating server; and performing a comparison of the called party MSISDN and the MSISDN of the second UE at the coordinating server to determine a RTP localization status. The method may further comprise requesting an International Mobile Subscriber Identity (IMSI) of the first UE and a Mobile Station International Subscriber Directory Number (MSISDN) of the first UE from a provisioning server using a HyperText Transfer Protocol web services protocol. The method may further comprise providing billing and policy enforcement of the RTP packets without the RTP packets transiting the core network.

The method may further comprise providing lawful intercept of the RTP packets by copying the RTP packets and sending the copied RTP packets to the core network asynchronously. The method may further comprise providing lawful intercept of the RTP packets by sending compressed RTP packets to the core network.

In a second embodiment, a non-transitory computer-readable medium is disclosed, which, when executed on a processor, causes the processor to perform steps comprising: at a coordinating server situated as a gateway between a first base station and a core network, receiving an originating leg setup message for an originating leg bearer from the first base station for a first user equipment (UE) attached to the first base station, the first UE registered with the coordinating server, sent when the first UE initiates a voice call to a second UE, the second UE also registered with the coordinating server; creating a first call correlation identifier and storing the first call correlation identifier in association with the first UE; extracting a second call correlation identifier from a terminating leg setup message for a terminating leg bearer received from the core network; determining a real time protocol (RTP) localization status for the originating leg bearer and the terminating leg bearer based on matching the second call correlation identifier of the terminating leg against the stored first call correlation identifier of the originating leg; and sending transport layer assignment messages to the first base station to redirect RTP packets from the first UE to the second UE via the terminating leg bearer without the RTP packets transiting the core network, thereby localizing the RTP packets.

In a third embodiment, a computer-implemented method is disclosed, comprising, at a coordinating server comprising a RTP localization module receiving a first non-access stratum (NAS) Setup message from a base station for an originating leg where the base station sends NAS Setup message to the coordinating server when a first user equipment (UE1) registered with the coordinating server and camped on the base station initiates a voice call to a second user equipment (UE2), the UE2 may be registered to the coordinating server and camped on the base station; creating a call correlation-id to encode in a User-User Information Element (IE) for a message to send to a core network; decoding a received NAS Setup message from the core network to extract a call correlation-id from a User-User IE in the received NAS Setup message; finding a record for the call correlation-id from the received NAS Setup message; determining a RTP localization status finding base stations based on call correlation-id related to the mobile originating leg and the received NAS Setup message from the core network related to a mobile terminating leg; and performing radio access bearer (RAB) modification based on the determination of the RTP localization status by sending RAB assignment requests to the base station for the UE1 and the UE2.

The method may further comprise sending comfort noise RTP packets to the core network from the coordinating server based on the determination of the RTP localization status. The call correlation-id to encode in the User-User Information Element (IE) for the message to send to the core network may be generated based on a called party address information. The call correlation-id to encode in the User-User Information Element (IE) for the message to send to the core network may be generated based on an IP address of the base station. The call correlation-id to encode in the User-User Information Element (IE) for the message to send to the core network may be generated based on a radio area network (RAN) identifier of the base station. The call correlation-id to encode in the User-User Information Element (IE) for the message to send to the core network may be stored in a random-access memory. The call correlation-id to encode in the User-User Information Element (IE) for the message to send to the core network may be stored in a database.

The method may further comprise receiving a Relocation Required from the base station for at least one of a user equipment (UE) in a RTP localized call between the UE1 and the UE2 with at the base station moving to a second base station. The method may further comprise performing RAB modification for a user equipment (UE) in the RTP localized call between the UE1 and the UE2 at the base station and the UE remains camped on to the base station.

In a fourth embodiment, a computer-implemented method is disclosed, comprising: at a coordinating server comprising a RTP localization module registering to a provisioning gateway; receiving a user equipment registration request at the coordinating server; sending a query request to the provisioning gateway to create an association between an International Mobile Subscriber Identity (IMSI) and a Mobile Station International Subscriber Directory Number (MSISDN); and receiving a query response from the provisioning gateway and creating the association between the IMSI and the MSISDN.

The method may further comprise receiving from a core network a NAS Setup message for a mobile terminated call; performing a comparison of a calling party MSISDN in the received NAS Setup message a calling party MSISDN for a mobile originated call the coordinating server to determine a RTP localization status; and performing a radio access bearer (RAB) modification based on the determination of the RTP localization status. The query request may be sent using SOAP web services. The query request may be sent using REST web services.

In a fifth embodiment, a method may be disclosed, comprising: detecting, at a gateway, a packet-based voice session with a source base station and a target base station, the source base station being attached to an originating user equipment and the target base station being attached to a terminating user equipment, the source base station and the target base station each being coupled to a core network via the gateway; performing, at the gateway, endpoint lookup of the terminating user equipment; and redirecting, via the gateway, call audio of the packet-based voice session to the terminating user equipment from a pathway through the core network to a pathway through the gateway.

The source base station and the target base station may be a single base station and the packet-based voice session may be terminated at the source base station. The packet-based voice session may be a real-time protocol (RTP) voice session. The packet-based voice session may be circuit-switched or packet-switched. The packet-based voice session may be routed using hairpin routing. The packet-based voice session may be a circuit-switched fallback (CSFB) call. The method may further comprise performing endpoint lookup using a phone number of the terminating user equipment. The method may further comprise redirecting the call audio of the packet-based voice session within a group of base stations or across multiple groups of base stations. The group of base stations or multiple groups of base stations may be managed by the gateway. The method may further comprise redirecting the call audio of the packet-based voice session from a 2G or 4G base station to a 3G base station. The method may further comprise redirecting the call audio of the packet-based voice session from a 2G or 3G base station to a 4G base station. The method may further comprise providing, at the gateway, three-way calling, call hold, call conferencing, or improved voice quality for the packet-based voice session. The method may further comprise reducing bandwidth required on a link between the gateway and the core network.

DETAILED DESCRIPTION

Figure 1A:
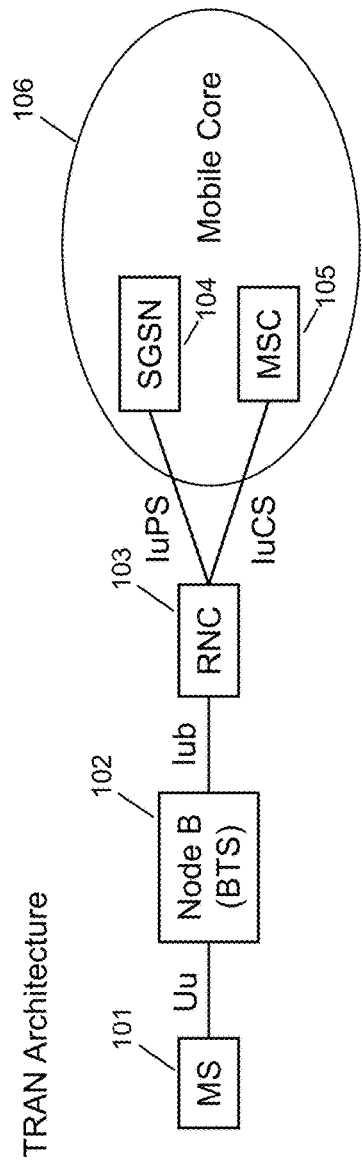
FIGS. 1A and 1B are network architecture diagrams for prior art 3GPP 3G networks.

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form in order to avoid obscuring the concept of the subject technology.

Overview

Through its HetNet Gateway (HNG) (TM), the Parallel Wireless solution can orchestrate and manage the Radio Access Network (RAN) across multiple technologies, including 3G, 4G and Wi-Fi, with high ease of use. The centerpiece of the Parallel Wireless solution is the HetNet Gateway, which is the wireless industry's first carrier-grade, high-performance RAN orchestrator that is based on software-defined networking (SDN) and network functions virtualization (NFV), and is 100 percent compliant with all open and standard interfaces as defined by the 3rd Generation Partnership Project (3GPP). The Parallel Wireless HNG virtualizes the RAN interfaces to manage the 4G and 3G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN. The Parallel Wireless HNG virtualizes thousands of base stations to look like a smaller number of virtualized "boomer cells" to the core. The Parallel Wireless HNG also virtualizes radio network nodes such as Wi-Fi access points (APs), eNodeBs and NodeBs and makes them self-configurable, self-adjustable, and self-healing, helping with initial installation and ongoing maintenance. The Parallel Wireless HNG acts like a virtual radio network controller (vRNC or virtual RNC) for multi-RAT network handling resources for different technologies 3G, LTE/4G and WiFi while optimizing call processing towards radio and core network elements such as the mobile switching center (MSC), serving global packet radio system (GPRS) support node (SGSN), gateway GPRS support node (GGSN), evolved packet core (EPC) for 4G, home subscriber server (HSS), and policy charging and rules function (PCRF).

Paired with the Parallel Wireless HNG, the Parallel Wireless base station, the Converged Wireless System (CWS) (TM), is a multi-RAT base station with LTE, Wi-Fi, and 3G technologies that provides a flexible outdoor and in-vehicle solution in conjunction with the Parallel Wireless HNG. The combined system is a cloud-based network orchestration system that maximizes virtualization, and functions in a 3GPP standards-based Heterogeneous Network (HetNet) to bring 3G, Wi-Fi and 4G operators better technology at lower cost. The Parallel Wireless solution addresses key challenges in delivering 3G/4G coverage, capacity, and quality of service (QoS), regardless of the cell size, e.g., femtocell, pico cell, micro cell, metro cell, or macro cell. The Parallel Wireless solution is also easy to deploy with automated configuration and ongoing optimization.

This disclosure covers a 3G vRNC/HNBGW solution provided by the Parallel Wireless HNG. This disclosure also captures architecture and call flow details for an IuGw feature. The proposed IuGw sits in between a base station, such as the Parallel Wireless CWS (which acts as an HNB), and a core network, which may include an external HNBGW on the Iuh interface. To the CWS (HNB) the IuGW acts as and virtualizes an HNBGW, and to HNBGW it acts as a virtual HNB. The system is generalizable to provide interoperability among any-G RAN access nodes with various combinations of core networks, including with a combined 3G and a 4G core network.

Architecture with an IuGw plus Iub over IP to MSC.

Using the architecture described herein, it is possible to enable 3G packet and circuit calling and data over IP with a flexible and scalable architecture. A gateway, called variously the Parallel Wireless HNG or Parallel Wireless HNG, acts as a 3G radio network controller (RNC) and provides one or more virtualized nodeBs as needed using grouping and mapping. It interfaces with an existing MSC, SGSN via IuCS, IuPS, in some embodiments. The advantages of this architecture include the helpful features of virtualized cells, here, virtual nodeBs, as with the Parallel Wireless LTE virtualization scheme. Also, significantly, using this architecture it is possible to provide an all-IP RAN, with fewer legacy interfaces provided at the core network. This architecture may be adapted for various use cases: emergency services, Band 14 services, multi-operator core networks (MOCN). Iu-Flex can be used for 3G MOCN or multi-MSC, or to provide resiliency across data centers.

As compared to the use of femto cells in an existing network, CWS is very different from femto in scale, RF power/coverage area and capabilities; femto needs external AAA but this architecture does not; femto capacity is additive on top of current network, as opposed to no additional cost with Parallel Wireless HNG; with Parallel Wireless HNG connecting to MSC/SGSN it can provide better 911/LBS solution; simplified network architecture at low cost/Cleaner integration; and this CWS/Parallel Wireless HNG solution is not a femto solution hence does not need femto GW. The CWS solution is ideal for a greenfield scenario, providing both 3G and 4G connectivity, in conjunction with the Parallel Wireless HetNet Gateway. However, the CWS and HNG may also be leveraged to provide effective brownfield network architectures. In other words, in a greenfield scenario, it is possible to convert any-G to proprietary Iuh.

The following references are incorporated by reference in their entirety: UTRAN Overall Description—3GPP TS 25.401 V8.2.0 (2008-12) [1]; UTRAN Architecture for 3G Home Node B—3GPP TS 25.467 V.8.10 (2009-03) [2]; 3GPP TS 29.281 GPRS Tunneling Protocols—User Plane (GTP-U) [3]; 3GPP TS 29.060 GPRS Tunneling Protocol [4]; 3GPP TS 25.413 RANAP Signalling [5]; 3GPP TS 23.003 Numbering, Addressing and Identification [6]; 3GPP TS 25.468—UTRAN Iuh Interface RANAP User Adaption (RUA) Signaling [7]; 3GPP TS 25.469—UTRAN Iuh Interface RANAP User Adaption (HNBAP) Signaling [8].

Figure 1B:
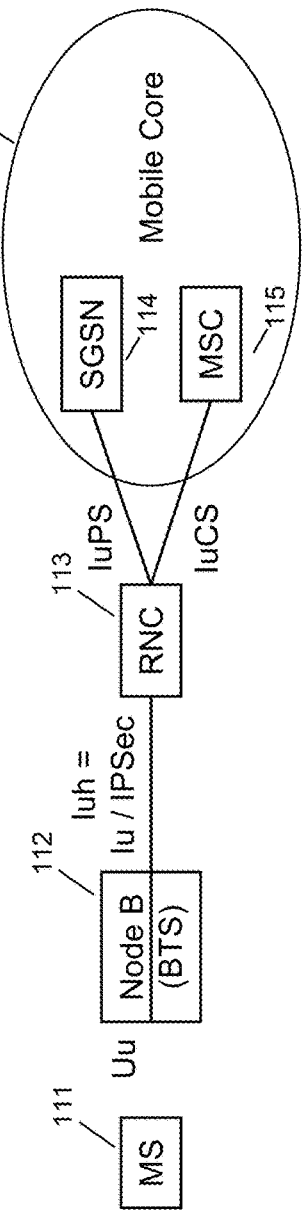

FIGS. 1A and 1B are network architecture diagrams for prior art 3GPP 3G networks. FIG. 1A shows a 3GPP UTRAN architecture. FIG. 1B shows a 3GPP Home NodeB (femto) architecture. As shown in FIG. 1A, the 3GPP UTRAN architecture includes a mobile station 101, a nodeB 102 (also known as a base transceiver station or BTS), a radio network controller (RNC) 103, and a mobile core 106, the mobile core including a serving GPRS support node (SGSN) 104 and a mobile switching center (MSC) 105. The RNC performs functions that include radio resource control, assigning scrambling codes to UEs, power control, ciphering, Kasumi (UE to RNC; note that nodeB connection is not assumed to be secure), and other functions. The MSC acts as a telephone exchange that makes the connection between mobile users within the network, from mobile users to the public switched telephone network and from mobile users to other mobile networks. The MSC also administers handovers to neighbouring base stations, keeps a record of the location of the mobile subscribers, is responsible for subscriber services and billing. The Serving GPRS Support Node (SGSN) is a main component of the GPRS network, which handles all packet switched data within the network, e.g. the mobility management and authentication of the users. The SGSN performs the same functions as the MSC for voice traffic. Between the MS 101 and nodeB 102 is a Uu air interface, between the nodeB and the RNC is an Iub interface, and between the RNC and the core are two interfaces, IuPS and IuCS. IuPS is the interface used for packet-switched connections. IuCS is the interface used for circuit-switched connections, which in 3G include phone calls.

FIG. 1B shows a 3GPP femto architecture, which is similar to FIG. 1A. This architecture includes a mobile station 111, a nodeB 112 (also known as a base transceiver station or BTS), a radio network controller (RNC) 113, and a mobile core 116, the mobile core including a serving GPRS support node (SGSN) 114 and a mobile switching center (MSC) 115. While the Uu interface is unchanged, the interface between the BTS and RNC is Iuh instead of Iub, and also includes an IPsec tunnel between the nodes. The Iub interface is an interface and protocol that allows a macro base station to control the majority of the functions of a nodeB, except baseband and analog-digital conversion. Iub includes control mechanisms to allow an RNC to directly control a NodeB to do all of the following: resource management; scheduling; encryption/decryption; power control; etc. In 3GPP, a regular nodeB does not perform encryption. Iub can be used over IP transport. Iuh is a more lightweight protocol allowing for, e.g., radio resource management at a HNB or femto cell itself. While it is useful to enable a base station to But for carriers with existing macros deployed, it does not make sense to switch already-deployed macro base stations using Iub to Home nodeBs using Iuh; as well, macro base stations have coverage advantages. However, the two interfaces are similar because both Iub and Iuh terminate at a RNC.

Figure 2:
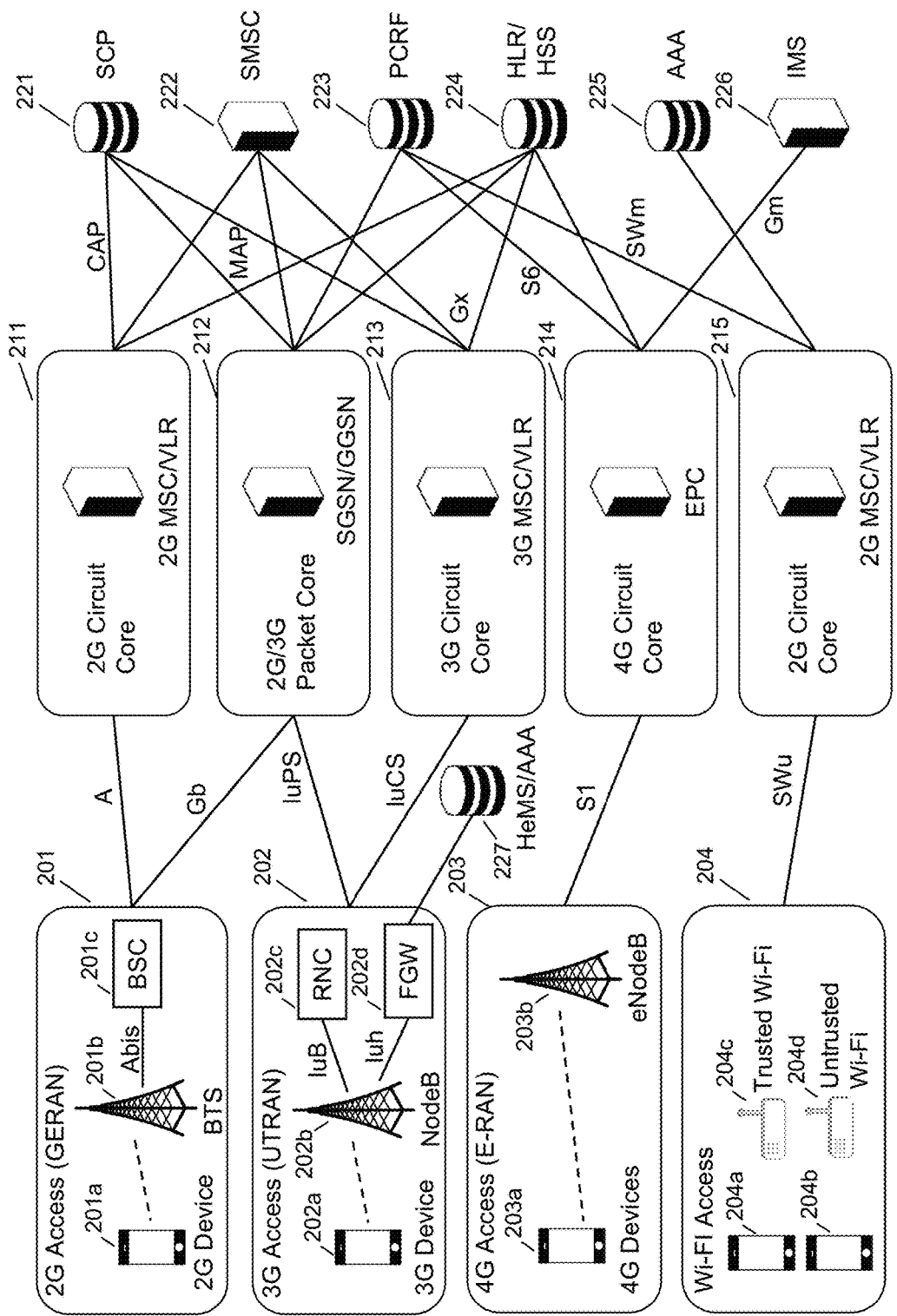
FIG. 2 is a schematic network architecture diagram for 3G and other-G prior art networks.

FIG. 2 is a schematic network architecture diagram for 3G and other-G prior art networks. The diagram shows a plurality of "Gs," including 2G, 3G, 4G, and Wi-Fi. 2G is represented by GERAN 201, which includes a 2G device 201a, BTS 201b, and BSC 201c. 3G is represented by UTRAN 202, which includes a 3G UE 202a, nodeB 202b, RNC 202c, and femto gateway (FGW, which in 3GPP namespace is also known as a Home nodeB Gateway or HNBGW) 202d. 4G is represented by EUTRAN 203, which includes an LTE UE 203a and LTE eNodeB 203b. Wi-Fi is represented by Wi-Fi access network 204, which includes a trusted Wi-Fi access point 204c and an untrusted Wi-Fi access point 204d. The Wi-Fi devices 204a and 204b may access either AP 204c or 204d. In the current network architecture, each "G" has a core network. 2G circuit core network 211 includes a 2G MSC/VLR; 2G/3G packet core network 212 includes an SGSN/GGSN (for EDGE or UMTS packet traffic); 3G circuit core 213 includes a 3G MSC/VLR; 4G circuit core 214 includes an evolved packet core (EPC); and in some embodiments the Wi-Fi access network may be connected via a 2G circuit core 215 with a 2G MSC/VLR. Each of these nodes are connected via a number of different protocols and interfaces, as shown, to other, non-"G"-specific network nodes, such as the SCP 221, the SMSC 222, PCRF 223, HLR/HSS 224, Authentication, Authorization, and Accounting server (AAA) 225, and IP Multimedia Subsystem (IMS) 226. An HeMS/AAA 227 is present in some cases for use by the 3G UTRAN. The diagram is used to indicate schematically the basic functions of each network as known to one of skill in the art, and is not intended to be exhaustive. Noteworthy is that the RANs 201, 202, 203, 204 rely on specialized core networks 211, 212, 213, 214, 215, but share essential management databases 221, 222, 223, 224, 225, 226. More specifically, for the 2G GERAN, a BSC 201c is required for Abis compatibility with BTS 201b, while for the 3G UTRAN, an RNC 202c is required for Iub compatibility and an FGW 202d is required for Iuh compatibility.

Figure 3:
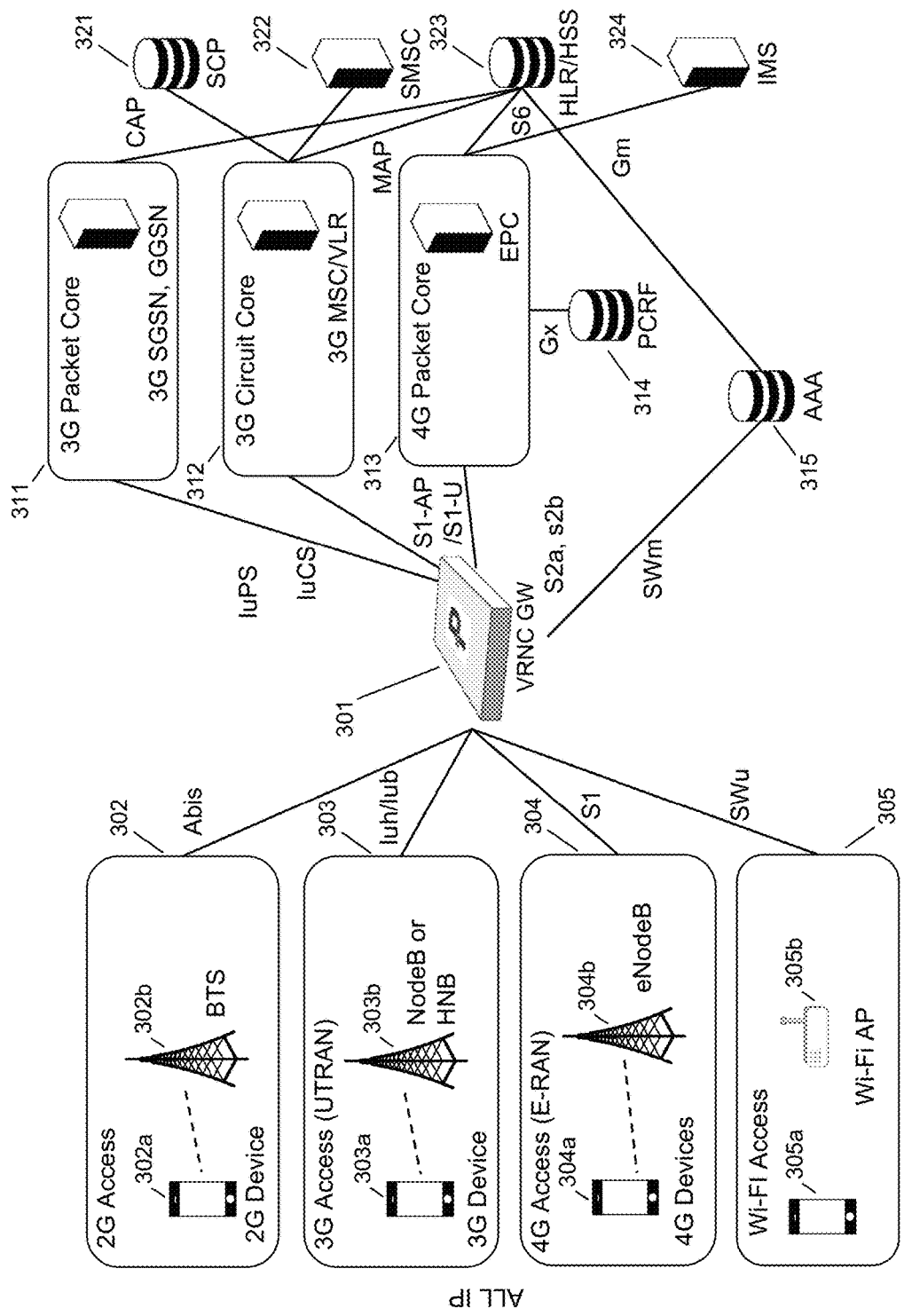
FIG. 3 is a schematic network architecture in accordance with some embodiments.

FIG. 3 is a schematic network architecture in accordance with some embodiments. The architecture shown is an exemplary "brownfield" deployment architecture, i.e., an architecture being deployed using existing equipment and assets, and adds a virtual RNC gateway (VRNCGW) 301, which can be a Parallel Wireless HetNet Gateway, or other virtualizing, coordinating, and base station managing node. 2G RAN (GERAN) 302, with mobile station (MS) 302a and BTS 302b, is represented, but an Abis interface is made directly between GERAN 302 and gateway 301. 3G RAN (UTRAN) 303, with UE 303a and base station 303b, connects directly to gateway 301 via Iuh or Iub without an RNC, as the gateway handles the RNC functions. If a nodeB is used, the Iub protocol may be used; if a home NodeB or femto is used, the Iuh protocol may be used. 4G RAN (EUTRAN) 304 is represented by UE 304a and eNodeB 304b, which communicates via S1 to the gateway 301; S1 is the protocol/interface used for eNodeBs in communicating with the LTE base station managing node, the MME. A Wi-Fi RAN 305, including Wi-Fi device 305a and AP 305b, using SWu, is also directly connected to VRNCGW 301, which permits it to be part of the mobile operator network. Instead of SWu, S2a and S2b may also be used; S2a may be used by/for a trusted wireless access gateway (TWAG), and provides a single IPsec tunnel, while S2b is used for interacting as an evolved packet data gateway (ePDG), which is an untrusted gateway that permits multiple IPsec sessions to be opened.

Gateway 301 handles all protocol communications with the inner core network. It may send 3G sessions to either the 3G packet core 311 or the 3G circuit core 312, or 4G sessions to the 4G packet core 313, or circuit-switched fallback (CSFB) sessions to 3G circuit core 312. Authentication, location registration, or packet-based VoIP etc. is handled according to the prior art by PCRF 314, AAA 315, SCP 321, SMSC 322, HLR/HSS 323, IMS 324 as usual. By the action of the gateway 301 as a virtualizing proxy, extraneous details of the RAN are hidden from the core network and vice versa. The gateway is also enabled to perform steering or slicing as appropriate, so that certain UEs or base stations can be directed to other "Gs" (RANs) or resources can be split among networks. The 2G GERAN core network has been eliminated, as all 2G sessions can be handled by the 3G core. Although the legacy GERAN requires that the gateway 301 use Abis, the core network may view the legacy 2G MS's as 3G UEs. The VRNC may provide both a virtual RNC and a HNBGW, in some embodiments, thus enabling RAN virtualization and coordination for both 3G and 4G nodes. The VRNC may also provide a virtual BSC in some embodiments for legacy GERAN base stations.

This architecture has the following advantages and characteristics, in some embodiments. By having the different RANs share a single gateway and by having UEs/MS's share core networks, less complexity is required in the core and operators are not required to keep multiple core networks active. A heterogeneous network is enabled to be used efficiently. As well, although implementation of the gateway 301 requires increased complexity, this results in additional potential for features to be added, such as coordination features across RAN technologies. By terminating connections, lower-layer encryption is typically not in place, allowing for deep packet inspection and lawful intercept (although application-layer encryption is still potentially in place).

Figure 4:
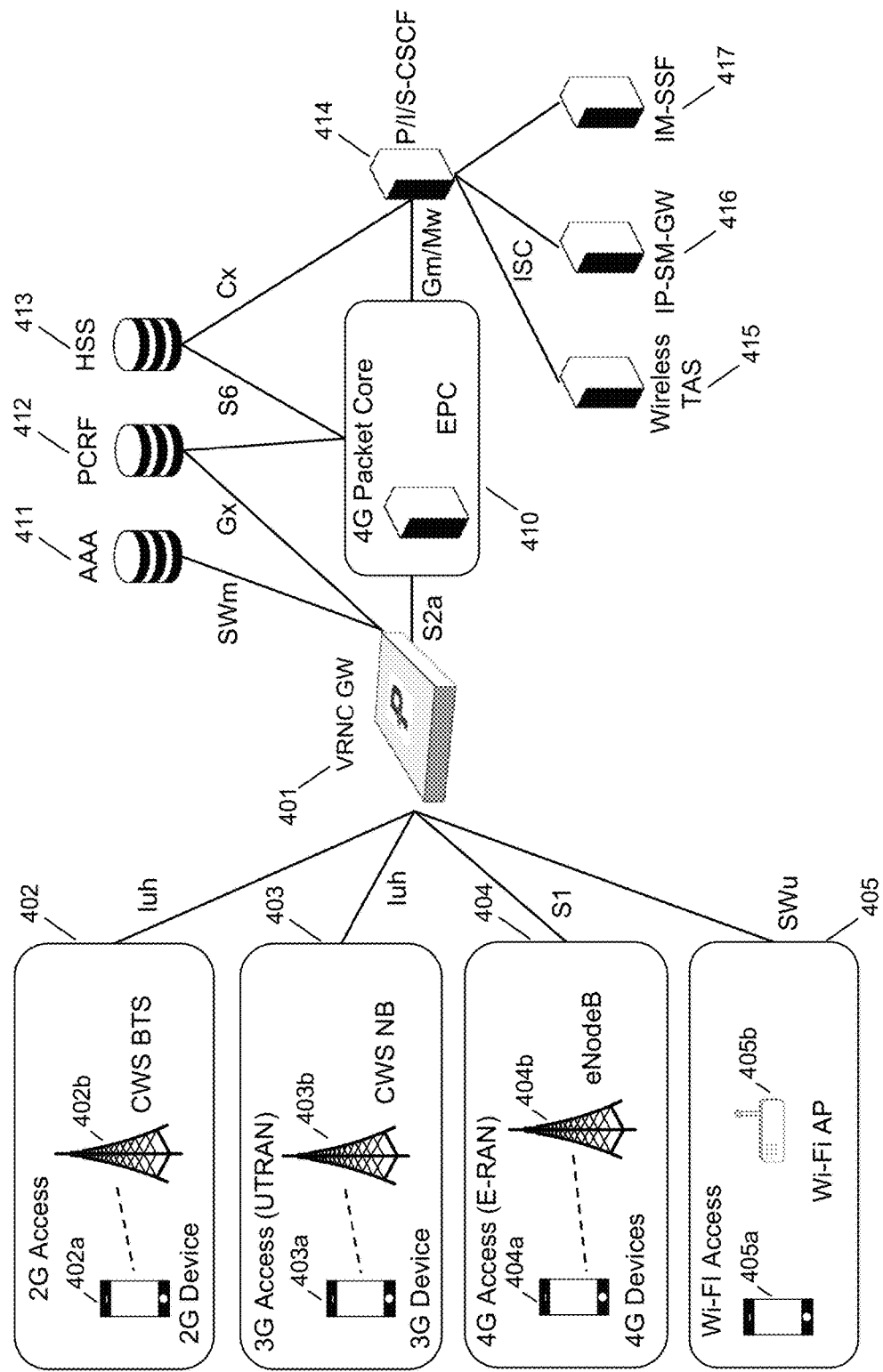
FIG. 4 is a schematic network architecture in accordance with some further embodiments.

FIG. 4 is a schematic network architecture in accordance with some further embodiments. The architecture shown is an exemplary "greenfield" deployment architecture, i.e., an architecture being deployed with new purchases of equipment to provide coverage in areas previously not served by existing equipment. 2G GERAN 402, with MS 402a, BTS 402b; 3G UTRAN 403, with UE 403a and nodeB 403b; 4G EUTRAN 404, with UE 404a and eNodeB 404b; and Wi-Fi access network 405, with mobile device 405a and AP 405b, are still present and each continue to go through VRNCGW 401. However, in this configuration it is not necessary to provide a 3G packet core or circuit core. Instead, a 4G packet core 410 is provided, as well as functions for enabling the 4G core: AAA 411, PCRF 412, HSS 413, and IMS nodes P/I/S-CSCF 414, wireless TAS 415, IP-SM-GW 416, and IM-SSF 417. The IMS core provides voice calling functions and the 4G packet core provides data calling functions.

VRNCGW 401 enables this core network simplification in conjunction with enhanced base stations in the RAN. Instead of legacy 2G and 3G base stations, Parallel Wireless CWS/BTS 402b and Parallel Wireless CWS/nodeB 403b provide additional functionality. CWS/BTS 402b communicates with 2G MS 402a using an A interface, but instead of requiring Abis, CWS 402b may interwork the A interface and provide voice calling using RTP and SIP via IMS, thus requiring only a standard packet-switched session that 4G core network 410 can provide. Parallel Wireless CWS/nodeB 403b may interwork CS sessions similarly to IMS. CWS/BTS 402b and CWS/nodeB 403b both only require Iuh to be handled by VRNCGW 401, such that the VRNCGW is required only to use Iuh and S1/S2/SWu.

Although not shown, it is apparent that this network architecture is flexible and accommodates a variety of configurations. The general approach being used here is to provide a stateful proxy at the gateway that is capable of handling a particular protocol/interface. Since the gateway sits at the center of the network for both the RAN (and therefore the UE or mobile device) and the core network, the stateful proxy can have appropriate knowledge about the messages that have been sent. The stateful proxy can also suppress messages, change headers, insert messages, or perform other proxy functions. A finite state machine (FSM) may be used for handling state, which may be tracked for mobile devices (MS, UE, etc.) or base stations (nodeB, ENB, HENB, Wi-Fi AP, etc.) as well as the core network nodes themselves.

In some embodiments, methods for coordinating between base stations are also available using X2, Iur, and Iurh protocols. The X2 interface is used between 4G eNodeBs. The Iur interface is used between RNCs. Using the VRNCGW as a proxy and gateway, the VRNCGW may be able to provide Iur-based nodeB coordination with other RNCs, as well as interworking between X2 and Iur for heterogeneous RAT coordination. The VRNCGW may also use Iurh interface to exchange coordination information with home nodeBs as a HNBGW. This type of signaling enables features such as soft handover, direct handover, COMP, ICIC, and others. Proxying and aggregation of these interfaces at the VRNCGW has also been considered.

Figure 5:
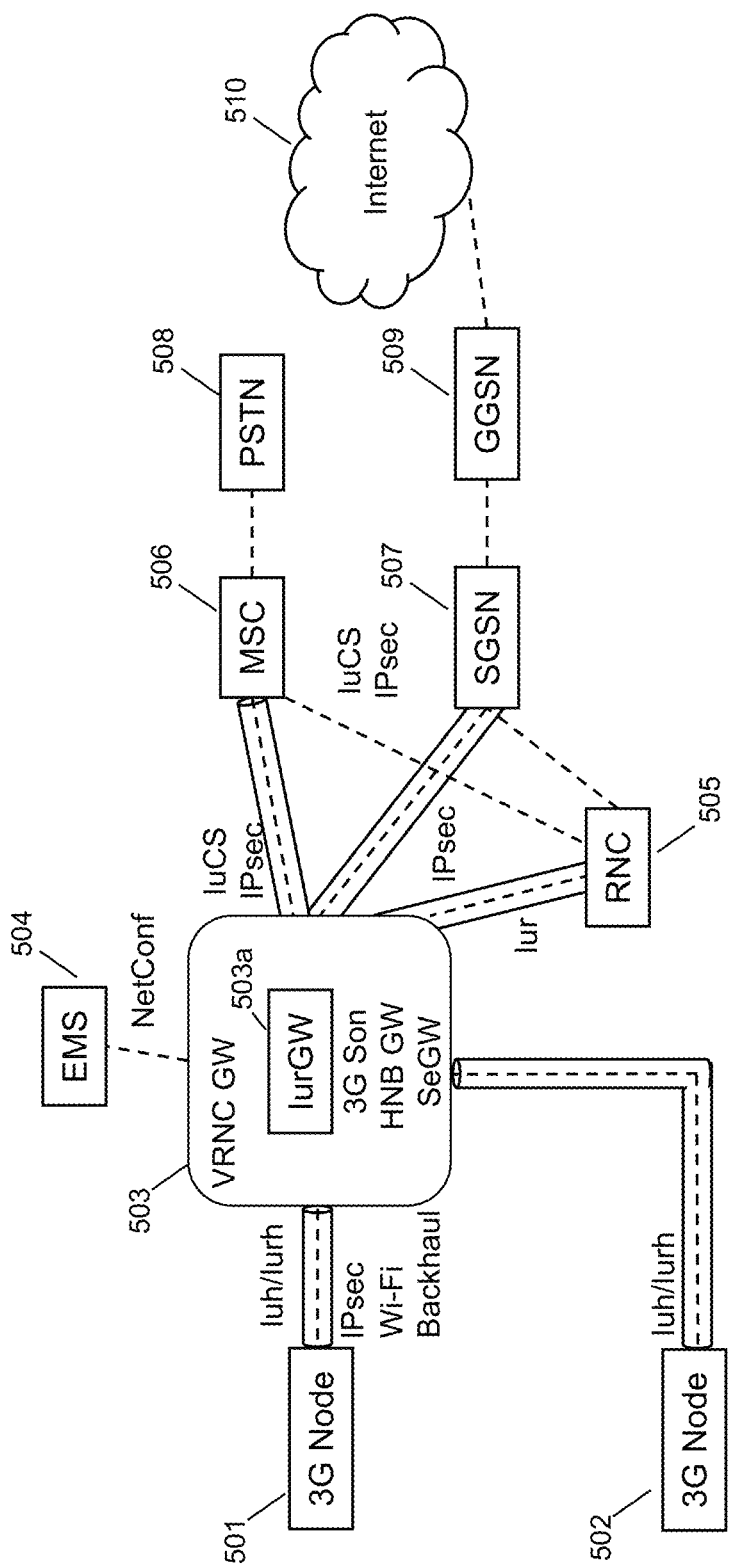
FIG. 5 is a schematic network architecture showing security and signaling characteristics in accordance with some embodiments.

FIG. 5 is a schematic network architecture showing security and signaling characteristics in accordance with some embodiments. 3G nodeBs 501 and 502 are connected via Iuh/Iurh to VRNCGW 503. An enhanced messaging service (EMS) server 504 is also connected to VRNCGW 503 for providing text messaging and other services. VRNCGW provides 3G self-organizing network (SON) capability, HNBGW capability, and security gateway capability to RANs 501 and 502. RAN 501 is connected over a Wi-Fi backhaul link; RAN 502 is connected via a physical link or another link. Both RAN 501 and 502 have opened IPsec tunnels to VRNCGW 503, which terminates the tunnels and decrypts the contents. VRNCGW 503, via its security gateway (SeGW), then takes the output of the tunnels and sends them via additional IPsec tunnels that connect to, in this particular network configuration, an RNC 505 (via Iur for inter-RNC coordination), an SGSN 507 (via IuPS for delivery of packet traffic), and an MSC 506 (via IuCS for delivery of circuit-switched calls). These nodes 505, 506, 507 are in the 3G core network, and no additional security is needed between these nodes and other nodes in the core network. MSC 506 connects to the regular telephone network, e.g., the PSTN 508, to provide call connectivity. SGSN 507 connects to GGSN 509, which connects to the public Internet 510.

Components

The Parallel Wireless solution may include the following components

Converged Wireless System (CWS)—the CWS component is a multi-technology base station with an integrated backhaul (wired, microwave, mesh and LTE) that supports LTE, and LTE Advanced, 3G, and Wi-Fi access, simultaneously. The CWS series is available in different form factors such as outdoor, in-vehicle small cell, and indoor.

HetNet Gateway—the HetNet Gateway (Parallel Wireless HNG) is a carrier-grade server that is NFV/SDN-based, 3GPP-compliant RAN orchestrator that enables RAN hyperconnectivity by unifying any technology (3G, 4G, Wi-Fi), any vendor RAN by presenting it as one common interface to the core. Parallel Wireless HNG logically sits between the RAN and the core and abstracts the RAN on COTS hardware while making the RAN self-configuring, self-optimizing, and self-healing. To provide hyperconnectivity and to manage the RAN in real-time, the Parallel Wireless HNG combines these virtualized network functions: virtual-eNB, HeNBGW, X2 gateway, HNBGW/vRNC, ePDG, TWAG/SaMOG, SON server, edge/cell site aggregation, and the security gateway. It is also an Internet of Things (IoT) enabler, and eMBMS enabler by adding MCE and MBMS-GW functionality and analytics. It optimizes the signaling and data traffic going to core network to allow operators to scale the network to meet growing capacity demands at low cost. In an LTE network, the HetNet Gateway (Parallel Wireless HNG) node logically sits between the eNodeBs and the MNO Evolved Packet Cores (EPCs). It orchestrates thousands of base stations to look like a single one to the MNO packet core. The Parallel Wireless HNG virtualizes the radio network resources such as eNodeBs and backhaul and makes them self-configurable and self-adjustable. It acts as HeNBGW and vRAN/virtualENB. It allows plug and play operation of CWS nodes and mesh backhaul, and allows them to form an ad hoc network as the nodes come in to the network and leave. In a 3G network, the Parallel Wireless HNG provides the Home Node B Gateway and virtual RNC functionality. For Wi-Fi, the Parallel Wireless HNG acts as a Wireless LAN Controller (WLC), Evolved Packet Data Gateway (ePDG) and Trusted Wireless Access Gateway (TWAG). These are all configurable options and one or the other can be configured based on an operator's requirements. In some configurations Parallel Wireless HNG also acts as an EPC. The HetNet Gateway sits between the RAN and the core network, and as a result is in a position to provide proxying and virtualization for any-G and for any core or multiple cores, as well as being able to perform deep packet inspection and lawful intercept for data flowing through the network that would be encrypted if intercepted at a different point in the network.

Uni-Manage—the Uni-Manage software is an Element Management System (EMS) for the CWS and HetNet Gateway (Parallel Wireless HNG) components, and provides a web-based Graphical User Interface (GUI) for operators to manage and monitor the network elements.

In some embodiments, a Parallel Wireless CWS may be used to provide 3G Radio Access, providing WCDMA air interface network interfaces for the CWS towards 3G core.

When using the CWS, or another small cell or femto node, it is possible in some embodiments to use the Iuh or Iur protocol to effectively provide 3G configuration and control for those nodes. When providing configuration and control for traditional 3G macro cells, the commonly-used Iub interface is supported by the Parallel Wireless HNG as well, and the Parallel Wireless HNG acts as the RNC for such a base station. In some embodiments, Iub and Iuh may be enabled at the same gateway. In some embodiments, a lower-level radio L1/L2 layer may be implemented in a hardware or software module on the Parallel Wireless CWS, or a software state machine for handling L1/L2 messages at the Parallel Wireless HNG.

Features of IuGW

In some embodiments, Parallel Wireless HNG may act as or provide an IuGw functionality. It may also encompass 3G SON and security gateway. In some embodiments, CWSes are virtualized by which HNB endpoint (towards external HNBGW) would be configured. There could be multiple CWSes virtualized per HNB endpoint or it could be a single CWS (macro hand over). In some embodiments, Parallel Wireless HNG may register large number of UEs (could be in thousands) from one HNB endpoint. HNBGW will be capable of supporting large number of UEs behind one HNB node. In some embodiments, a SON module may provide the functionality to provision CWS with information like Cell-ID, PSC and other OA&M details. SON may provide API to validate CWS attributes at the time of HNB registration. SON features may be enabled in some embodiments, such as: MRO—Iurh based, Outage Detection & Compensation, Coverage and Capacity Optimization, Energy Savings, Modification of Antenna Tilts, ICIC. In some embodiments, mobility optimization (a SON feature) may be enabled. In such an embodiment, Parallel Wireless HNG will be acting as Iur & Iurh proxy concentrating handovers. In such configuration handovers will be performed directly from the MACRO RNC to Parallel Wireless HNG bypassing 3G core network. In some embodiments, IuGw may expose individual CWS to HNBGW. So in a deployment scenario, there will be a set of CWSes which are emulated one-to-one with external HNBGW and there will a set of CWSes which as a group is emulated as one HNB with external HNBGW. The CWSes may be grouped in various ways. In some embodiments Parallel Wireless HNG based HNBGW uses CWS grouping to virtualize resources and allow flexible and auto assignment of LAC/SAC etc. In some embodiments Parallel Wireless HNG based HNBGW uses CWS grouping for RTP localization for a set of CWSs.

In some embodiments, this IuGW provided by the HetNet Gateway may be more than a simple router or proxy. Instead, the IuGW may handle Iub for communicating with 3G macro base stations, Iuh for communicating with Home NodeBs, or both in the same gateway, typically as separate software modules or sharing a state machine for tracking the behavior of the UE. In some embodiments this is done by providing a virtual RNC functionality at the base station. The virtual RNC functionality may be a complete software-virtualized RNC, in some embodiments, but may be a software state machine-driven proxy, in other embodiments, tracking the state of the remote nodeB as well as any attached UEs. The virtual RNC may communicate with other RNCs, virtual or non-virtual, or HNBGWs via Iur, and may communicate to HNBs using Iurh as well. The virtual RNC may terminate any tunnels needed to provide service to the UE. For example, the VRNC may act as a endpoint for a GTP-U tunnel carrying user data to a SGSN in the core network.

In some embodiments, the IuGw may run as part of Parallel Wireless HNG (LTE Access Controller, the Parallel Wireless controller node); may use the Parallel Wireless HNG build environment and scripts; Binaries may get packaged as part of unicloud rpm; may run as part of 'pwbootd' service; may use UniTask framework for process management; may use Parallel Wireless HNG confd CLI for configuration and statistics management; may use Parallel Wireless HNG alarm framework for alarm generation; and may use Parallel Wireless HNG logging framework for logging and for managing logging level. In some embodiments, Load distribution for control plane traffic may be implemented. Control plane traffic concentration towards external 3G core may be implemented. IuGw may forward user plane packets as UDP proxy using kernel module or dpdk. The IuGw proxy may be extended to full-fledged HNBGW running in Parallel Wireless HNG. But it is not expected to run HNBGW and Iuhproxy on the same Parallel Wireless HNG at the same time.

In some embodiments, deployment model here means that, criteria used for grouping multiple CWS-HNB's as single HNB, how many such grouping would be made and how are the cell-ids allocated to CWS and how they are mapped on the interface to HNBGW, etc. Group configuration may be used to associate one or more CWS and one HNB in it. When a message enters the Parallel Wireless HNG, group name for that message will be identified and tagged with the message. This group name is used by all process to identify required configurations and ingress/egress SCTP connections, etc. Parallel Wireless HNG need not interface with external HNB Management System (HMS), in some embodiments.

In some embodiments, an OAM may be included that contains: EMS communicating with Parallel Wireless HNG using NetConf Interface and presenting CWS & Parallel Wireless HNG Data Models; HMS Server; a Parallel Wireless HNG translation function providing interworking between the ConfD and Iuh provisioning; and SON features.

In some embodiments 3G Radio Access CWS, providing WCDMA air interface and Iuh interface towards HNB GW; Parallel Wireless HNG functionality, first phase deployment Parallel Wireless HNG will be playing multiple functions: IuGw; 3G SoN; SeGW—Security requirements contain both requirements for the IPsec, securing communication between the CWS node and the Parallel Wireless HNG where Parallel Wireless HNG is acting as SeGW, CWS WCDMA over the air security; and L2 WiFi Mesh security; OAM, that contains: EMS communicating with Parallel Wireless HNG using NetConf Interface and presenting CWS & Parallel Wireless HNG Data Models; HMS Server providing TR-069 support; Parallel Wireless HNG translation function providing interworking between the ConfD and Iuh provisioning; SoN features (such as MRO (Inter WCDMA only and statistics based), ANR, and PCI Planning & Optimization).

Supported in some embodiments: circuit-switched fallback (CSFB) from third party 4G Macro; CSFB from 4G CWS; Intra Frequency Handovers CN anchored; Inter Frequency Handovers CN anchored; Inter RAT Handovers Parallel Wireless HNG anchored; Intra Frequency Handovers Parallel Wireless HNG anchored; Inter Frequency Handovers Parallel Wireless HNG anchored; Inter RAT Handovers Parallel Wireless HNG anchored. Also supported in some embodiments is maintaining the continuity of UE support during RNSAP Relocation by transferring the information from the Source HNB to the Target HNB according to the section 5.10 of 3GPP TS 25.467 V11.1.0.

RANAP signaling is used to establish the Radio access bearers (RABs) in some embodiments. RAB-Assignment Request of RANAP carries all the details of the RABs. This message is usually carried inside the RUA Direct-Transfer message (except in the case of relocation).

Additional features in some embodiments include: Aggregation of the IPsec connections from the CWSs towards 3G Core; Aggregation of SCTP Connections from the CWSs towards 3G Core; Virtualization of the 3G Network; Radio resource management as RNC; Paging and handover optimization for smallcells managed by IuGW; Enable localized services, differentiated QoE for a group of NodeBs such as RTP localization.

Registration

At service start up Parallel Wireless HNG registers all the configured HNBs with external HNBGW. When CWS does a HNB registration it is locally processed and accepted by Parallel Wireless HNG. When the UE registers from CWS, it forwards the UE registration towards HNBGW after replacing required IEs. When service starts up, HGWCon performs HNB registration for configured HNBs with external HNBGW. When CWS does a HNB registration HNBCon processes and accepts the registration. When a UE register message is received at HNBCon, it selects a UEMgr and forwards it to that instance. HNBCon will tag this message with the group based on configuration and forward to UEMgr. At UEMgr a new entry for this UE is created and forwards it to HGWCon. At HGWCon it identifies the HNB for the group name and forwards the UE registration.

Mobility

Mobility between two different CWS Groups. When a UE moves between two different CWS groups external HNBGW needs to be informed. When Parallel Wireless HNG receives the 'Relocation Request' it maps the CWS ID and Cell ID to the corresponding HNB-ID and Cell ID for external HNBGW interface and forwards it to HNBGW. When it receives response it maps it back to the CWS interface IDs and forwards it to CWS. For all the mobility control plane messages Parallel Wireless HNG does the similar mapping and forwards it accordingly.

Internally for the mobility scenario, UEMgr maintains the mobility FSM states. When HGWCon forwards the message to external HNBGW it replaces the cell-id with correct cell-id as required for HNBGW interface. Similar call flow will apply for mobility with macro zone. Mobility between two CWS of same group—Node Level Call Flow. When a UE moves between CWS of same groups, no need to inform external HNBGW about the movement. Parallel Wireless HNG locally anchors the mobility.

Topology Hiding and Grouping

In some embodiments, the use of a virtualizing gateway may solve the problem of an increased number of small cells, to provide more capacity, more users, more handovers, and more load on the core. The Parallel Wireless HNG virtualizes small cells A, B, C, D to appear only as small cell A. Suppose RF planning isolates cells B, C, D from macro. Macro hands over to and from cell A. Cells B, C, D hand over to A and to each other. All handovers to and from B, C, D are advantageously hidden from the core. In such embodiments, the topology of the network may be hidden to improve handover performance. For example, a macro base station that can cover a large area may be preferable to a scattered set of small cell base stations when traveling at high speed on a highway, but the small cell coverage area may be preferable when moving at walking speed. Hiding certain small cells can result in avoiding unneeded and undesirable handovers.

In some embodiments, grouping of a set of nodes is performed. A proxy can be used to enable small cells to connect to a core network. However, a problem with a simple proxy is that some mobility scenarios require individual CWSes (small cells) to be exposed to the core. The examples of such scenarios are as shown herein. Specifically, when a two-stage handover is made available as shown herein with some cells constituting a "rural zone" and some cells constituting a "macro zone," it is difficult to proxy all individual cells as a single cell, because some of the "rural" cells are not adjacent to the macro and cannot be proxied toward the core as if they were a single cell adjacent to the macro.

The solution to this problem is to provide flexible grouping of cells toward the core. Some CWSes are emulated 1:1 with the HNBGW. Others are emulated as a virtualized group. This mapping may be configured statically or dynamically, such as being allocated from a pool. Each CWS has a unique CGI. Each CWS can be assigned its own location area code (LAC), service area code (SAC), and routing area code (RAC), as defined in, e.g., 3GPP TS 23.003, V9.15.0 hereby incorporated by reference, which are identifying parameters for small cells; however, based on what is needed, some of these parameters may be shared among CWSes, and multiple CWS can share one or more of these identifiers via a common profile. In some embodiments, multiple vRNCs and RNC IDs may be supported. Allocation of groupings to cells may be performed at a control node, such as at the Parallel Wireless HNG or HetNet Gateway. The cells may receive their configuration using X2, NETCONF, or any other control channel. The cells need only be made aware of their own grouping. The advantages of this are that certain local actions are thereby enabled by the local nodes, such as base station/HNB and UE Registration and mobility between two different small cell groups, as described herein. In some embodiments, the location of each small cell base station (CWS) may be tracked. Each CWS's CGI may be mapped to lat/long. Location information can be provided for CWS as CWS has GPS. The Parallel Wireless HNG acts as downstream system using CGI to cross-refer to originating cell. 3GPP location based services (LBS) support for emergency calls may be provided. In some embodiments, geographic location may be used to create groups, which may then be used to perform targeting of ads, disaster warnings, text messages to all subscribers, etc. In some embodiments, MBMS functions may be performed on individual groups to provide, e.g., localized broadcast. In some embodiments, backhaul may be managed and optimized on a per-group level. Other optimizations may be performed within groups or subgroups.

To support topology hiding feature, Parallel Wireless HNG may hide the CWS IP addressing/ports towards the 3G core and vice versa. This means that the RAB Assignment Request coming in from 3G core will be terminated at Parallel Wireless HNG. Parallel Wireless HNG will store the parameters of the RAB including the transport layer information provided by 3G core. Parallel Wireless HNG will then originate new request towards the CWS such that it contains transport layer information specific to Parallel Wireless HNG. When the CWS replies with RAB Assignment Response message, Parallel Wireless HNG will again store the parameters provided by CWS and send a response to the HNBGW that may include Parallel Wireless HNG assigned transport network layer parameters. When the data starts flowing through the Parallel Wireless HNG, it will appropriately proxy the data from one side to the other side based on the control information of how transport network parameters were assigned for a given bearer.

Each set of CWS that is represented as one virtualized HNB (aka operator-network) will be configured with its own ingress user-plane IP address and egress user-plane IP address. User plane IP address can be same as control plane IP address because user plane is over UDP while control plane uses SCTP. However, typically it needs to be ensured that this same IP is not used elsewhere in the system (e.g. SON/Configmg link etc) where it can now or in future cause conflicts due to UDP port range clash. Note that ingress and egress user-plane IP addresses need to be different. In Phase-1, Parallel Wireless HNG will allow configuration of only one user plane IP address at ingress and one at egress. In future, we may allow multiple user-plane IP addresses. For each bearer within an operator-network, Parallel Wireless HNG will allocate one pair of UDP ports. This will be communicated to both the CWS as well as to the 3G core in RAB Assignment Request/Response messages. When the peers send data packets to Parallel Wireless HNG for the given bearer, they will be destined to this UDP port and the IP address of user-plane ingress or egress. Based on the IP address, Parallel Wireless HNG will be able to find out the direction and based on the UDP port number, it will be able to find out the bearer. Mapping information will be available which it will then use to proxy the packet out with appropriate parameters. While allocating UDP port number blocks, Parallel Wireless HNG would leave out the initial system port range. E.g. The port allocation will start after 1024. The first bearer to get created can get the port number 1026 (first even port after 1024). If PS user-plane is also running on the same IP address then GTP is going to use UDP port 2152. So that port may be left out.

Control Plane and User Plane

Parallel Wireless HNG acts as vRNC/HNBGW. While acting as vRNC it interfaces with outdoor NodeBs (pico, micro, metro) over Iuh interface. It does radio resource management as a typical RNC because it has visibility of all the radio nodes and their resources. It presents standard based interfaces towards MSC and packet core such as Iu-CS and Iu-PS. The HNBGW serves the purpose of a RNC presenting itself to the CN as a concentrator of HNB connections. The interface between CN and the HNBGW serves the same purpose as the interface between the CN (Core Network) and a RNC. Parallel Wireless HNG also performs 3G SON functions for PSC allocation and ANR table management. It also provides plug and play function for 3G node as well as dynamic RF power adjustment.

HNBGW segregates Control Plane & User Plane traffic for performance enhancement. User plane is further divided into CS and PS user plane traffic.

User plane. In some embodiments, regarding circuit switched (CS) call setup and data transfer, HNBGW CS user plane is responsible for relaying RTP packets in uplink and downlink directions. In some embodiments, vRNC/HNBGW supports the transport of signaling and data messages over IU and Iuh interfaces for successful CS call establishment and data transfer. Mentioned below are the messages supported: Iuh signaling messages using HNBAP over SCTP: HNB REGISTER REQUEST/ACCEPT/REJECT; HNB DEREGISTRATION; UE REGISTRATION/ACCEPT/REJECT; UE DEREGISTRATION; ERROR INDICATION. Iuh signaling messages using RUA over SCTP CONNECT; DIRECT TRANSFER; CONNECTIONLESS TRANSFER; DISCONNECT; ERROR INDICATION. NAS signaling transfer via RANAP message: INITIAL UE MESSAGE; DIRECT TRANSFER; IU RELEASE REQUEST/COMMAND/COMPLETE; RAB ASSIGNMENT REQUEST/RESPONSE; RAB RELEASE REQUEST; RAB MODIFICATION REQUEST; RELOCATION REQUIRED/COMMAND/FAILURE; RELOCATION REQUEST/REQUEST ACK/FAILURE; RELOCATION COMPLETE; RELOCATION DETECT; RELOCATION CANCEL/ACK; PAGING; COMMON ID; RESET/RESET ACK; RESET RESOURCE/RESOURCE ACK; ERROR INDICATION; SECURITY MODE CONTROL. In some embodiments, regarding packet switched (PS) call setup and data transfer, the signaling messages mentioned with respect to CS would also be supported for PS domain. For data transfer during PS call, HNBGW user plane for PS domain is responsible for relaying GTP packets in uplink and downlink directions.

For the user plane, in some embodiments, Parallel Wireless HNG as IuGW will support both circuit-switched (CS) data proxy and packet-switched (CS) data proxy modes.

For the CS User Plane, in some embodiments, voice or video stream data will be encoded inside RTP protocol. RTP will be carried over UDP over IP transport. RTCP may be used but is optional. The receiving entity may ignore incoming RTCP PDUs. RTCP is again carried over UDP over IP transport. Each transport bearer is identified by the UDP port number and the IP address (source UDP port, destination UDP port, source IP address and destination IP address). Parallel Wireless HNG will need to reserve two consecutive ports per transport bearer (one for RTP and another for RTCP). Pair of two ports is referred as port number block. For RTP protocol, an even numbered UDP port is used. RTCP uses the consecutive odd numbered port.

Transport layer information for CS plane in RANAP protocol includes 'transport layer address' and 'Iu Transport association'. Transport layer address contains IP address encoded in NSAP (Network-service-access-point) structure as per RFC 4548. Iu-Transport-Association will contain the UDP port inside the Binding-ID field. This UDP port will be an even numbered port to be used by RTP protocol.

Voice/video packets are usually very short (approximately less than 100 bytes). For every bearer of every user, sending the small packets increases the overall link bandwidth requirement because of overhead (UDP/IP) of transferring each packet. Also for the receiving end, packet rate will become a parameter for its overall capacity. To solve this, 3GPP has proposed multiplexing scheme where the 3G core advertises only one UDP port (called RTP mux port) to the HNB. HNB then collates multiple RTP packets (could be of different users) and forms a bigger packet (which contain smaller RTP chunks and additional multiplexing headers). HNBGW receives this bigger packet and it then de-multiplexes the RTP chunks for processing. Multiplexing is defined only in uplink direction. Secondly, it is optional. If the HNB does not support multiplexing, it can still keep sending the uplink RTP streams as per the RAB assignment ports and ignore the RTP mux port. In the first phase, Parallel Wireless HNG behaving as virtual HNB will ignore the RTP multiplexing if any offered by the 3G core.

HNBGW may support the transfer of short message services (SMS) between UEs, in some embodiments, including: SMS-MT: message sent by the UE; SMS-MO:message sent to the UE.

Control Plane. In some embodiments, the control plan acts as follows. The control plane handles signaling messages and manages the TNL address translation, RTP Port/ GTP-U TEID management (Tunnel Endpoint Identifier) and sends the TNL address translation updates to user plane application over the propriety interface. The circuit-switched user plane handles the TNL address translation updates, create/delete/modify RTP session in both HNB and CN direction, processes and forwards RTP data packets towards HNB/CN. The packet-switched user plane handles the TNL address translation updates, create/delete/modify GTP-U tunnel in both HNB/NB and CN direction, processes and forwards GTP-U data packets.

HNBGW supports hand-out and hand-in of on-going calls to/from neighboring cells, in some embodiments, including CS Handover (relocation of context to/from neighboring cells for on-going voice conversations) and PS Handover (relocation of context to/from neighboring cells to on-going data sessions). When UE moves between CWSes of same group, location reporting and path switching may be implemented.

HNBGW provides access control for HNBs/UEs based on white list configuration, in some embodiments. White list shall contain IMSI and HNB ID information. When the white list configuration is enabled, only those HNBs/UEs included in the list are allowed to access HNBGW resources. On the other hand, when disabled, any HNB/UE is allowed to access the HNBGW.

FIG. 5 is a schematic network architecture showing security and signaling characteristics in accordance with some embodiments.

Figure 6:
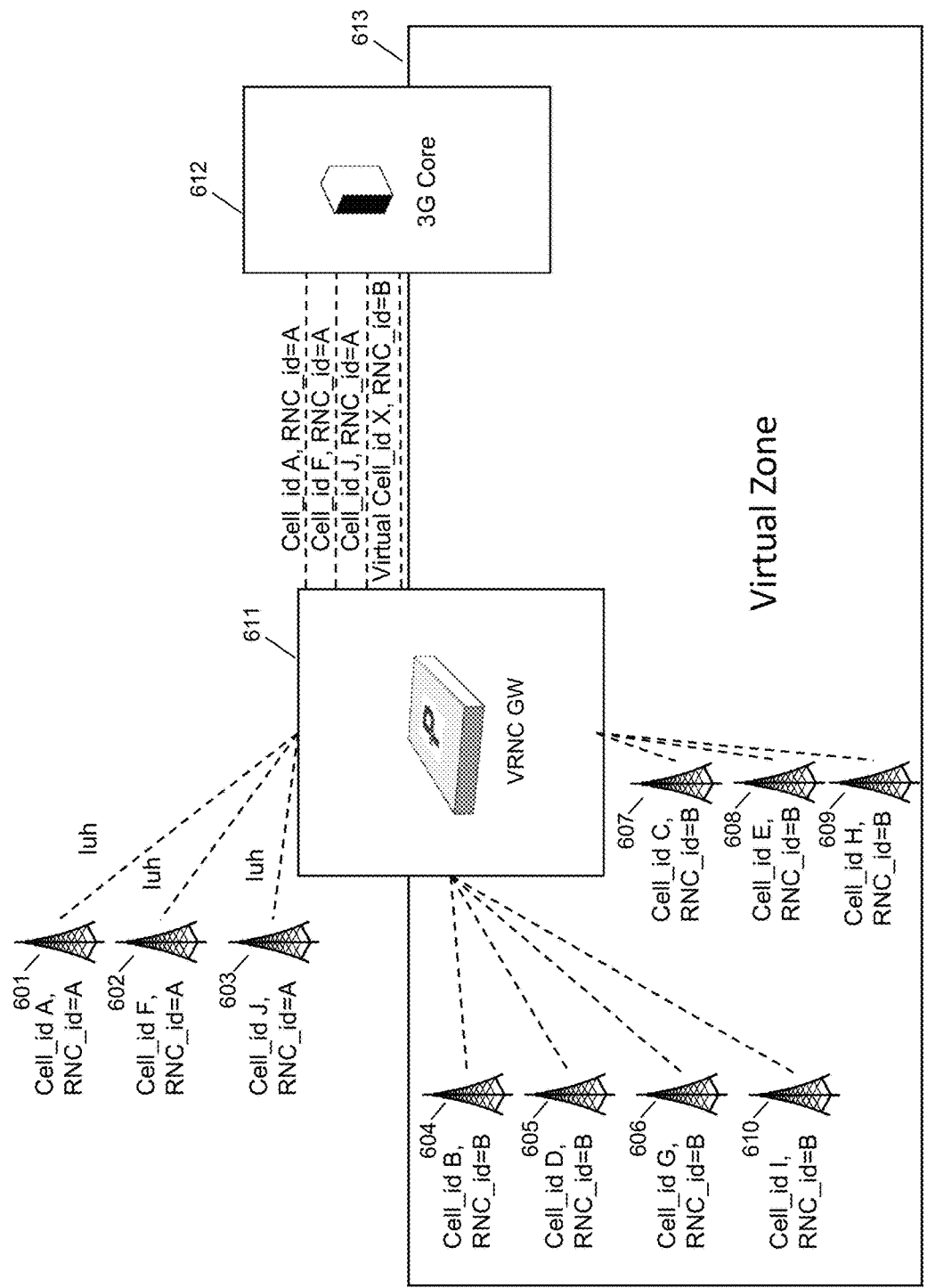
FIG. 6 is a schematic network architecture showing base station grouping in accordance with some embodiments.

FIG. 6 is a schematic network architecture showing base station grouping in accordance with some embodiments. VRNCGW 611 sits in the network between the RAN and the core network, which here is a 3G core 612. Several base stations, 601, 602, 603, 604, 605, 606, 607, 608, 609, 610 are shown. Base stations 601, 602, 603 are handled separately from base stations 604, 605, 606, 607, 608, 609, 610. This is because base stations 604, 605, 606, 607, 608, 609, 610 are in a "virtual zone" 613, which has been designated as not permitted to perform handins from a macro cell. In a rural small cell deployment, this is to ensure that mobile devices are not handed in when the result of a handin will be an immediate handout, or worse, a call drop due either to a small coverage area or a coverage area that is not conducive to handing over to another cell. The grouping method described with respect to this embodiment is applicable to both 3G and 4G (LTE), although the base stations shown in FIG. 6 are 3G nodeBs. As shown in the interfaces between VRNCGW 611 and 3G core 612, the VRNCGW communicates individually to each base station (here, using Iuh), but does not permit the core to address each of the virtual zone base stations independently. Rather, all of the virtual zone base stations are treated as a single virtual cell with a special ID. As well, the virtual zone base stations are given a separate RNC ID as well, in some embodiments. In order for a handset or mobile device to be handed over from a macro to one of the base stations managed by the VRNC, the handset must be handed over first to one of the regular base stations 601, 602, 603, and from there it can be handed over to to any cell in the virtual zone. This is shown visually in the next figure and is referred to as two-stage mobility.

Figure 7:
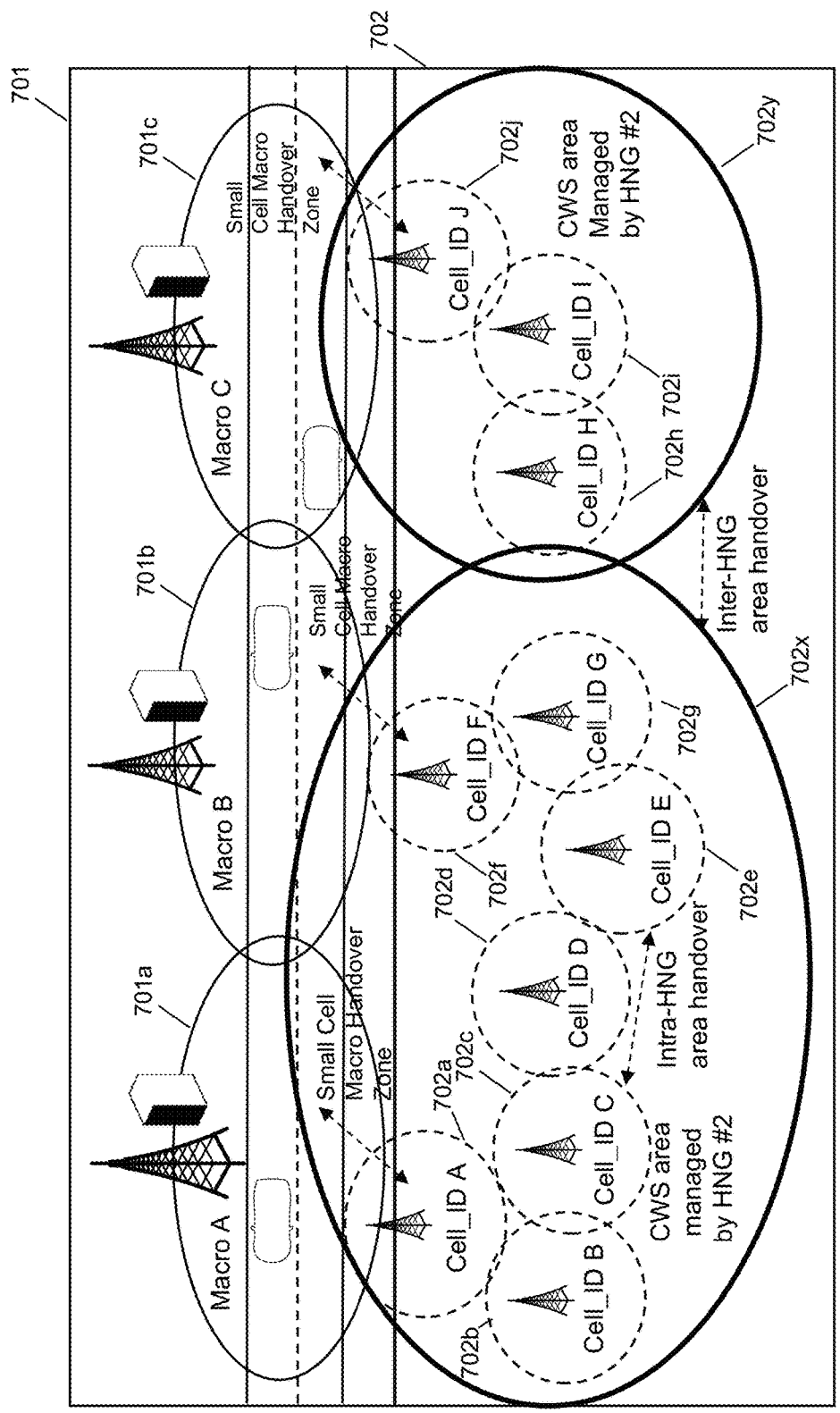
FIG. 7 is a schematic base station deployment topology diagram, in accordance with some embodiments.

FIG. 7 is a schematic base station deployment topology diagram, in accordance with some embodiments. Shown is a typical "Rural Deployment". In this type of deployment CWSs are used mainly for coverage augmentation (not for the data offload under the overlaying macro coverage). Current WCDMA release concentrates on "Rural" type of solution only. The cell IDs are different than shown in FIG. 6, but the figure reflects a similar type of deployment. The grouping method described with respect to this embodiment is applicable to both 3G and 4G (LTE), and either a 3G NodeB or a 4G eNodeB may be considered wherever a base station is shown in this figure. The method described is useful for deployment of small cells or for underlay of small cells under a macro coverage area.

Figure 10:
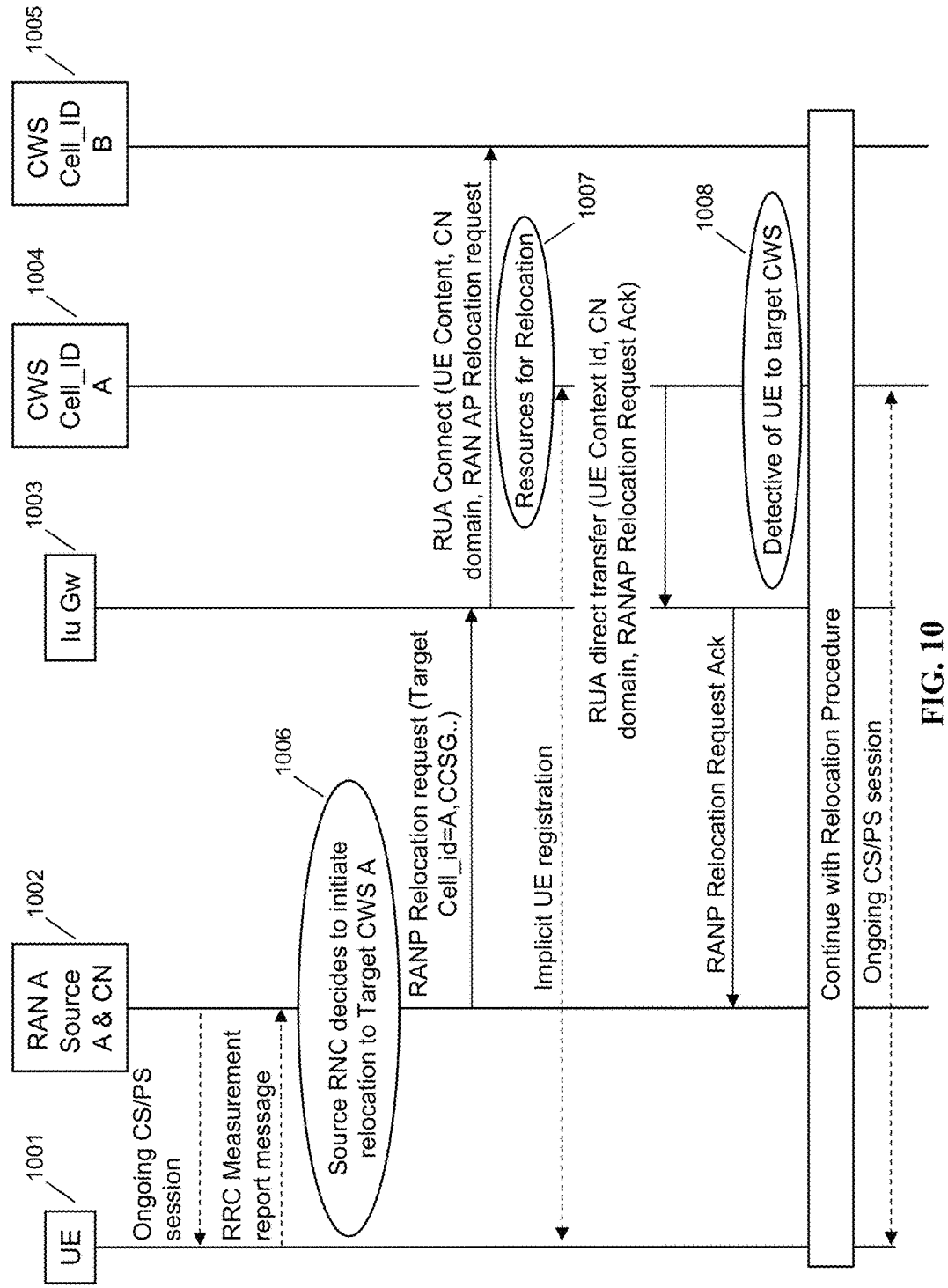
FIG. 10 is a signaling call flow showing a two-phase macro to rural zone mobility scenario, in accordance with some embodiments.

As shown in FIG. 7, not all Rural zone CWSs will have overlapping coverage with the Macro Zone, hence in order to support session continuity, two-phase mobility may be required as shown in this figure and also in FIG. 10. Hand-in from Macro to neighboring CWSes (for example hand-in between RAN A and CWS Cell_Id A. entering Rural zone) is a two-phase handover. HNG may be a VRNCGW or management gateway, and CWS may be a multi-RAT node, in some embodiments.

Macro zone 701 includes macro 801a, macro 80ab, and macro 801c, each providing coverage over a large area of a highway. The macro zone is created as a group in the VRNCGW or management gateway.

Rural zone 702 includes base stations 702a, 702b, 702c, 702d, 702e, 702f, 702g in HNG management area 702x, and base stations 702h, 702i, 702j in HNG management area 702y.

Handovers among the base stations shown in FIG. 7 fall into the following categories: small cell to macro handovers, to or from Rural Zone to Macro Zone; inter-small cell handovers within an HNG management area; and intra-HNG management area handovers. Each HNG management area 702x, 702y may appear as a single macro base station to the core network, in some embodiments, such that handovers between 702x and 702y are handled like regular handovers, with the two HNGs transparently identifying which cell the UE is in using the cell ID. For intra-HNG area handovers, any notification of the handover may be suppressed toward the core network, as from the perspective of the core network a handover between two intra-HNG cells does not result in the UE moving from one eNB (or NB) to another eNB (or NB).

For handovers to and from the macro network, the handover zone for, e.g., macro 701a only impinges on cell 702a. So the HNG will not permit a handover from the macro A to cells B, C, D, E, F, or G. This is a function of the coverage area of the cells. Otherwise handovers are handled normally. Various other rules can be set up so that handovers are permitted under only desirable conditions.

Groupings may be performed in the VRNCGW across G's, in some embodiments. For example, the rural zone may include both 3G and 4G cells, and handovers between them and a set of 3G macros in a macro zone may be handled according to the described method. Multiple groups per HNG management area may be used in some embodiments. Groupings may be made based on RF conditions, topological or geographical conditions, trains or highways or other features of the landscape leading to assumptions about user speed, or neighbor relation tables that relate to the topology of the graph of the cells' coverage areas, or other factors.

Operation and Call Flows

Figure 8:
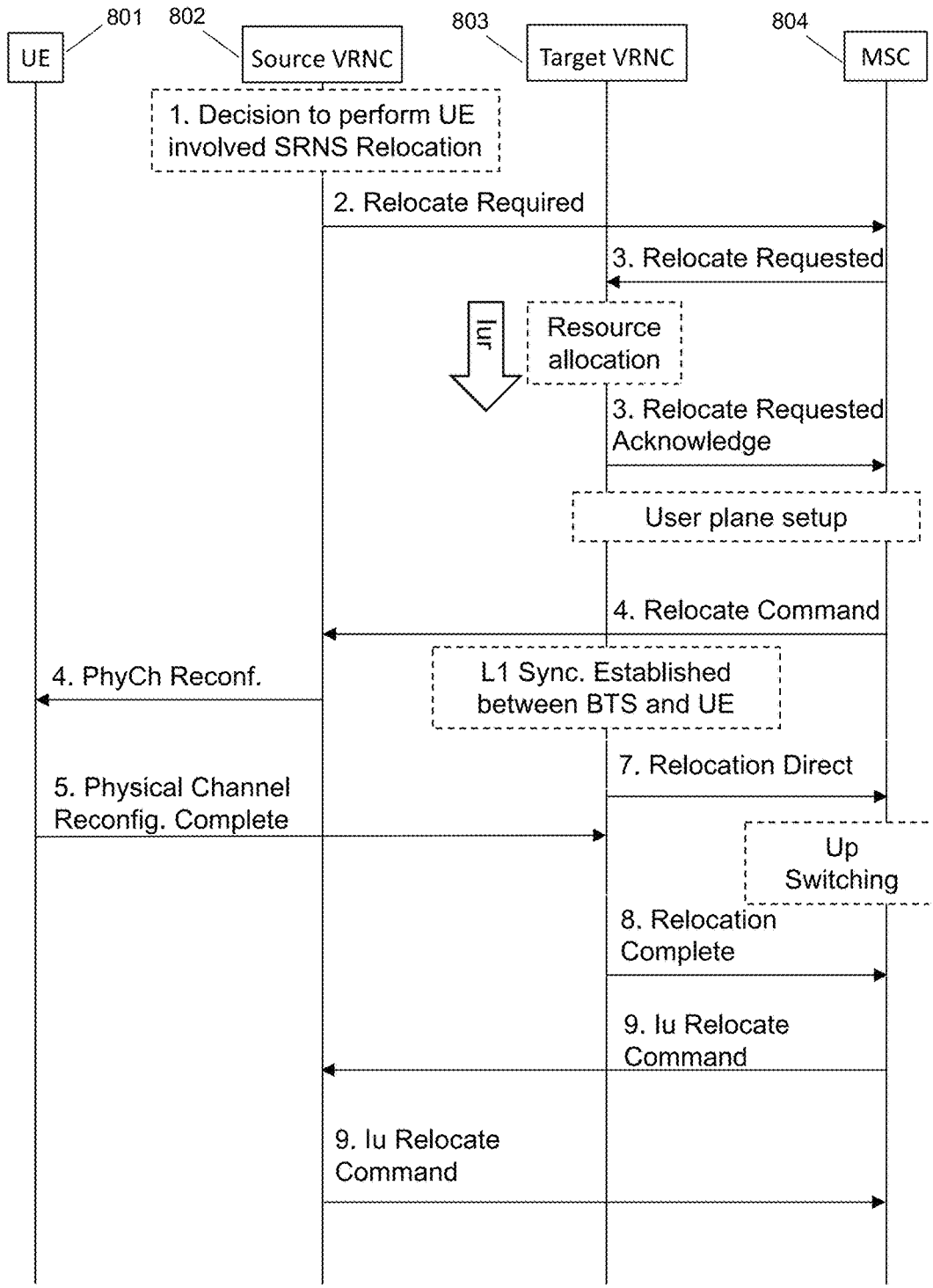
FIG. 8 is a signaling call flow showing a handover of a circuit-switched session at a gateway, in accordance with some embodiments.

FIG. 8 is a signaling call flow showing a handover of a circuit-switched session at a gateway, in accordance with some embodiments. UE 801 has moved from a first coverage area to a second coverage area, and attaches to a nodeB (not shown), which is controlled by source VRNC 802. Source VRNC 802 is a VRNCGW, as described herein, proxying and serving as a gateway for the nodeB to the 3G core network. The UE 801 requests to be handed over from its prior cell to this cell, and since this is a circuit-switched session, the relocation request is sent from the nodeB to the source VRNC 802 to the MSC 804 in the core network. The MSC 804 then sends a message to target VRNC 803, which is the VRNCGW handling the UE's prior cell. Handover proceeds in the same manner as described by the 3G standard; however, in some embodiments source VRNC 802 and target VRNC 803 are both VRNCGWs. In some embodiments source VRNC 802 may be handling a nodeB using the Iub interface, and target VRNC 803 may be handling a Home nodeB or a Parallel Wireless multi-RAT node using the Iuh interface, or vice versa. In some embodiments both base stations may be Iub or Iuh. In some embodiments, Iub and Iuh may be enabled by software or hardware modules at the same VRNCGW. In some embodiments, inter-RAT handovers or steering between 3G and 4G may be enabled by having 3G and 4G modules on the same VRNCGW.

Figure 9:
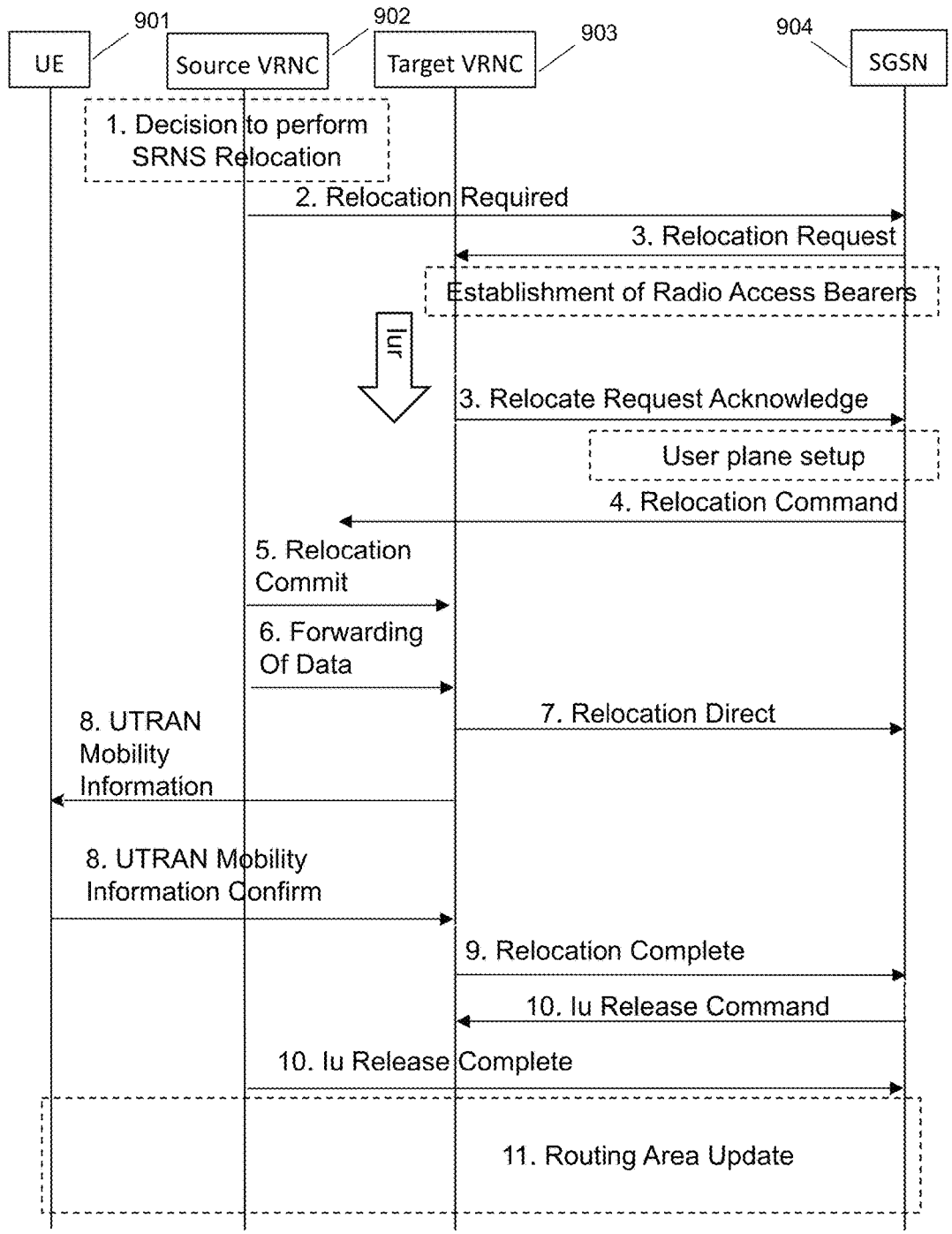
FIG. 9 is a signaling call flow showing a handover of a packet-switched session at a gateway, in accordance with some embodiments.

FIG. 9 is a signaling call flow showing a handover of a packet-switched session at a gateway, in accordance with some embodiments. UE 901 has moved from a first coverage area to a second coverage area, and attaches to a nodeB (not shown), which is controlled by source VRNC 902. Source VRNC 902 is a VRNCGW, as described herein, proxying and serving as a gateway for the nodeB to the 3G core network. The UE 901 requests to be handed over from its prior cell to this cell, and since this is a packet-switched session, the relocation request is sent from the nodeB to the source VRNC 902 to the SGSN 904 in the core network. The SGSN 904 then sends a message to target VRNC 903, which is the VRNCGW handling the UE's prior cell. Handover proceeds in the same manner as described by the 3G standard; however, in some embodiments source VRNC 902 and target VRNC 903 are both VRNCGWs. In some embodiments source VRNC 902 may be handling a nodeB using the Iub interface, and target VRNC 903 may be handling a Home nodeB or a Parallel Wireless multi-RAT node using the Iuh interface, or vice versa. In some embodiments both base stations may be Iub or Iuh. In some embodiments, Iub and Iuh may be enabled by software or hardware modules at the same VRNCGW. In some embodiments, inter-RAT handovers or steering between 3G and 4G may be enabled by having 3G and 4G modules on the same VRNCGW.

In some embodiments, the solution may support handins from Macro Zone according to section 5.9.4a of [1] (open access HNBs). For Connected Mode Inbound Mobility for CSG UEs to CSG HNBs or to Hybrid Cells: see section 5.9.2a of [1]; for Connected Mode Inbound Mobility for non-CSG UEs to CSG HNBs or to Hybrid Cells, see section 5.9.3a of [1] The handin solution implementation may be based on Parallel Wireless HNG supporting Macro-to-Femto (M2F) handin using the Fan-out approach for Relocation Request for pre-Rel-9 UEs (Macro-RNC can't identify target-Cell-id). For Enhanced Relocation from Open Access and Hybrid CWS (HNBs) to RNC—see section 5.11.2 of [1]; Enhanced Relocation from RNC to Open Access CWS (HNBs) see section 5.11.2.2 of [1]; Enhanced Relocation from RNC to Hybrid CWS (HNBs) see section 5.11.2.3 of [1].

FIG. 10 is a signaling call flow showing a two-phase macro to rural zone mobility scenario, in accordance with some embodiments. In this example, a handover is shown between the Macro Zone (RAN A) and the Rural Zone (CWS Cell_id A). The method described and shown in this figure relates to eNodeBs and LTE as well as to nodeBs and UMTS/3G, and also to any other "G" radio access technology.

UE 1001 is initially attached to macro nodeB A 1002, which is handled by an RNC in the core network (not shown). Also available are IuGW 1003 (a VRNCGW) and CWS base stations 1004 and 1005. CWS 1004 has cell ID A. CWS 1005 has cell ID B. Initially, UE 1001 is attached to macro 1002. However, upon performing measurement reports it becomes apparent that the signal of the macro is decreasing, and based on measurement reports, at step 1006 the source RNC (not shown) decides to initiate relocation to target CWS A 1004. Target CWS A 1004 is managed by IuGW 1003, that is, IuGW 1003 is acting as the RNC for this CWS. The source RNC (not shown) sends a RANP Relocation Request with the identified target cell's cell_id=A. As shown in step 1007, the CWS A allocates resources for the UE, and at step 1008, detects the presence of the UE in its coverage area. The rest of the handover proceeds normally per the 3G standard. The IuGW/VRNC acts as an RNC toward the source RNC, and also acts as an RNC toward CWS A 1004, to facilitate the handover.

Figure 11:
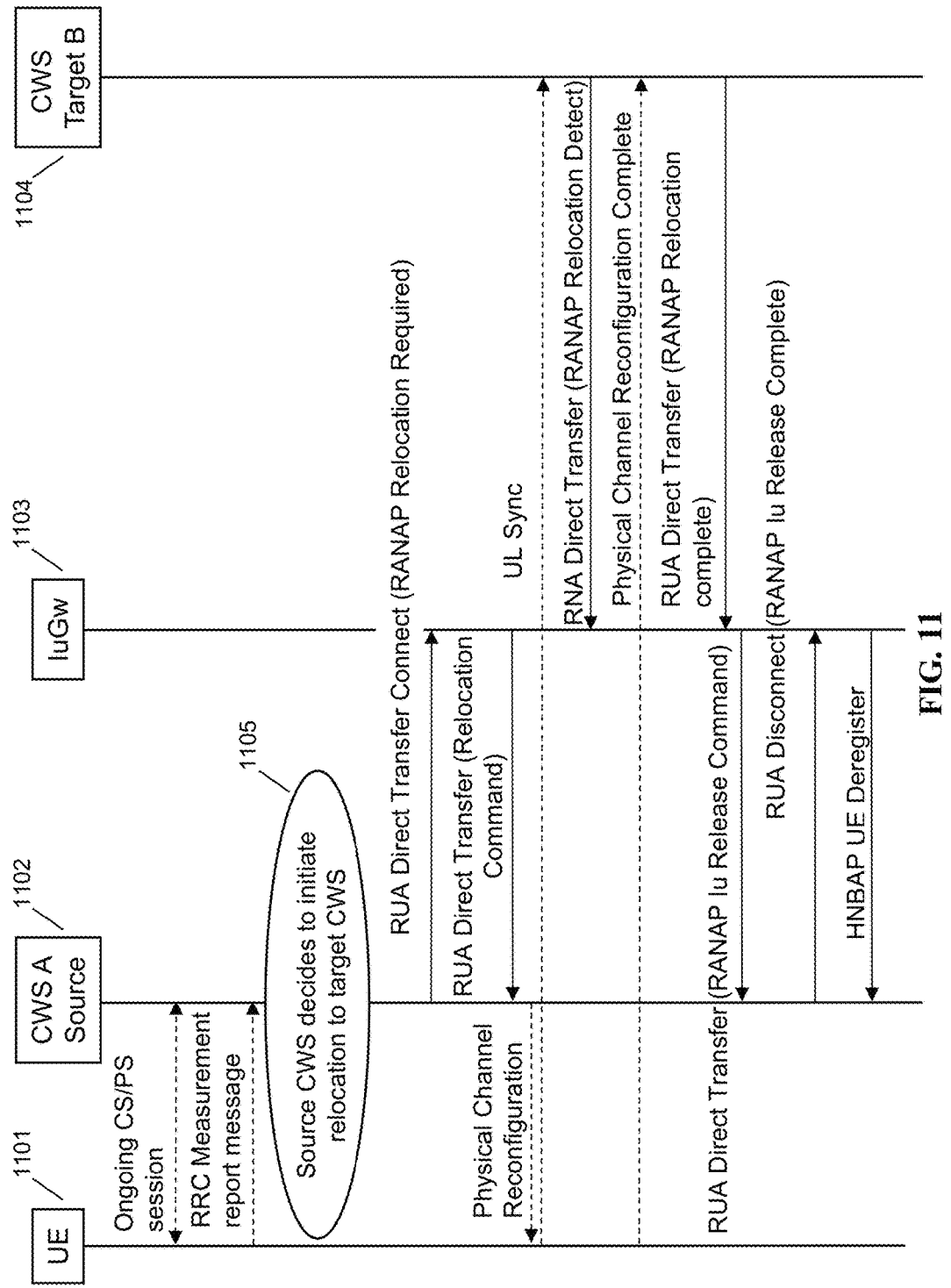
FIG. 11 is a signaling call flow showing an Iuh anchored rural to rural zone mobility scenario, in accordance with some embodiments.

FIG. 11 is a signaling call flow showing an Iuh anchored rural to rural zone mobility scenario, in accordance with some embodiments. FIG. 11 illustrates typical high level handover between the CWSs in the Rural Zone (for example from CWS Cell_id A to CWS Cell_id B). The method described and shown in this figure relates to eNodeBs and LTE as well as to nodeBs and UMTS/3G, and also to any other "G" radio access technology.

UE 1101 is initially attached to CWS A 1102, which is managed by IuGW 1103, which is a VRNCGW as described herein. Also available is CWS base station 1104, which is also managed by IuGW 1103. CWS 1102 has cell ID A. CWS 1104 has cell ID B. Initially, UE 1101 is attached to CWS 1102. However, upon performing measurement reports it becomes apparent that the signal of the macro is decreasing, and based on measurement reports, CWS 1102 decides to initiate relocation to target CWS B 1104. As according to the standard, the source CWS 1102 sends a RUA Direct Transfer Connect request to the IuGW 1103. The IuGW/VRNC does not need to contact the core network to facilitate the handover, but responds by simply replying with a RUA Direct Transfer relocation command to CWS 1102. Once the handover is completed, with a RANAP Relocation Complete message, the IuGW 1103 intercepts it and no message is sent to the core network. Further messages to the UE from the core network will be disambiguated and sent to CWS B. The HNBAP UE Deregister message from CWS 1102 is also intercepted and silenced, e.g., not sent to the core network.

Figure 12:
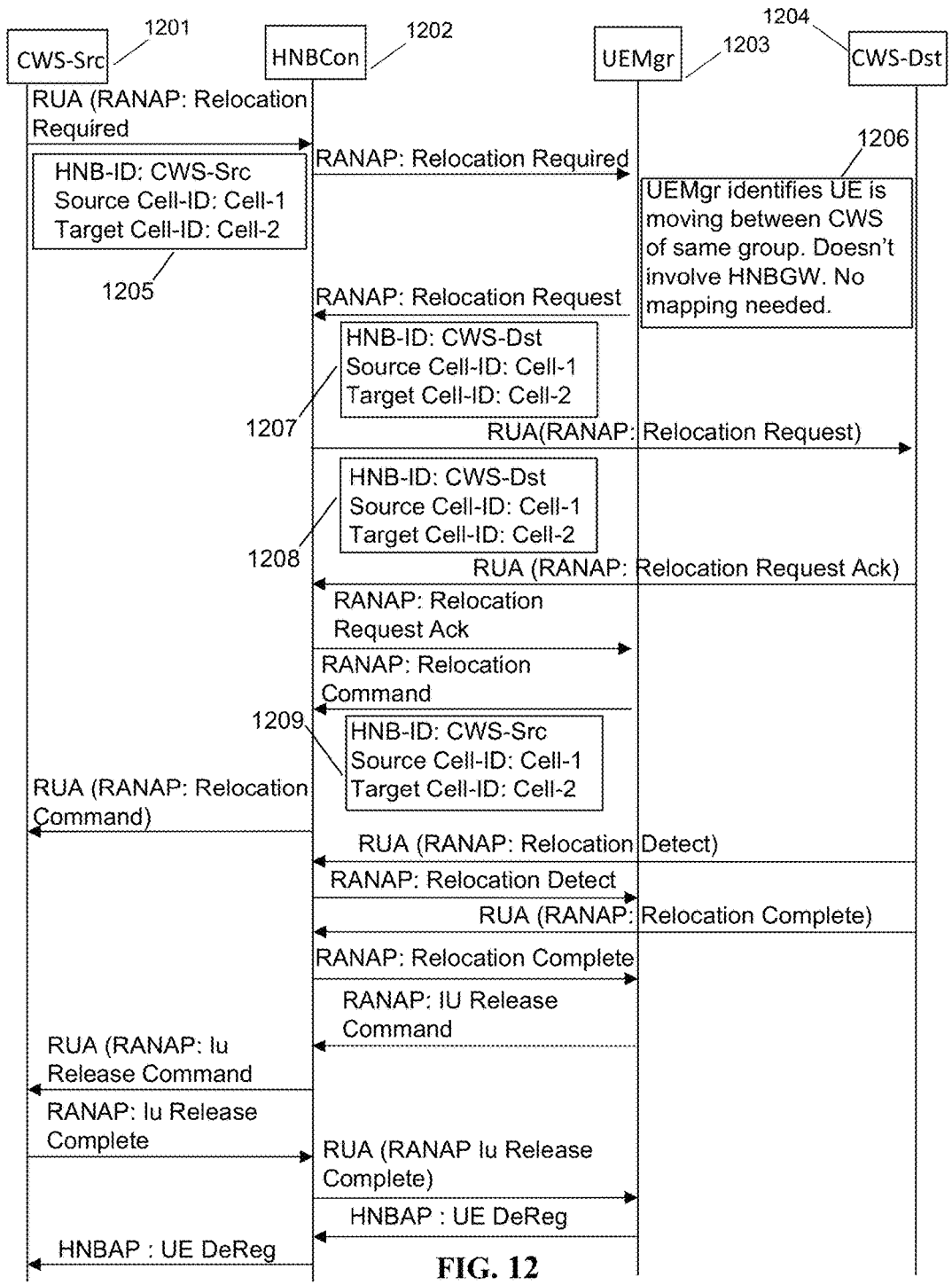
FIG. 12 is a signaling call flow showing additional aspects of a rural to rural zone mobility scenario, in accordance with some embodiments.

FIG. 12 is a signaling call flow showing additional aspects of a rural to rural zone mobility scenario, in accordance with some embodiments. Mobility between two CWS of same group—Internal Message Flow. Since the UE moves between CWS of same group, UEMgr doesn't map the CWS and Cell IDs. It maintains the mobility FSM states, but instead of involving external HNBGW it locally anchors the mobility. The FSM states for UE mobility between CWS of same group and different group will be different and it would need two set of FSM transitions.

CWS-Src 1201, which is a base station, is controlled by an HNG, represented by internal modules HNBCon 1202 and UEMgr 1203. At step 1205, a handover is requested to CWS-Dst 1204. At step 1206, the UEmgr is aware of the state and determines that no mapping is needed with the HNBGW because the two CWSes are in the same group. At step 1207, UEmgr 1203 replies with the relevant information for a RANAP relocation request, which is passed along by HnbCon 1208, and an additional RANAP relocation command is sent at step 1209. Relocation is completed without signaling to the core network.

Figure 13:
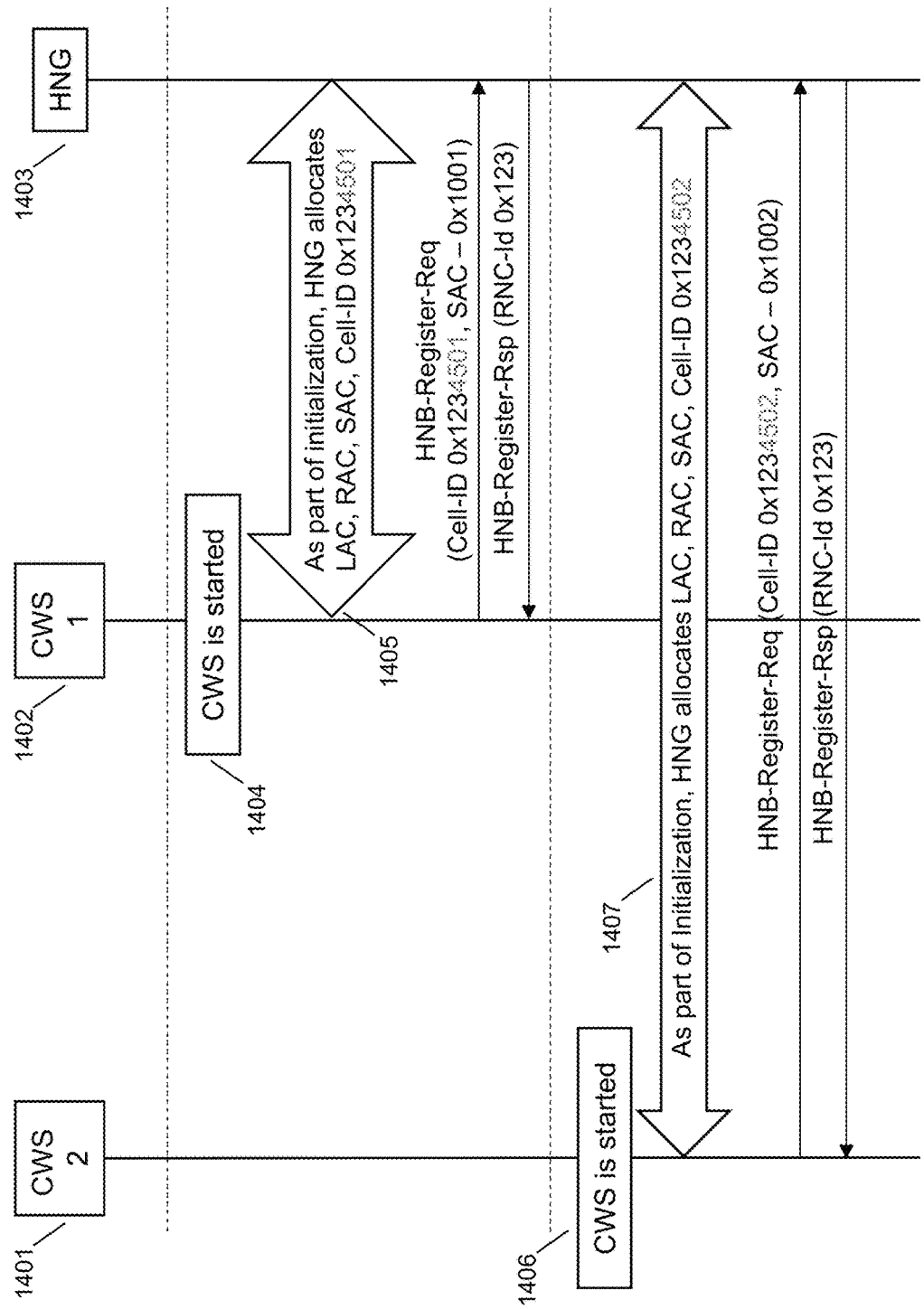
FIG. 13 is a signaling call flow showing base station registration, in accordance with some embodiments.

FIG. 13 is a signaling call flow showing base station registration, in accordance with some embodiments. CWS-2

1301 and CWS-1 1302 are connected to HNG 1303, which is a VRNCGW as described herein. CWS-1 is started first, step 1304, and as part of initialization requests identifiers, e.g., LAC, RAC, SAC, and cell ID from the HNG, step 1305. It receives CellId 0x1234501. Next, CWS-2 is started, at step 1306. When it initializes and requests identifiers, at step 1307, it receives a different cell ID, CellId 0x1234502, which is used thereafter to distinguish the cell at the HNG.

Figure 14:
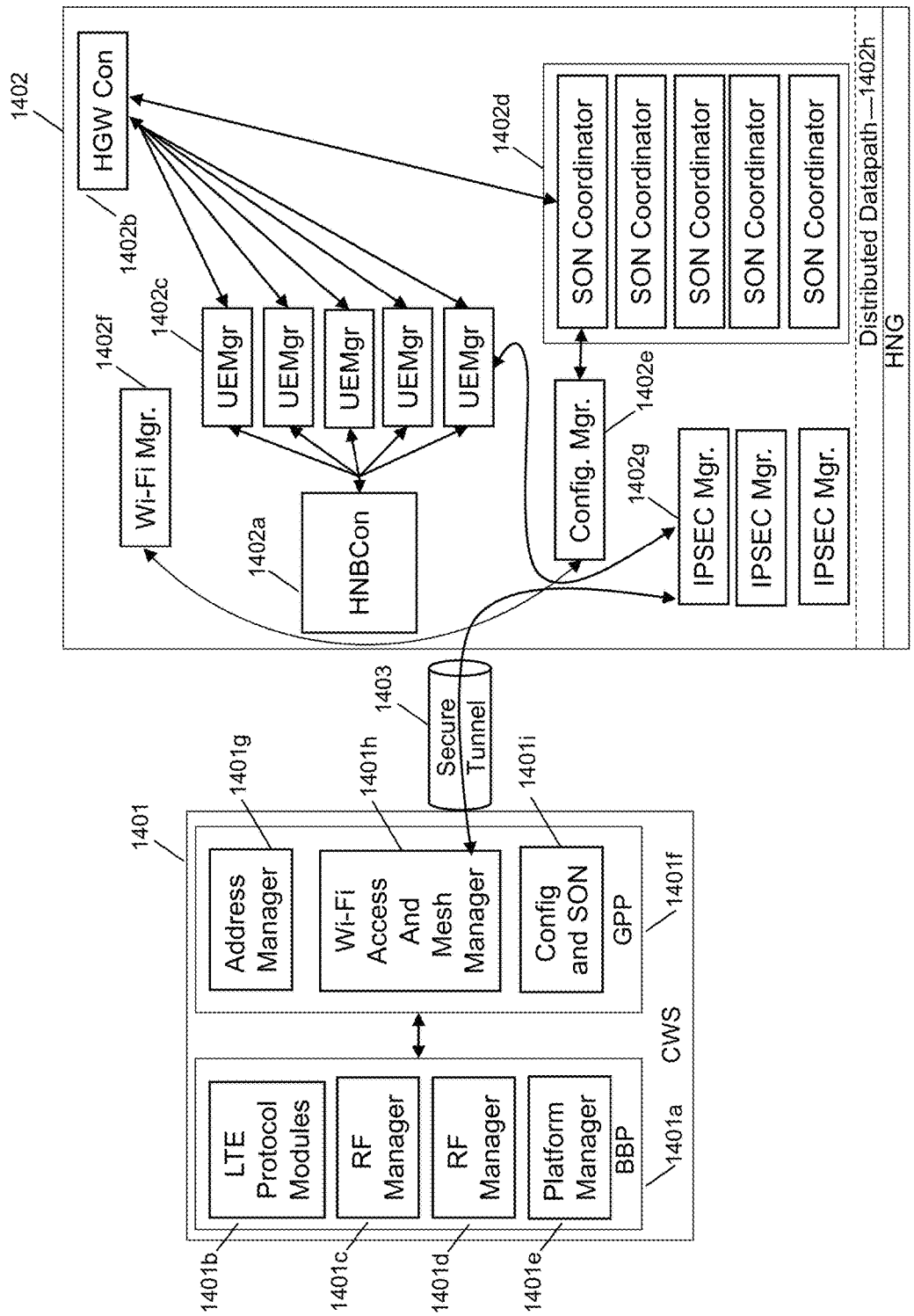
FIG. 14 is a schematic architecture diagram of an exemplary base station together with an exemplary gateway, in accordance with some embodiments.

FIG. 14 is a schematic architecture diagram of an exemplary base station together with an exemplary gateway, in accordance with some embodiments. Exemplary CWS base station 1401 includes LTE protocol modules 1401b, RF manager 1401c, OAM manager 1401d, and platform manager 1401e, each of which is managed as part of a baseband processing (BBP) module 1401a. Additionally, address manager 1401g, Wi-Fi access and mesh manager 1401h, and Config/SON module 1401i are part of a general purpose processing (GPP) module 1401f. A single IPsec secure tunnel 1403, in some embodiments, connects the CWS to the HNG 1402. HNG 1402 includes a Home NodeB manager 1402a, core network module/HGWcon 1402b, UE managers 1402c, SON coordinators 1402d, config manager 1402e, Wi-Fi manager 1402f, and IPsec managers 1402g. The modules are all stateful and share data with each other. Multiple instances of each module are present, each with a connection to a distributed control path 1402h.

The gateway has the following characteristics: distributed control plane across multiple cores; distributed data path across multiple cores; no single point of failure for control and data processing; throttling to limit traffic on a core; IP access control lists (ACLs) (static or dynamic or both); dynamic ACLs using an algorithm to detect a source IP sending invalid ISAKMP_INIT.

HNBCon and HGWCon interacts directly without UEMgr for non UE related messages like Reset, Paging, etc. When UE is handed off, mobility FSM states are maintained by UEMgr. HGWCon would have less intelligence about the CWS locations and mapping. It maintains the states of HNB connection towards HNBGW and in a crude sense acts as a pipe towards external HNBGW. This process may be replaced with a full-fledged HGW process in some embodiments. HNBCon will maintain HNB FSM states, UEMgr will maintain HNB-UE FSM, IU FSM, RAB FSM states and HGWCon will maintain HNB FSM for HNBGW interface. Neighbor table will be maintained by SON and it will be used for allocating cell id related information.

RUA Connect Forking

In some embodiments, a PCI conflict may occur when two CWSes have the same cell ID, in this case shown as Cell_id A. The IuGw may gracefully handle the conflict by forking the RUA connect request. This results in both CWS A's being requested to hand in the UE. However, only the CWS with coverage in the physical region of the UE will be able to successfully respond to the request, and the other forked RUA connect will fail without negatively impacting hand-in.

In some embodiments, when a PCI conflict is detected, a handover request may be forked. Specifically, the handover request may be sent from the source cell to all cells known to the source cell that have that PCI. Two or more handover requests, then, may be created. However, only one handover request will ultimately be met/satisfied, because the receiving cell will determine either that the cell does contain the UE identified in the request and return a handover acknowledgement message, or that the cell does not contain the UE identified in the request and will fail and/or not return a handover acknowledgement message. The handover request may be sent either via X2 or S1, in some embodiments.

In small cell deployments there is a high probability of the PCI reuse—similar to PCI conflict—although PCI conflict normally means small cells are close and there is a problem with UE sync up. So in case of the PCI reuse core network becomes confused on the reported target handover cell site, as it doesn't know any better than PCI (physical cell id) reported by UE. One commonly deployed method—network gets Global Cell Id (CGI) report from UE and uses global cell id instead of PCI to resolve ambiguity—CGI is unique. Here a different and alternative method is proposed—we fork the handover message to all PCI (in case of ambiguity) and wait for one the CWS (can be third party as well we don't care) returning acknowledge. As soon as we get it, we continue with the handover towards this specific small cell and drop other initiated handover sessions.

Further embodiments are contemplated. For example, algorithms for determining the intent of a user are contemplated, thereby enabling the network to determine whether hand-in is desired. As another example, an algorithm based on the path vector, OSPF path vector, or determined UE speed may be used for determining UE motion. As another example, admission priority may be influenced by one or more parameters. As another example, hand-in to a small cell may be rejected by immediately handing back to a macro, based on hand-in parameters. As another example, thresholds, such as reporting thresholds, cell selection thresholds, and handover thresholds, may be monitored and set to reduce undesirable hand-ins. As another example, the control plane for the UE may be anchored at the macro, while some hand-overs are handled transparently via the IuGw. As another example, a macro overlay network, wherein a macro cell has coverage co-extensive with the coverage area of the small cells, may be configured with different hand-in parameters, such as minimal small cell hand-in. As another example, topology gaps may be preconfigured to disallow handovers, such that if a network identifies the direction of travel of a UE as entering a small cell gap in coverage, handover from the macro is disallowed from certain source small cells or from the macro. Forking may involve creating more than one copy, in some embodiments.

Figure 15:
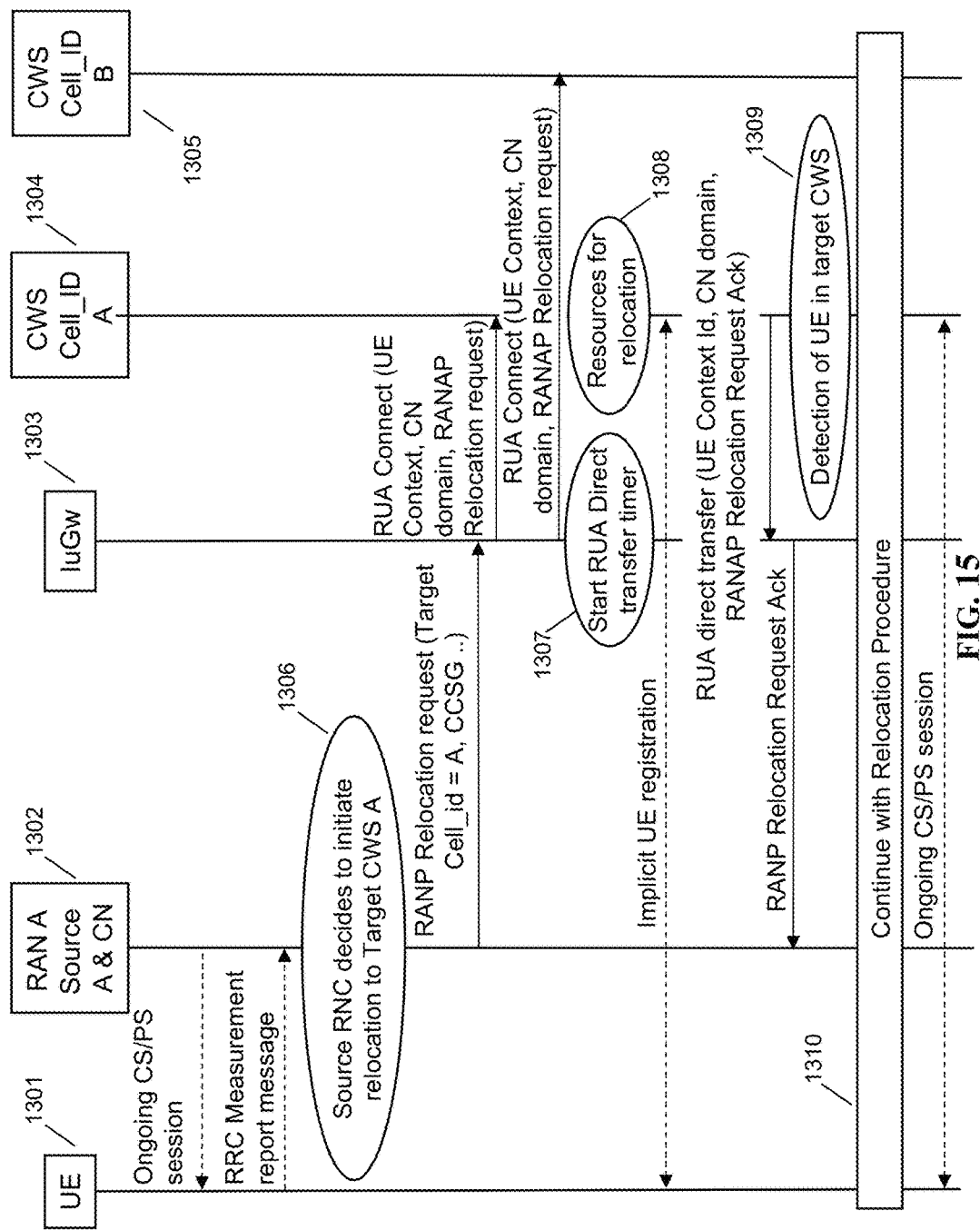
FIG. 15 is a signaling call flow showing hand-in with call connect message forking, in accordance with some embodiments.

FIG. 15 is a signaling call flow showing handin with call connect message forking, in accordance with some embodiments. UE 1501 is connected to macro RAN 1502, which is connected to a core network (not shown), and through IuGW 1503 to CWS Cell A 1504 and CWS Cell A 1505, both of which have the same Cell ID. At step 1506, the source cell initiates relocation. This results in a RANP Relocation Request being sent to the IuGW. The IuGW does not know which CWS is being requested, and as a result forks the request by sending a copy of the RUA connect request to each of cells 1504 and 1505. At step 1507, the IuGW starts a transfer timer. At step 1508, cell A allocates resources for the UE and at steps 1509 and 1510, the handover proceeds normally. By the operation of the handover and by cell 1504 returning messages, IuGW 1503 becomes aware that the UE is in cell 1504.

RTP Localization

The Real-time Transport Protocol (RTP) is a network protocol for delivering audio and video over IP networks. RTP is used extensively in communication and entertainment systems that involve streaming media, such as telephony, video teleconference applications, television services and web-based push-to-talk features. RTP is one of the technical foundations of Voice over IP (VoIP), and in this context is often used in conjunction with a signaling protocol such as the Session Initiation Protocol (SIP) which establishes connections across the network.

In some embodiments, RTP flows may be directed from one endpoint to another endpoint within the control of the Parallel Wireless HNG, without requiring a session border controller to identify the need for, and provide, hairpin routing. The problem that exists in some situations is that 3G calls require a session border controller even when the call is locally terminated. However, by providing this functionality at the edge of the network, the network may achieve better latency and other advantages.

The edge of network node may be the CWS or the Parallel Wireless HNG/Parallel Wireless HNG. The Parallel Wireless HNG/Parallel Wireless HNG may perform functions including endpoint lookup of call recipient within local area based on phone number; redirection of 3G call audio to call recipient over RTP within a zone; and call termination. No MSC need be involved. The call may be packet-switched or circuit-switched. The call can be a CSFB call; it may be terminated as CS by the CWS at either end of the call. Depending on the location of the edge of network node, this function may be performed within a group, across groups, or within a single CWS. Lawful intercept, 3-way calling, hold, conferencing, etc. may be managed by the Parallel Wireless HNG. The advantages may include lower call establishment latency, (lower call latency?), less load at upstream nodes, higher throughput, reduced backhaul requirements, and improved voice quality as a result of the above.

Figure 16:
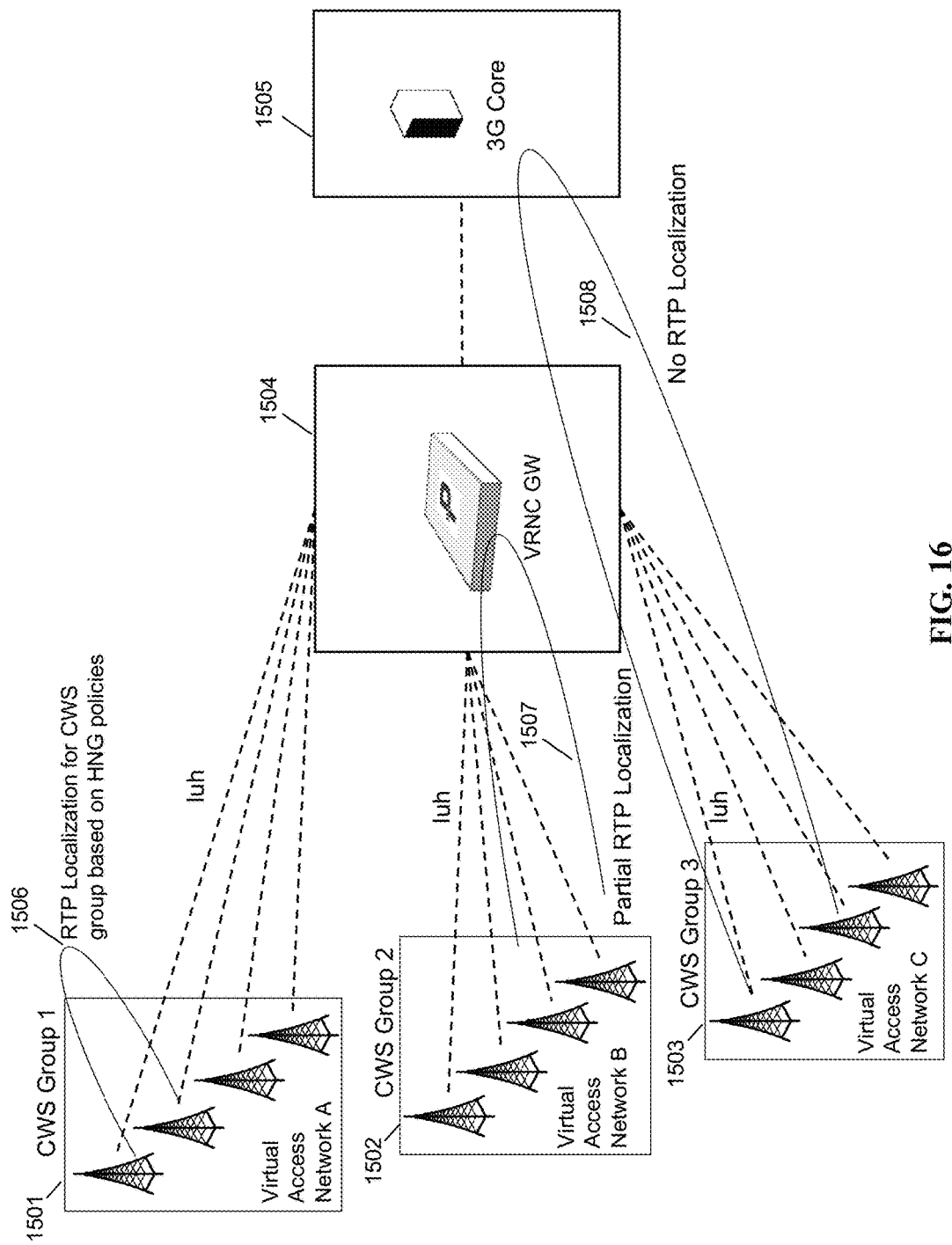
FIG. 16 is a schematic network architecture diagram showing RTP localization, in accordance with some embodiments.

FIG. 16 is a schematic network architecture diagram showing RTP localization, in accordance with some embodiments. CWS group 1/Virtual access network A 1601 is a group of CWSes managed by HNG 1604. CWS Group 2/Virtual access network B 1602 is another such group, as is CWS Group 3/Virtual access network C 1603. Also provided is 3G core 1605, which is in communication with HNG 1604. The HNG 1604 is an RNCGW and provides IuGW services. The HNG has an RTP localization policy, which is enforced at the HNG. During CS call setup, the HNG determines the need for RTP localization and instructs the CWS by changing IP and port. Complete RTP localization 1606 (the CWSes are directed to communicate directly without going through the HNG), partial RTP localization 1607 (through the HNG), or no RTP localization 1608 (through the core) is detected as a possible condition and enforced at the HNG. Detection may be based on CWS groups, whether the cell ID is the same, whether the target is managed by the same HNG, or other factors. Further discussion of RTP localization appears below.

Figure 17:
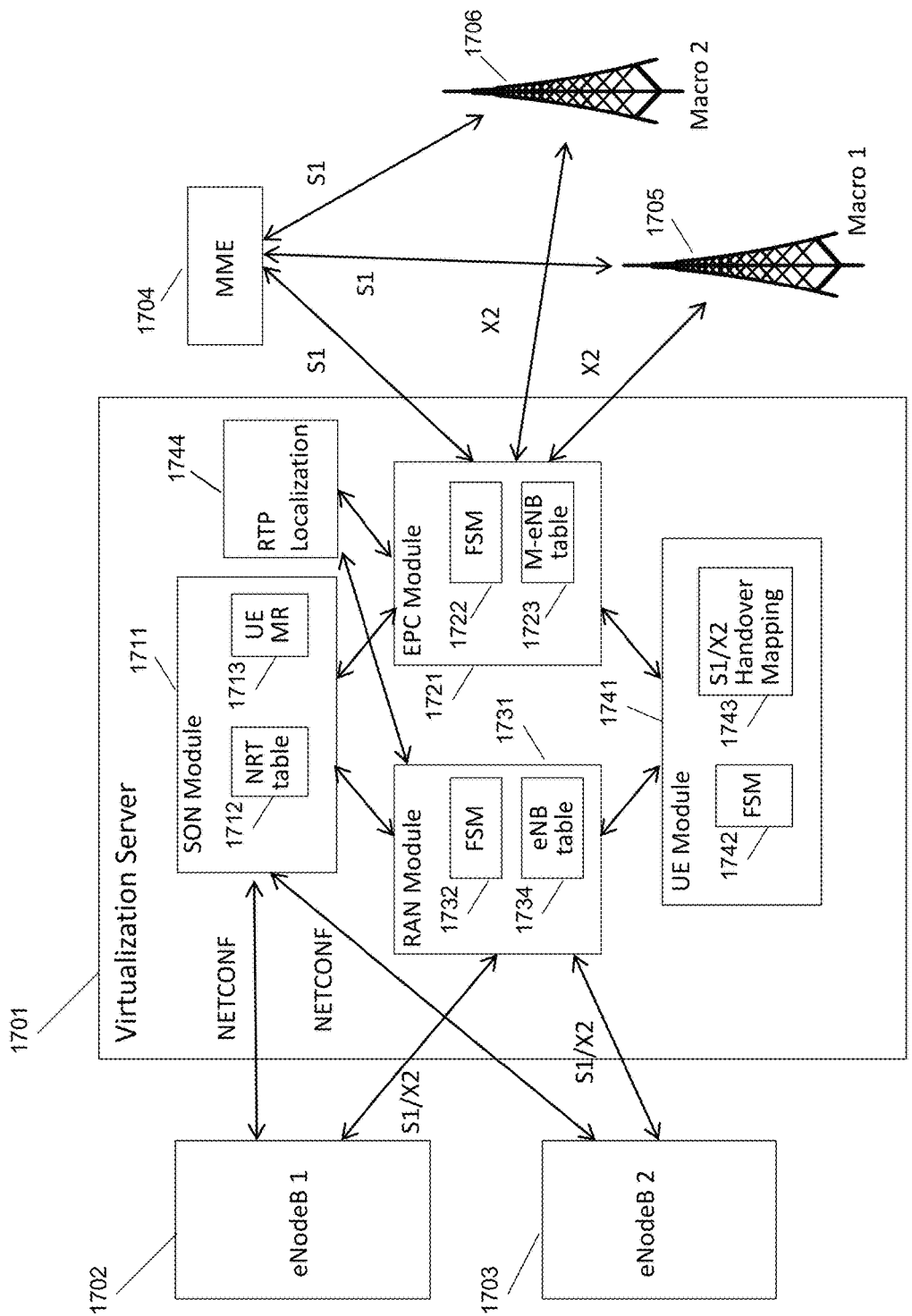
FIG. 17 is a schematic architecture diagram of an exemplary gateway, in accordance with some embodiments.

FIG. 17 is a schematic diagram of a base station management gateway in a Long Term Evolution (LTE) architecture, in accordance with some embodiments. Base station management server 1701 provides services to, and is coupled to, eNodeB 1 1702 and eNodeB 17 1703, on a RAN side of a network (i.e., inside of the gateway). Base station management server 1701 provides services to, and is coupled to, MME 1704, macro eNodeB 1705, and macro eNodeB 1706, on a core network side of the network (outside of the gateway). Base station management server 1701 corresponds to LAC 110, in some embodiments.

Within base station management gateway 1701 are self-organizing network (SON) module 1711, containing neighbor relation table (NRT) 1712 and UE measurement report processing module 1713; evolved packet core (EPC) module 1721, containing EPC finite state machine module 1722 and macro eNodeB table 1723; radio access network (RAN) module 1731, containing eNodeB finite state machine module 1732 and eNodeB table 1734; and user equipment (UE) module 1741, containing UE finite state machine module 1742 and S1/X2 handover mapping table 1743. Each of modules 1711, 1721, 1731, and 1741 are coupled to each other within base station management gateway 1701, and may execute on one or more shared processors (not shown) coupled with memory (not shown).

In some embodiments, SON module 1711 may perform NRT maintenance, load information processing and fractional frequency reuse (FFR) processing; RAN module 1731 may perform X2 association management with eNodeBs 1702, 1703; EPC module 1721 may perform X2 association management with macro eNodeBs 1705, 1706; and UE module may perform X2 handover and S1/X2 translation between eNodeBs 1702, 1703 and macro eNodeBs 1705, 1706. All the above managers/modules interact with each other to accomplish the assigned functionality.

Figure 18:
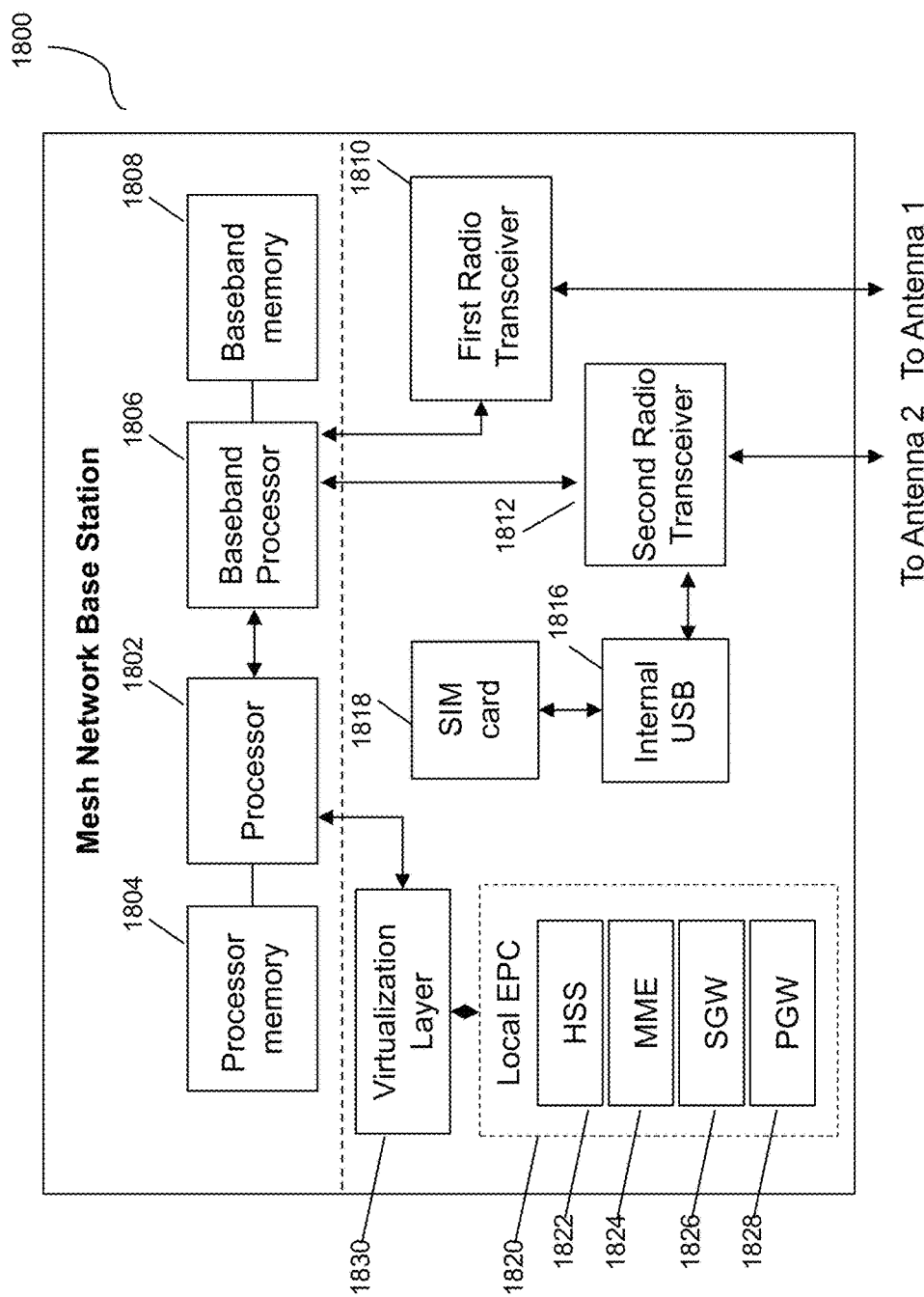
FIG. 18 is a schematic architecture diagram of an exemplary base station, in accordance with some embodiments.

FIG. 18 is a schematic diagram of a mesh network base station, in accordance with some embodiments. Mesh network base station 1800 may include processor 1802, processor memory 1804 in communication with the processor, baseband processor 1806, and baseband processor memory 1808 in communication with the baseband processor. Base station 1800 may also include first radio transceiver 1810 and second radio transceiver 1812, internal universal serial bus (USB) port 1816, and subscriber information module card (SIM card) 1818 coupled to USB port 1814. In some embodiments, the second radio transceiver 1812 itself may be coupled to USB port 1816, and communications from the baseband processor may be passed through USB port 1816.

A virtualization layer 1830 may also be included for mediating communications with an evolved packet core EPC, specifically including the core network EPC (not shown) and local evolved packet core (EPC) module 1820. Local EPC 1820 may be used for authenticating users and performing other EPC-dependent functions when no backhaul link is available. Local EPC 1820 may include local HSS 1822, local MME 1824, local SGW 1826, and local PGW 1828, as well as other modules. Local EPC 1820 may incorporate these modules as software modules, processes, or containers. Local EPC 1820 may alternatively incorporate these modules as a small number of monolithic software processes. Virtualization layer 1830 and local EPC 1820 may each run on processor 1802 or on another processor, or may be located within another device.

Processor 1802 and baseband processor 1806 are in communication with one another. Processor 1802 may perform routing functions, and may determine if/when a switch in network configuration is needed. Baseband processor 1806 may generate and receive radio signals for both radio transceivers 1810 and 1812, based on instructions from processor 1802. In some embodiments, processors 1802 and 1806 may be on the same physical logic board. In other embodiments, they may be on separate logic boards.

The first radio transceiver 1810 may be a radio transceiver capable of providing LTE eNodeB functionality, and may be capable of higher power and multi-channel OFDMA. The second radio transceiver 1812 may be a radio transceiver capable of providing 3GPP WCDMA functionality. Both transceivers 1810 and 1812 are capable of receiving and transmitting on one or more bands. In some embodiments, transceiver 1810 may be capable of providing both LTE eNodeB and LTE UE functionality, and transceiver 1812 may be capable of UMTS BTS functionality, UMTS UE functionality, or both. The transceivers may be switched. Transceiver 1810 may be coupled to processor 1802 via a Peripheral Component Interconnect-Express (PCI-E) bus, and/or via a daughtercard. As transceiver 1812 is for providing LTE UE functionality, in effect emulating a user equipment, it may be connected via the same or different PCI-E bus, or by a USB bus, and may also be coupled to SIM card 1818.

SIM card 1818 may provide information required for authenticating the simulated UE to the evolved packet core (EPC). When no access to an operator EPC is available, local EPC 1820 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1800 is not an ordinary UE but instead is a special UE for providing backhaul to device 1800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1810 and 1812, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1802 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1802 may identify the appropriate network configuration, and may perform routing of packets from one network interface to another accordingly. Processor 1802 may use memory 1804, in particular to store a routing table to be used for routing packets. Baseband processor 1806 may perform operations to generate the radio frequency signals for transmission or retransmission by both transceivers 1810 and 1812. Baseband processor 1806 may also perform operations to decode signals received by transceivers 1810 and 1812. Baseband processor 1806 may use memory 1808 to perform these tasks.

RTP Localization

As noted above, when a voice call is established from one mobile subscriber to another mobile subscriber, even though both the mobile subscribers are camped on to the same base station or NodeB, the signaling and RTP messages flow between mobile subscribers and mobile operators' core networks via base station, radio network controller using wired or wireless backhaul system. This causes inefficient use of a backhaul bandwidth and blocking of various types of resources at radio network controllers and core networks causing inefficient use of a backhaul bandwidth and blocking of various types of resources at radio network controllers and the mobile operators' core network. As the foregoing illustrates, an approach that would require only the signaling messages to flow between mobile subscribers and the mobile operators' core network while RTP messages are switched locally at the base station or NodeB where a calling and called mobile subscribers are camped on to the same base station or NodeB. The approach would save the backhaul bandwidth by not transmitting RTP packets from the base station or NodeB to the mobile operators' core networks over wired or wireless backhaul system.

As the foregoing illustrates, an approach that would allow only the signaling path from a UE1 and UE2 to the mobile operator's core network through the base station or NodeB, the wired or wireless backhaul system and the coordinating server or gateway when the UE1 and the UE2 are latched on the same base station when the voice call between them is initiated and established. The approach would allow RTP packets to be switched locally at the base station and saving the backhaul bandwidth by not transmitting RTP packets from the base station to the mobile operator's core network via the wired or wireless backhaul through the coordinating server or gateway.

Advantageously, the disclosed technology provides techniques for switching RTP packets locally at a base station when a calling and a called user equipment are latched to the same base station. As a result, wired or wireless backhaul bandwidth from the base station to a coordinating server or gateway, and resources at a mobile operator's core network are available for other subscribers or operations.

The following references are hereby incorporated by reference in their entirety: UTRAN Overall Description—3GPP TS 25.401 V8.2.0 (2008-12) [1]; UTRAN Architecture for 3G Home Node B—3GPP TS 25.467 V.8.10 (2009-03) [2]; 3GPP TS 29.281 GPRS Tunneling Protocols—User Plane (GTP-U) [3]; 3GPP TS 29.060 GPRS Tunneling Protocol [4]; 3GPP TS 25.413 RANAP Signaling [5]; 3GPP TS 23.003 Numbering, Addressing and Identification [6]; 3GPP TS 25.468—UTRAN Iuh Interface RANAP User Adaption (RUA) Signaling [7]; 3GPP TS 25.469—UTRAN Iuh Interface RANAP User Adaption (HNBAP) Signaling [8]; RFC 3868—Signaling Connection Control Part User Adaption Layer (SUA) [9]; 3GPP TR 29.903—Feasibility Study on SS7 signaling transport in the core network with SCCP-User Adaption Layer (SUA) [10]; 3GPP TS 25.304—User Equipment (UE) procedures in idle mode and procedures for cell reselection in connected mode [11]; RFC 1889—RTP: A Transport Protocol for Real-Time Applications [12].

High Level Voice Call—RTP Localization Feature

The Parallel Wireless solution supports RTP localization for the voice calls between the UE's connected to the same base station (NodeB) or the different base stations (connected to each other using Satellite Mesh) managed by the same coordinating server. The coordinating server has signaling and RTP visibility for every voice call. If this feature is configured on the coordinating server and it determines that the voice call is between the UE's connected to the same base station, it will instruct the base station to handle the RTP traffic locally between the UE's and not to send the RTP traffic to the MSC or a core network. The signaling for the voice call will continue to be handled by the MSC.

In a RTP localized call with two UE's camped on to the same base station and managed by a coordinating server, the coordinating server may employ the following methods to provide RTP localization feature. The coordinating server or a virtualizing server 1701 shown in FIG. 17 may also include RTP Localization module 1744 to provide RTP localization feature at a base station or a mesh network base station 1800 shown in FIG. 18 supports multi-RAT including 2G/3G/4G/Wi-Fi/LTE.

Call Correlation

Call Correlation within Same Cell Id.

Coordinating server has to identify the origination and termination leg for the call to be able to handle the RTP traffic locally. The default GSM Setup message does not have any unique identifier across the call legs. With this limitation, a possible approach for call correlation is discussed below. The unique identifier, call correlation-id, can be generated using any combination of calling party address, called party address, calling party IMSI, date and timestamp of the call origination, base station radio access network (RAN) identifier etc. so that when the call correlation-id sent to the core network, if the same call correlation-id is retrieved from a network setup message from the core network, the coordinating server can associate the originating and terminating leg of the call.

Call Leg Correlation Using User-User IE

A call correlation-id may be generated at the coordinating server using the information from the originating leg. Based on the presence of the id in the message from a core network, the originating and terminating leg can be identified. The id generated may be encoded in the User-User IE in the setup message. The purpose of the user-user information element is to convey information between the mobile station and the remote user. This may be used to pass the correlation-id across the call legs. This id may be removed while forwarding the message towards UE.

MSC can support sending the User-User IE in the CC setup message in the terminating leg. In the case, where the MSC does not support User-User IE in the CC setup message, the MSC can bypass a check for the subscribers so that the User-User IE can be sent from the originating leg to the terminating leg over the core network.

Call Leg Correlation Using IMSI-MSISDN Mapping

Call correlation can also be achieved using IMSI and MSISDN association. When a UE registers with the coordinating server, the coordinating server upon successful registration may create and association between IMSI of the registered UE and MSISDN of the registered user. IMSI identifies the base station, the user is camped on currently, while MSISDN is used during mobile originated and mobile terminated call setup. The coordinating server may query a provisioning server or a HLR in the core network to get the MSISDN information.

Call Leg Correlation Using RTP Dynamic Payload

Call correlation can also be achieved dynamic payload RTP payload type. The call correlation-id between the originating and terminating leg can be exchanged using CSRC list in the RTP header. CSRC list identifies the contributing sources for the payload contained in the packet and SSRC identifies all sources that were mixed together create a packet and allows the correct source indication at the receiver. After the call is connected, the coordinating server may add CSRC in the RTP packet to the core network. When the coordinating server receives the RTP packet back from the core network for the terminating leg, based on the CSRC value, the coordinating server may determine that a originating and a terminating base station for this voice call is same and RTP streams needs to be switched locally. The coordinating server therefore initiates RAB Modification procedure as described below.

Other

Comfort Noise generation from the coordinating server can be using a different SSRC. MSC should be capable of processing audio with multiple SSRC streams.

Jitter Buffer Management can be added to base station. If the RTP frames with multiple SSRC is presented to base station, it will be able to play the RTP stream.

There may be a loss of initial RTP Payload during enabling and disabling RTP Localization.

RAB Modification

In certain scenarios, RAB modification may be needed for a RTP localized call. RAB modification may be initiated from a core network for the originating leg by sending RAB assignment request to a base station in a RTP localized call from a core network (CN) through the coordinating server. Exchange of transport network layer (TNL) address for RTP port requires RAB assignment request from the core network contains a CN IP and port; and the response message received at the coordinating server from the base station contains base station's IP and port number. The coordinating server sends its own IP and port to the CN and the base station.

Similarly, for a terminating leg, RAB modification process may be implemented as described above.

A node in the network where RTP localization can be performed is not limited to the base station only. RTP stream can be switched at the coordinating server as well once the origination and terminating legs are identified.

RTP localization may be implemented with switching RTP streams or using a RTP Proxy.

UE Mobility

When a UE in a RTP localized call moves to a different base station managed by a different coordinating server causing handover, or handout to Macro/coordinating server/HNBGW, RTP localization function may be revoked. Similarly, in a hand-in case from Macro/coordinating server/HNBGW, RTP localization functionality may not be enabled after UE hand-in for the current call. New calls after hand-in may be provided RTP localization in accordance with various policies.

Supplementary Services

For call related supplementary service procedures during the active state of a call, the FACILITY message is used for the exchange of the Facility information elements. The RTP Localization function will be revoked for call related supplementary procedures. It may not be applicable for all supplementary services like—Call Forwarding, Line Identification etc.

Call Hold

First an active call is setup between two UEs (UE1 & UE2) in the same base station BS-1.

Now for the active call UE1 is trying to place the call on hold. HOLD, HOLD Acknowledge messages are exchanged between UE1 and a core network. Now UE2 is notified about the call hold status using a FACILITY message. The FACILITY message contains the status as Call Hold.

Once the call is put on hold, the coordinating server may update the base station about the transport layer change using the Transport Network Layer (TNL) Update Request. As mentioned earlier, this message is typically meant to update TNL information from a base station to a coordinating server. Here the update is sent from coordinating server.

After TNL Update, the base station BS-1 may be able to process the new RTP stream from the core network (with different SSRC and sequence number space). After this point RTP Localization is no longer applied.

Retrieve function is invoked later for the call on hold. RETRIEVE message is sent from the base station BS-1 to MSC via coordinating server. After the Retrieve message is successful, RETRIEVE ACK Message is sent from MSC. If any supplementary services are invoked, the RTP Localization function will not be applied again.

Multiparty Call

UE1 & UE2 are registered with base station BS-1 Initially. Call from UE1 to UE2 is setup with RTP Localization function applied (within the same base station BS-1). For adding multiparty conference, call from UE1 to UE2 is put on hold. For call hold, the RTP Localization function will be revoked. Further signaling of multiparty call happens as usual.

For any NAS CC messages which modify the call state, the RTP Localization function shall be revoked.

Lawful Intercept (LI)

In case a Legal Intercept is configured for a subscriber on the coordinating server, it may instruct the base station not to handle the RTP traffic locally for this subscriber, so that all the RTP traffic goes to the MSC. The MSC on receiving this traffic should be able to duplicate the streams towards the LI server.

Integration with Legal Intercept Platform

Telecommunications interception laws require the capability of intercepting a mobile user based on the MSISDN number of the subscriber. This is supported by existing Operator mobile core for all calls that are not locally or mesh switched.

Coordinating server will support the SOAP/XML interface towards the mediation server or an Operator LI platform. This will be used to enable/disable a legal intercept for a particular subscriber.

LI Message Sets

All communications between the coordinating server and Operator LI platform (LI Server) will be based on TCP/IP messages.

The following two methods will be implemented in the coordinating server to support legal intercept for local and mesh switched calls based on TCP Message from the Operator LI platform. All messages will be responded by the coordinating server.

Cell Level Interception

On receiving the Cell Level Interception message from Operator LI platform, coordinating server may disable the RTP localization feature for a call originated and/or terminated at a base station identified by Cell ID parameter.

The message received at the coordinating server may include following fields.

Message Type: Cell Interception

Message Id: Sequence ID for the message in the format YYYYMMDDxxxxxxxx where YYYYMMDD indicates the date of the message and xxxxxxxx indicates the decimal sequence ID of the message for the date starting from 00000000 and resets to 00000000 at the start of a new date. The message ID may further include a timezone information.

LI State: LI State value "ON" indicates to activate lawful intercept while value "OFF" may indicate lawful intercept is deactivated.

Cell-Id: This field identifies the base station for which the lawful intercept is activated.

Response to Cell Interception message may include following fields.

Response Status: Response status value 1 may indicate success while value 2 may indicate an error. The person skilled in the art may recognize that the values chosen to represent successful or failed lawful interception here is for example purpose only.

Message Id: This field identifies the request message from LI server in response to which this message is being sent.

The response may further include additional fields in the case of failed lawful intercept activation. One such additional field may be an Error Message field providing reason for the failure. Sample values for this field may be "Syntax Error," "Invalid Base Station Id," "Resource Unavailable" etc.

Subscriber Level Interception

On receiving the Subscriber Level Interception message from Operator LI platform, coordinating server may disable the RTP localization feature for a subscriber identified by combination of source/destination IP addresses and/or source/destination port numbers.

The message received at the coordinating server for Subscriber Level Interception may include following fields.

Message Type: UE Interception

Message Id: Sequence ID for the message in the format YYYYMMDDxxxxxxxx where YYYYMMDD indicates the date of the message and xxxxxxxx indicates the decimal sequence ID of the message for the date starting from 00000000 and resets to 00000000 at the start of a new date. The message ID may further include a time zone information.

LI State: LI State value "ON" indicates to activate lawful intercept while value "OFF" may indicate lawful intercept is deactivated.

Source IP: This field identifies source IPv4 or IPv6 address of the under-surveillance UE's voice call stream.

Destination IP: This field identifies the destination IPv4 or IPv6 address of under-surveillance UE's voice call stream.

Source Port: This field identifies source UDP or TCP port of under-surveillance UE's voice call stream.

Destination Port: This field identifies the destination UDP or TCP port of under-surveillance UE's voice call stream.

Response to Subscriber Level Interception message may include following fields.

Response Status: Response status value 1 may indicate success while value 2 may indicate an error.

The person skilled in the art may recognize that the values chosen to represent successful or failed lawful interception or activating or deactivating base station level or subscriber level lawful interception is for example purpose only.

Message Id: This field identifies the request message from LI server in response to which this message is being sent.

The response may further include additional fields in the case of failed lawful intercept activation. One such additional field may be an Error Message field providing reason for the failure. Sample values for this field may be "Syntax Error," "Source IP Address not active," "Destination IP Address not active," "Source Port not active," "Destination port not active," "Resource Unavailable" etc.

Additional embodiments providing additional lawful intercept functionalities are described below with respect to, e.g., FIG. 20.

Base Station Grouping

In addition to RTP localization between users of the same base station, this feature allows RTP localization between a group of base stations. A number of base stations (maximum of 3) can be configured as part of a logical group and localize RTP for calls between them.

Figure 19:
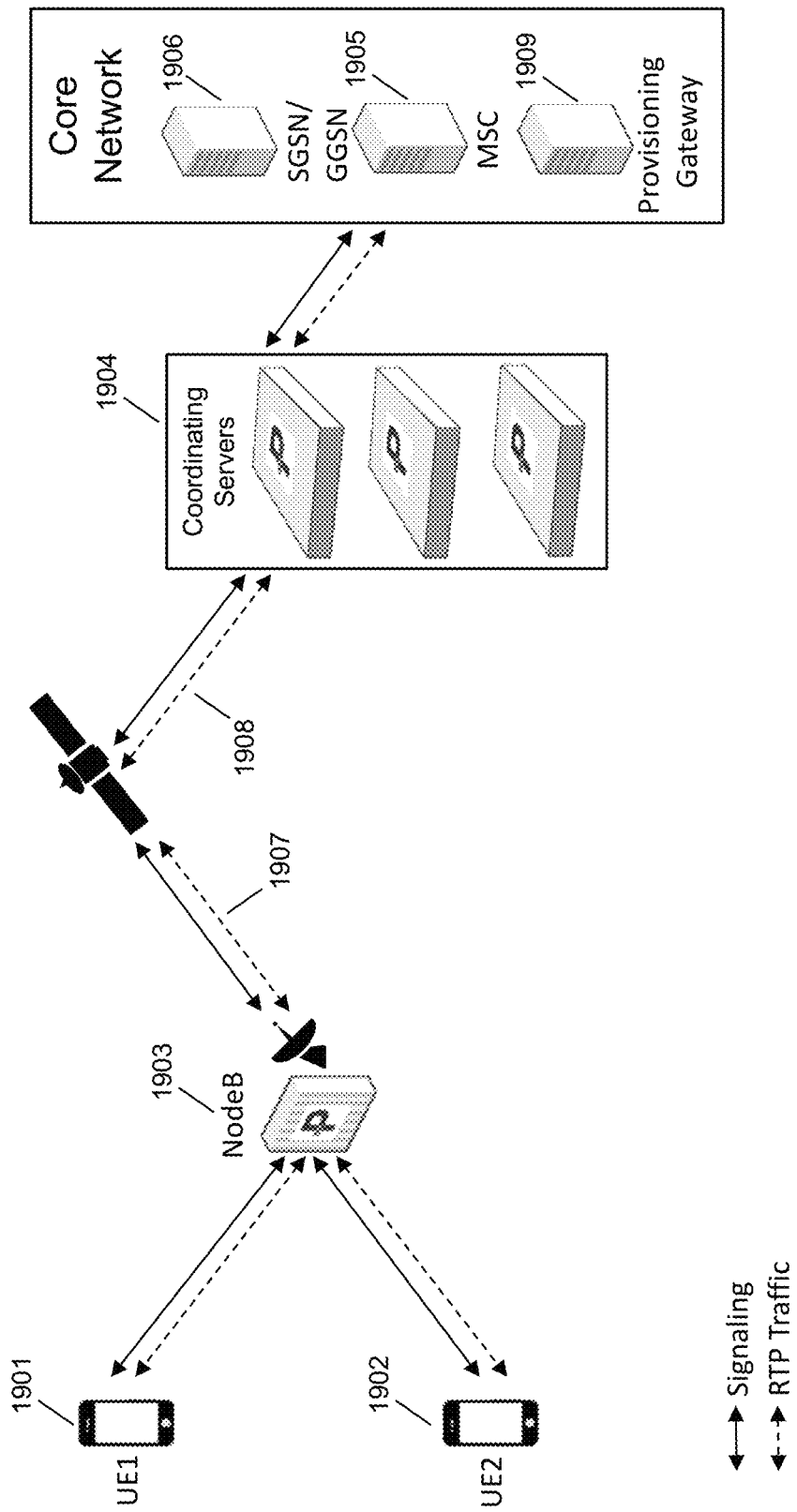
FIG. 19 is a prior art network diagram of a deployment scenario.

FIG. 19 illustrates the prior art deployment and signaling and RTP path in a 3G UMTS deployment.

As shown, a UE1 1901 and a UE2 1902 are provided wireless connectivity via a base station 1903. The base station 1903 may be also be known as a NodeB, a femto cell, a small cell etc. The base station 1903 from Parallel Wireless is a multi-RAT base station with LTE, Wi-Fi, 2G, 3G and 4G technologies that provides a flexible outdoor and in-vehicle solution in conjunction with a coordinating server 1904 from Parallel Wireless. The coordinating server 1904 may also be known and referred as a gateway, a virtualization server in this disclosure. The base station 1903 may be connected to the coordinating server 1904 over a wired or wireless backhaul system 1907 and 1908. The backhaul system 1907 and 1908 may further be a mesh backhaul system. The coordinating server 1904 can orchestrate and manage the Radio Access Network (RAN) across multiple technologies, including 2G, 3G, 4G, LTE and Wi-Fi, with high ease of use.

The coordinating server 1904 virtualizes the RAN interfaces to manage the 2G, 3G and 4G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN.

The coordinating server 1904 acts like a virtual radio network controller (vRNC or virtual RNC) for multi-RAT network handling resources for different technologies 3G, LTE/4G and WiFi while optimizing call processing towards radio and core network elements such as a mobile switching center (MSC) 1905, a serving global packet radio system (GPRS) support node (SGSN) 1906. A gateway GPRS support node (GGSN) 1906 may be co-located at the SGSN 1906. The other elements of the core network specifically for an evolved packet core (EPC) for 4G may include a home subscriber server (HSS), and a policy charging and rules function (PCRF). The MSC 1905 and a visitor location register (VLR) are the elements of circuit switched (CS) domain of the 3G core network system whereas the SGSN 1906 and the GSGN 1906 are the elements of packet switched (PS) domain of the 3G core network system. The other elements of the core network may be a provisioning gateway 1909. The provisioning gateway 1909 may be further in communication with a HLR, or the provisioning gateway may also perform HLR functionality. The coordinating server 1904 may be a standalone coordinating server or may be one of the coordinating server in a load sharing or active-standby mode.

In a 3G UMTS system as shown in FIG. 19, the UE1 1901 and the UE2 1902 are registered with the coordinating server 1904 and latched to the base station 1903. The base station 1903 may also be referred as NodeB 1903 in this disclosure. When the UE1 1901 is attempts to make a voice call with the UE2 1902 also registered to the coordinating server 1904 and latched to the base station 1903, dedicated path to carry signaling and RTP traffic messages between the UE1 1901 and the UE2 1902 is established. The path to carry signaling messages is established between the UE1 1901 and the base station 1903, the base station 1903 and the coordinating server 1904 over the wired or wireless backhaul system 1907 and 1908, the coordinating server 1904 and the MSC 1905 in the mobile operator's core network. Further, dedicated path to carry signaling messages is also reserved between the MSC 1905 and the coordinating server 1904, the coordinating server 1904 and the base station 1903 over the wired or wireless backhaul system 1907 and 1908, and the base station 1903 and the UE2 1902. Similarly, RTP traffic path is reserved and established between the UE1 1901 and the base station 1903, the base station 1903 and the coordinating server 1904 over the wired or wireless backhaul system 1907 and 1908, the coordinating server 1904 and the MSC 1905 in the mobile operator's core network. Further, RTP traffic path carrying voice traffic is also reserved between the MSC 1905 in the mobile operator's core network and the coordinating server 1904, the coordinating server 1904 and the base station 1903 over the wired or wireless backhaul system 1907 and 1908, and the base station 1903 and the UE2 1902. This as described above is a problem because the useful backhaul bandwidth is now used for RTP packets carrying voice data between the UE1 1901 and the UE2 1902, both are registered at the coordinating server 1904 and are latched to the base station 1903 for wireless connectivity to the mobile operator's core network. The RTP traffic path may be routed based on various factors, as described herein, in some embodiments. The RTP traffic path may be provided with improved QoS, in some embodiments.

Figure 20:
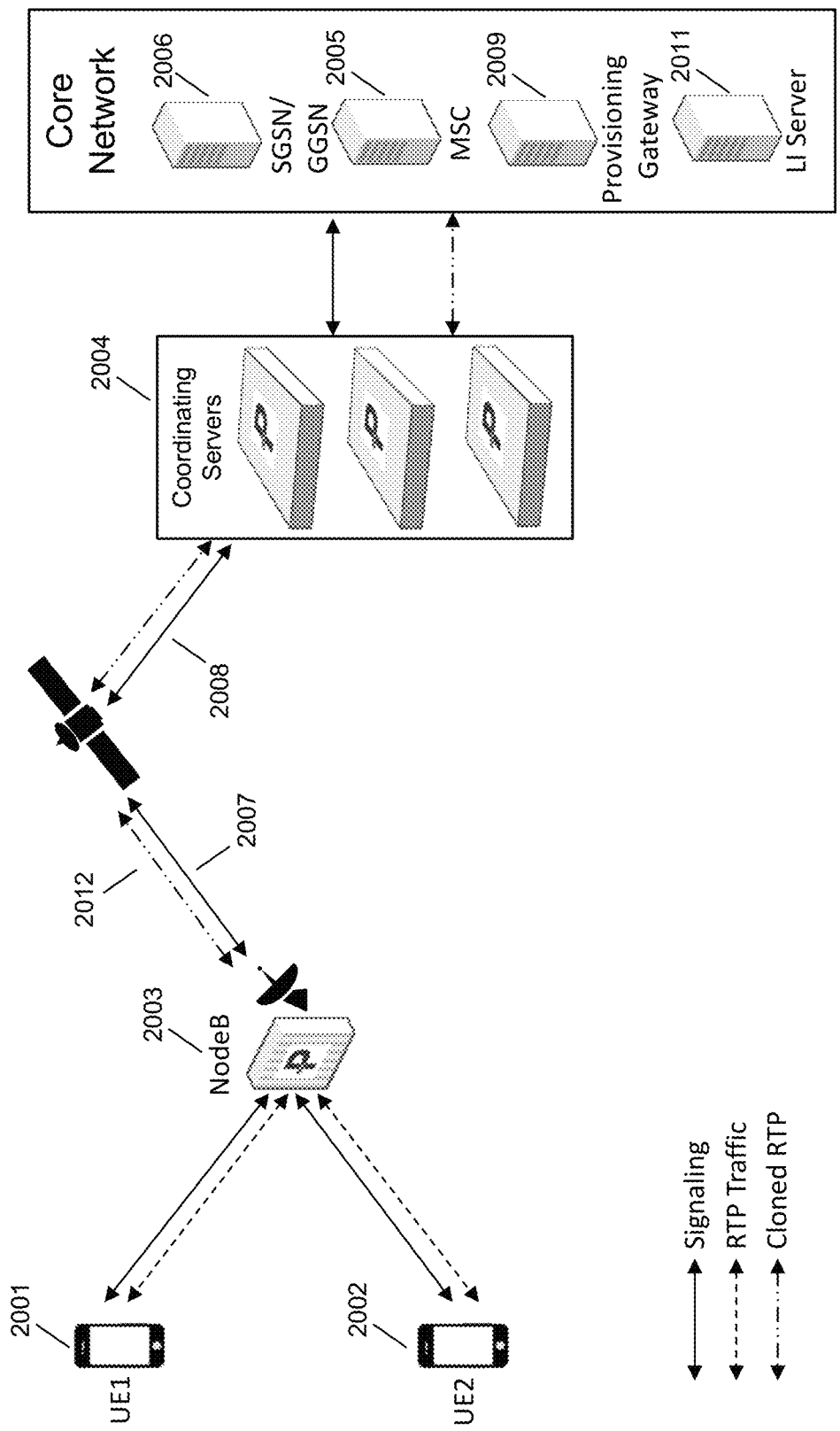
FIG. 20 is a network diagram showing signaling and RTP path between various network components, in accordance with some embodiments.

FIG. 20 illustrates 3G UMTS deployment and signaling and RTP flow path, in accordance with some embodiments. FIG. 20 shows RTP packets carrying audio data between a UE1 2001 and a UE2 2002 registered to a coordinating server 2004 and latched to a base station 2003 are switched locally at the base station 2003 when the coordinating server 2004 determines that the UE1 2001 and the UE2 2002 are both latched to the same base station 2003.

In some embodiments, a UE1 2001 and a UE2 2002 are provided wireless connectivity via a base station 2003. The base station 2003 may be connected to the coordinating server 2004 over a wired or wireless backhaul system 2007 and 2008. The backhaul system may further be a mesh backhaul system. The coordinating server 2004 can orchestrate and manage the Radio Access Network (RAN) across multiple technologies, including 3G, 4G and Wi-Fi, with high ease of use. The coordinating server 2004 virtualizes the RAN interfaces to manage the 2G, 3G and 4G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN.

In some embodiments, the coordinating server 2004 acts like a virtual radio network controller (vRNC or virtual RNC) for multi-RAT network handling resources for different technologies 3G, LTE/4G and WiFi while optimizing call processing towards radio and core network elements such as a mobile switching center (MSC) 2005, a serving global packet radio system (GPRS) support node (SGSN) 2006. A gateway GPRS support node (GGSN) 2006 may be co-located at the SGSN 2006. The other elements of the core network specifically for an evolved packet core (EPC) for 4G may include a home subscriber server (HSS), and a policy charging and rules function (PCRF). The MSC 2005 and a visitor location register (VLR) are the elements of circuit switched (CS) domain of the 3G core network system whereas SGSN 2006 and GSGN 2006 are the elements of packet switched (PS) domain of the 3G core network system. The other elements of the core network may be a provisioning gateway 2009. The provisioning gateway 2009 may be further in communication with a HLR, or the provisioning gateway may also perform HLR functionality. The coordinating server 2004 may be a standalone coordinating server or may be one of the coordinating server in a load sharing or active-standby mode. The coordinating server 2004 is also in communication with LI server 2011 in the core network and receives instructions regarding lawful intercept activation and deactivation from LI server 2011.

In some embodiments, the UE1 2001 is registered to the coordinating gateway 2004 through the base station 2003 and attempts to establish a voice call with the UE2 2002 where the UE2 2002 is also registered to the coordinating server 2004 through the base station 2003. As shown, dedicated path to carry signaling and RTP traffic messages between the UE1 2001 and the UE2 2002 is established. The path to carry signaling messages is established between the UE1 2001 and the base station 2003, the base station 2003 and the coordinating server 2004 over the wired or wireless backhaul system 2007 and 2008, the coordinating server 2004 and the MSC 2005 in the mobile operator's core network. Further, dedicated path to carry signaling messages is also reserved between the MSC 2005 and the coordinating server 2004, the coordinating server 2004 and the base station 2003 over the wired or wireless backhaul system 2007 and 2008, and the base station 2003 and the UE2 2002. Similarly, RTP traffic path is required only between the UE1 2001 and the base station 2003, and the base station 2003 and the UE2 2002. The bandwidth of the backhaul system 2007 and 2008 from the base station 2003 to the coordinating server 2004 and between the coordinating server 2004 and the MSC 205 at the mobile operator's core network is now available for other operations.

Figure 21:
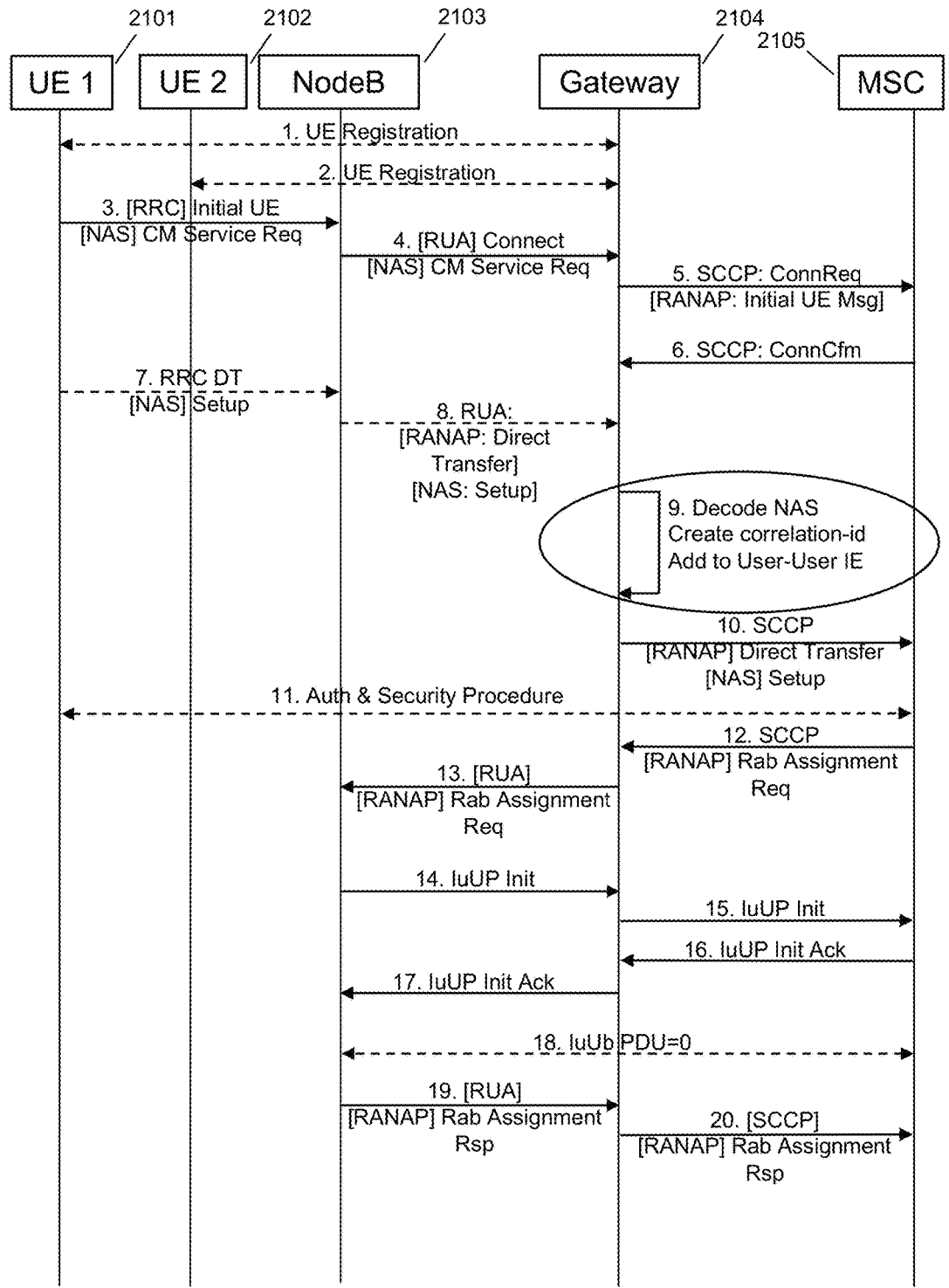
FIG. 21 is a call flow ladder diagram for RTP localization, in accordance with some embodiments.

FIG. 21 illustrates a call flow ladder diagram when a voice call is initiated by a mobile subscriber to another mobile subscriber where both the mobile subscribers are latched to the same base station, in accordance with some embodiments. FIG. 21 specifically depicts messages exchanged while establishing an originating leg of the call.

See TABLE 1 below for the logical steps to perform the operation in accordance with some embodiments.

TABLE 1

| | |
|---|---|
| 1 | UE1 & UE2 Registration with coordinating server |
| 2 | Setup request sent from UE1 to coordinating server |
| 3 | Processing at coordinating server<br>Decode NAS<br>Generate Call correlation-id<br>Encode in User-User IE in NAS Message |
| 4 | Authentication and security procedure is executed. After Authentication is successful, RAB establishment happens for originating leg. At this point base station shall be prepared to process any IuUP pdus from MSC (Ring back tones etc) |
| 5 | IuUP Initialization procedure is invoked as a result of RAB establishment. |
| 6 | After IuUP initialization is done, IuUp data PDUs can be sent by MSC |
| 7 | Further steps in processing the setup request. To reach the UE2, paging request is sent and the setup is forwarded |
| 8 | To identify the terminating leg, processing at coordinating server involves<br>Decode NAS to get correlation-id<br>Look up the RTP Local call using call correlation-id<br>Link originating and terminating legs |
| 9 | Setup Message is forwarded to UE through base station |
| 10 | RAB Assignment for terminating leg. Here too after RAB Assignment is complete, base station shall be able to process any RTP packets from MSC. |
| 11 | IuUP Initialization procedure is invoked as a result of RAB establishment for the terminating leg. |
| 12 | After IuUP initialization is done, IuUp data PDUs can be sent by MSC |
| 13 | After RAB assignment is complete, a proprietary message Transport Network Layer (TNL) Update message is sent from coordinating server to base station to update the RAB transport layer parameters for UE1. The IP/Port will be the one used for UE2 at base station.<br>After the RAB Resources are updated, TNL Update Response is sent from base station. |
| 14 | TNL Update Request/Response message is exchanged for UE2 context |
| 15 | DTCH Audio frames generated by UE1 & UE2 are switched locally within base station |
| 16 | Coordinating server will generate comfort noise for the RABs established towards the core network (CN) to avoid Iu Release |
| 17 | Call disconnect & Iu release procedures. |

In some embodiments, as shown in FIG. 21, a UE1 2101 and a UE2 2102 are registered to a coordinating server 2104. The UE1 2101 and the UE2 2102 performs registration procedure. The user equipment (UE) may also be referred by many other names such as mobile device, a phone etc. The ladder call flow diagram shown in FIG. 21 describes various messages exchanged between the UE1 2101, the UE2 2102, a base station 2103, the coordinating server 2104 and a MSC 2105. The base station 2103 may also be known by many other names such as a NodeB, a femto cell, a micro cell, a pico cell etc.

In some embodiments, to originate a new call, the UE1 2101 initiates Service Request for a mobile originated call. The UE1 2101 sends a radio resource control (RRC) Initial UE carrying a non-access stratum (NAS) CM Service Request as a payload to the base station 2103. The base station 2103 upon receiving RRC Initial UE/CM Service Request message builds and sends to the coordinating server 2104 a radio access network application part (RANAP) user adaption (RUA) Connect message that encapsulates a NAS CM Service Request as a payload. The RANAP Connect message triggers Iu connection establishment between the base station 2103 and the coordinating server 2104. The RANAP Connect message carries radio area network (RAN) identification (ID) of the base station 2103. The coordinating server 2104 sends SCCP ConnReq carrying RANAP Initial UE Message to the MSC 2105 of a mobile operator's core network. The MSC 2105 accepts and sends positive acknowledgement via SCCP Connection Confirm to the coordinating server 2104.

The UE1 2101 sends a setup request via RRC Direct Transfer with NAS Setup as a payload to the base station 2103. The base station forwards RANAP Direct Transfer carrying NAS Setup over RUA to the coordinating server 2104. The coordinating server 2104 decodes the received NAS Setup message looking for a called party information and creates a call correlation-id. The call correlation-id is then encoded as a User-User Information Element (IE) in a NAS message that will be sent by the coordinating server 2104 to the MSC 2105 as a Signaling Connection Control Protocol (SCCP) message. The SCCP message from the coordinating server 2104 to the MSC 2105 carries the NAS message with User-User IE. The MSC 2105 initiates and completes authentication and security procedure verifying the call origination service for the UE1 2101.

After successful authentication and execution of security procedure, radio access bearer establishment and call setup procedure completed. The MSC 2105 sends RANAP RAB Assignment Request message over SCCP to the coordinating server 2104. Upon determining that the UE1 2101 is authorized for the requested originating call service, Iu bearer connection is established by the base station 2103 when the coordinating server 2104 forwards the received RANAP RAB Assignment Request message from the MSC 2105. The base station 2103 sends IuUP Init message to the coordinating server 2104 and the coordinating server 2104 forwards the same to the MSC 2105. The MSC 2105 acknowledges the establishment of bearer assignment by sending IuUP Init Ack message to the coordinating server 2104 and the coordinating server 2104 further sends IuUP Init Ack message to the base station 2103. At this point, the base station 2103 is prepared to process any IuUP PDUs from the MSC 2105. The IuUP PDUs may be for example ringback tones, announcements etc. The base station 2103 sends RANAP RAB Assignment Response message to the MSC 2105 through the coordinating server 2104.

Figure 22:
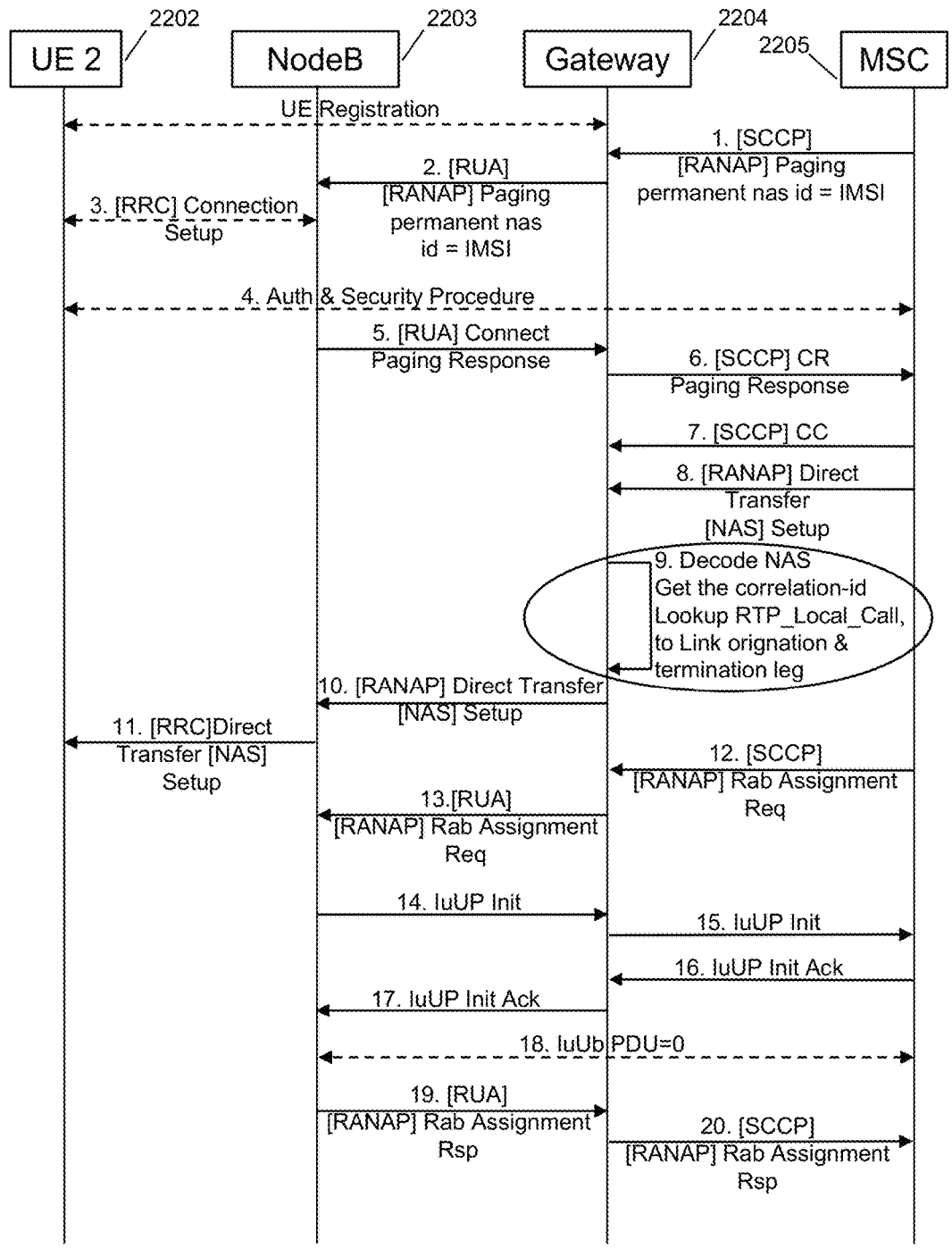
FIG. 22 is a call flow ladder diagram for RTP localization, in accordance with some embodiments.

FIG. 22 illustrates a call flow ladder diagram when a voice call is initiated by a mobile subscriber to another mobile subscriber where both the mobile subscribers are latched to the same base station, in accordance with some embodiments. FIG. 22 specifically depicts messages exchanged while establishing terminating leg of the call.

In some embodiments, a UE2 2202 is registered to a coordinating server 2204 through a base station 2203. The UE2 2202 is the same UE2 shown in FIG. 21 as the UE2 2102. The base station 2203 is the same base station shown and described in FIG. 3 the base station 2103. The coordinating server 2204 is the same coordinating server as shown in FIG. 21 and described before as the coordinating server 2104. A MSC 2205 is the same MSC as shown and described before as the MSC 2105.

The MSC 2205 while further processing the received NAS Setup from the coordinating server 2204 sends paging request to the coordinating server 2204. The coordinating server 2204 broadcasts the paging request according to various algorithms for efficient paging, and the base station 2203 where the UE2 2202 is camped on currently, establishes RRC Connection Setup with the UE2 2202. Upon successful RRC connection setup established, and successful authentication and security procedure, the base station 2203 sends paging response to the coordinating server 2204. The coordinating server 2204 sends SCCP Connection Request carrying Paging Response to the MSC 2205. The MSC 2205 sends a SETUP message as a NAS payload in a RANAP Direct Transfer message to the coordinating server 2204. The coordinating server 2204, upon receipt of the RANAP Direct Transfer message carrying NAS SETUP message, decodes the NAS message and extracts the correlation-id. The coordinating server 2204 further links the originating and terminating legs of the call based on the correlation-id if the extracted call correlation-id is one which was encoded by the coordinating server 2204 in User-User IE. The coordinating server 2204 then sends the SETUP message to the UE2 2202 through the base station 2203. The MSC 2205 sends RANAP RAB Assignment Request message over SCCP to the coordinating server 2204. Iu bearer connection is established by the base station 2203 when the coordinating 2204 forwards the received RANAP RAB Assignment Request message from the MSC 2205. The base station 2203 sends IuUP Init message to the coordinating server 2204 and the coordinating server 2204 forwards the same to the MSC 2205. The MSC 2205 acknowledges the establishment of bearer assignment by sending IuUP Init Ack message to the coordinating server 2204 and the coordinating server 2204 further sends IuUP Init Ack message to the base station 2203. At this point, the base station 2203 is prepared to process any IuUP PDUs from the MSC 2205.

Figure 23:
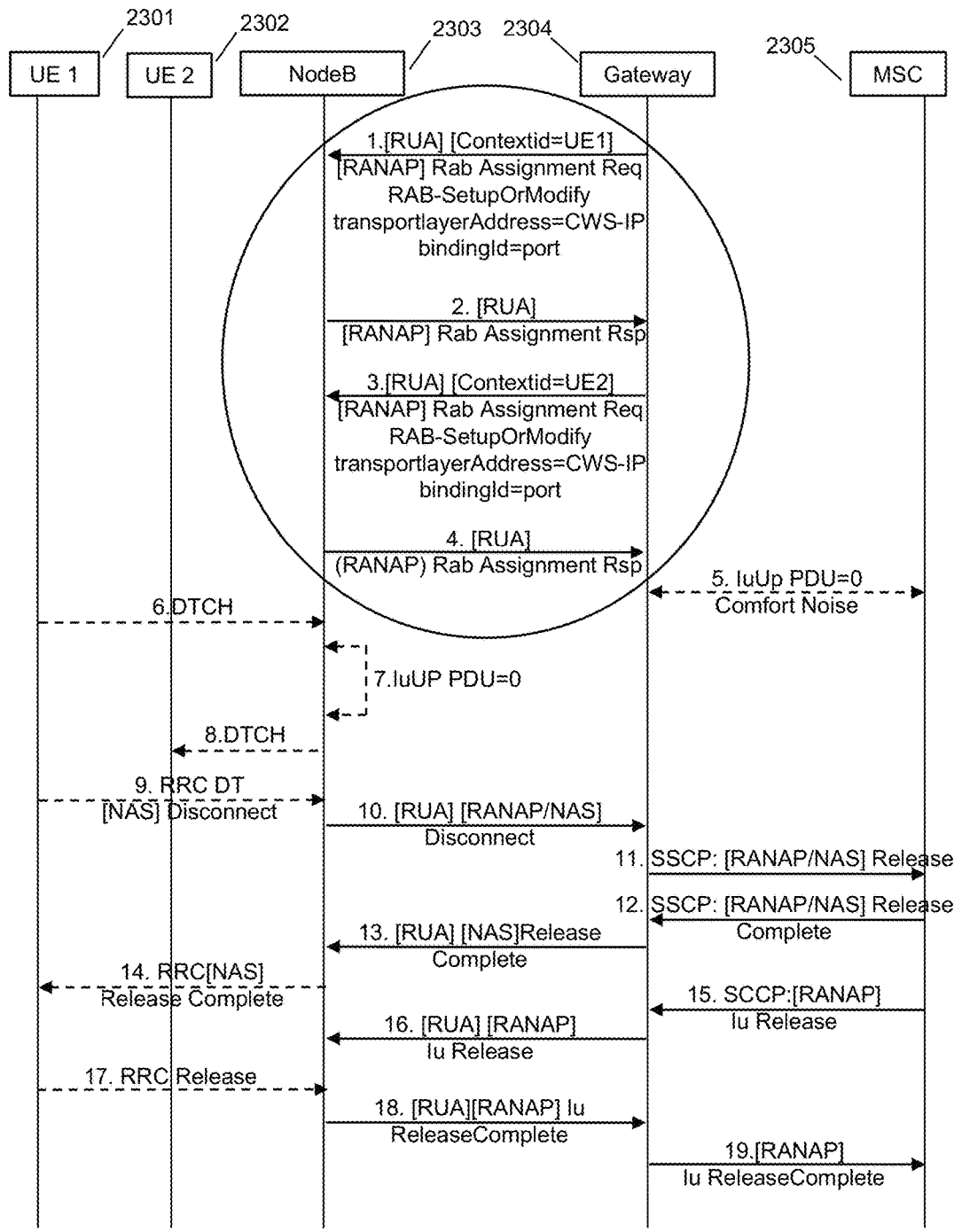
FIG. 23 is a call flow ladder diagram for RTP localization, in accordance with some embodiments.

FIG. 23 illustrates a call flow ladder diagram when a voice call is initiated by a mobile subscriber to another mobile subscriber where both the mobile subscribers are latched to the same base station, in accordance with some embodiments. FIG. 23 specifically depicts messages to instruct a base station to switch RTP packets locally when a coordinating server determines that a UE1 and a UE2 are camped on the same base station.

In some embodiments, messages exchanged between a coordinating server 2304, which is also identified earlier as the coordinating server 2204 and the coordinating server 2104, and a base station 2303, which is also shown earlier as the base station 2203 and the base station 2103, is shown. The coordinating server 2304 identifies and links the originating and terminating leg of the call based on a call correlation-id. After linking the originating and the terminating call, if the coordinating server 2304 determines bases on NAS messages received for the originating and the terminating leg that the originating and terminating leg of the call i.e. a UE1 2301, which is earlier described as the UE1 2101, and a UE2 2302, which is earlier described as the UE2 2202 and the UE2 2102, are camped on same base station 2303, the coordinating server 2304 activates RTP localization feature and sends a RAB Assignment Request to the base station 2303 with a RAB Modify List for the UE1 2301 and the UE2 2302. The coordinating server 2304 may be required to be configured for RTP localization feature or it may be a default behavior at the coordinating server 2304. If the RTP localization feature is provisioned and is active for the base station 2303, the RAB Assignment Request sent to the base station 2303 for the UE1 2301 includes an IP address of the base station 2303 and a RTP port Number assigned for UE2 2302 to update RAB transport layer parameters at the base station 2303. The RAB Assignment Request sent to the base station 2303 for the UE2 2302 includes an IP address of the base station 2303 and a RTP port Number assigned for UE1 2301 to update RAB transport layer parameters at the base station 2303. As a result of this RAB modification, RTP packets from the UE1 2301 and the UE2 2302 are switched locally at the base station 2303. The coordinating server 2304 generates and sends comfort noise RTP packets to the MSC 2305 in a core network to avoid Iu Release. Because of comfort noise being sent to the MSC 2305 in the core network from the coordinating server 2304, it allows a limited backhaul bandwidth to be used for other mobile subscribers and services. Silence, or a low-bandwidth audio track, or any other audio samples, or an instruction to provide comfort noise could be used instead of comfort noise as described herein, in some embodiments.

In some embodiments, the call correlation-id is generated at the coordinating server 2104 and encoded in as a User-User Information Element (IE) in the SETUP message. The purpose of the User-User IE is to convey information between a mobile station and the remote user. The call correlation-id is thus passed across an originating and a terminating call leg. The call correlation-id is removed before the message received from the coordinating server 2204 at the base station 2203 is forwarded to the UE2 2202. Supporting the User-User IE may require provisioning in a HLR. However, if support for the User-User IE is not provisioned in the HLR, MSC 2205 in the core network may need to bypass a check for the subscribers so that user to user service can be used. The call correlation-id acts as a cookie and can be generated from various information, for example, base station's IP address, an IMSI of a calling subscriber, a MSISDN of the calling subscriber, a MSISDN of the called subscriber, timestamp of the call origination etc. The call correlation-id is stored in a cache or a database at the coordinating server 2104 where it was created originally. However, the user is not limited to the examples given here for storing call correlation-id and can use any available methods at the time of implementation.

Figure 24:
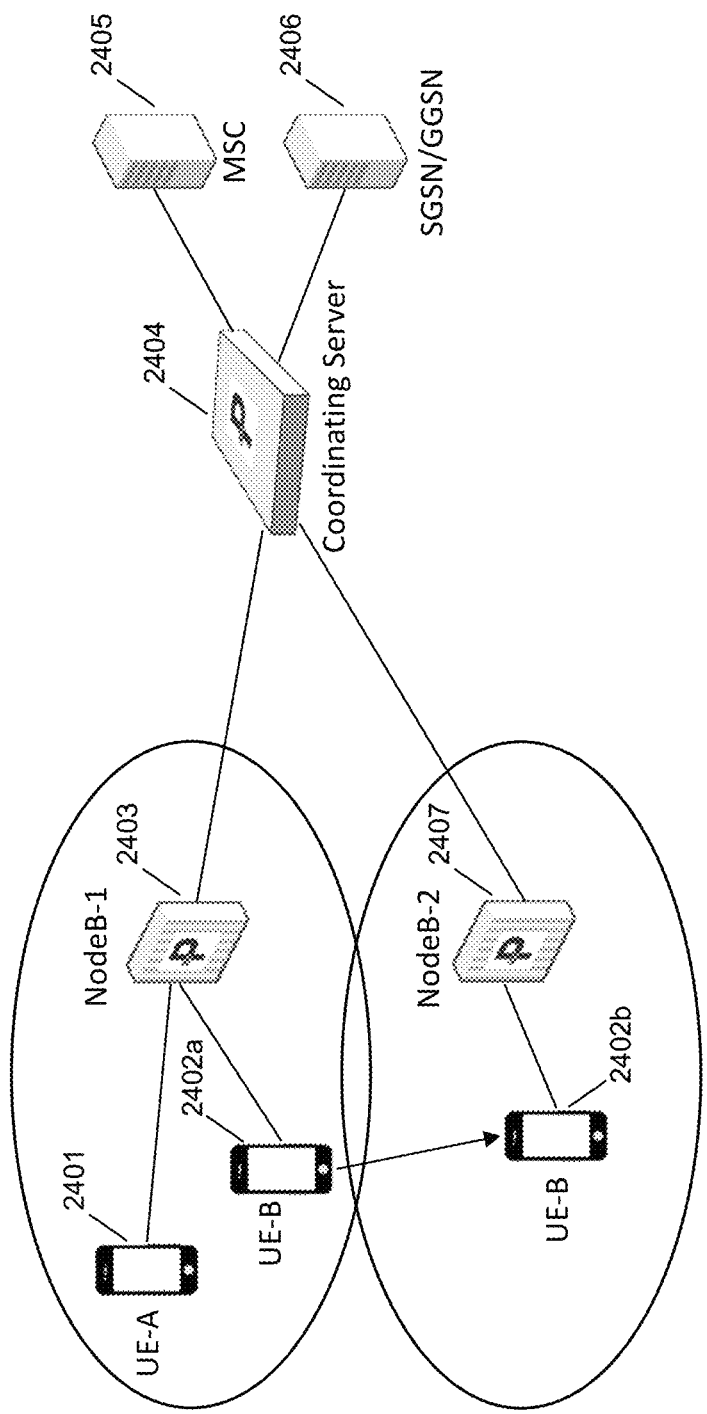
FIG. 24 is a network diagram for a mobility scenario, in accordance with some embodiments.

FIG. 24 illustrates a scenario where one party of an established voice call moves to a different base station and base stations hosting the parties of the voice call are managed by the same coordinating server, in accordance with some embodiments.

In some embodiments, a UE-A 2401 also referred as a UE1 2401 in this disclosure is in an established voice call with a UE-B 2402 also referred as a UE2 2402 in this disclosure. Based on where the UE2 is camped on it may further be identified as the UE2 2402a or the UE2 2402b. Both the UE1 2401 and the UE2 2402 are camped on to a base station BS-1 2403. The BS-1 may also be referred as NodeB-1 in this disclosure. The base station BS-1 is managed by a coordinating server 2404 and connected through a wired or wireless backhaul system. The backhaul system may be a mesh backhaul system. The coordinating server 2404 is further connected to a MSC 2405 and a SGSN 2406 in a mobile operator's core network. RTP localization feature is provisioned and active for the base station base station BS-1 2403 at the coordinating server 2404. Therefore, the RTP packets are switched locally at the base station 2403. When the UE2 2402 moves to a different cell and camps on to a base station BS-2 2407, because the UE1 2401 and the UE2 2402 are no longer camped on to the same base station BS-1 2403, RTP localization functionality cannot be continued for the established voice call between the UE1 2401 and the UE2 2402. The base station BS-2 2407 may also be referred as NodeB-2 in the disclosure.

In a scenario where a UE2 is moving from a base station BS-1 to a base station BS-2 within same coordinating server. In this case the localization function is assumed to be present in base station BS-1. After the UE2 moves to BS-2 the RTP localization will not apply. Table 2 lists the logical steps in accordance with some embodiments.

Figure 25:
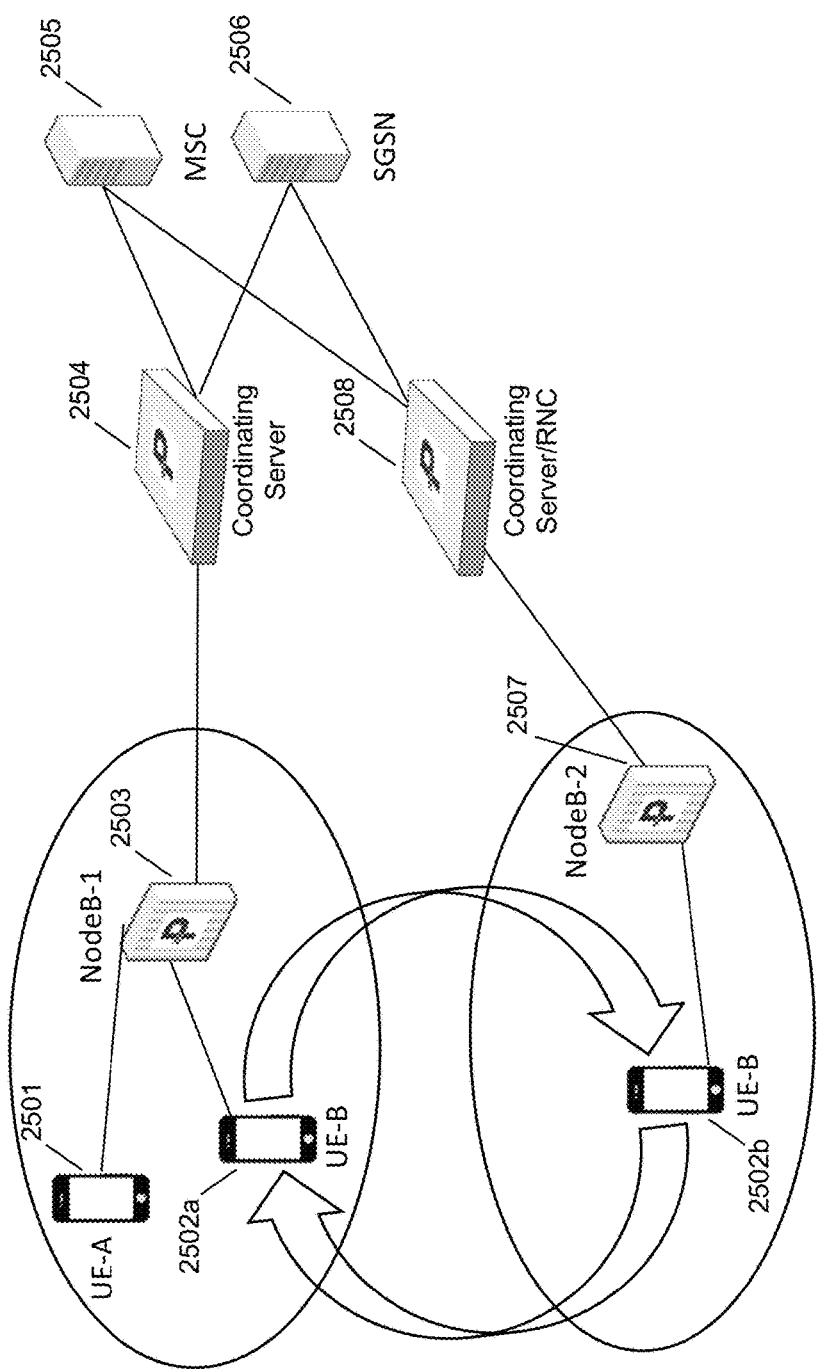
FIG. 25 is a network diagram for a mobility scenario, in accordance with some embodiments.

FIG. 25 illustrates a scenario where one party of an established voice call moves to a different base station and base stations where parties of the voice call are now camped on are managed by a different coordinating server, or one of the base station is macro base station and managed by a different coordinating server or a radio network controller (RNC), in accordance with some embodiments.

See TABLE 2 below for the logical steps to perform the operation in accordance with some embodiments.

TABLE 2

| | |
|---|---|
| 1 | UE1 & UE2 Registration, call setup for calls between UE1 & UE2 with RTP localization |
| 2 | Relocation required message from BS-1 |
| 3 | Coordinating server notifies BS-1 to remove the linked call. As the BS-1 knows the Relocation state, this can be performed locally. |
| 4 | Coordinating server sends Relocation Request towards target base station (BS-2). In the relocation request, the RABs to be setup will be included. In the transport layer address the coordinating server's IP Address is included. |
| 5 | BS-2 sends Relocation Request Ack. In the RABs setup, the transport layer IP Address will have BS-2's IP. |
| 6 | Relocation Command request is send to BS-1. For CS call, data forwarding list and the associated transport layer address (for forwarding packets) is not included. |
| 7- | Relocation detect & Relocation complete message sent from BS-1. |
| 9 | TNL Update request/response messages. This will include coordinating server's IP for the RAB transport layer address for UE1 |
| 10 | TNL Update request/response messages. This will include coordinating server's IP for the RAB transport layer address for UE1 |
| 11 | Iu Release for UE2 |

In some embodiments, a UE-A 2501 also referred as a UE1 2501 in this disclosure is in an established voice call with a UE-B 2502 also referred as a UE2 2502 in this disclosure. Based on where the UE2 is camped on it may further be identified as the UE2 2502a or the UE2 2502b. Both the UE1 2501 and the UE2 2502 are camped on to a base station base station 2503. The base station BS-1 2503 is managed by a coordinating server 2504 and connected through a wired or wireless backhaul system. The backhaul system may be a mesh backhaul system. The coordinating server 2504 is further connected to a MSC 2505 and a SGSN 2506 in a mobile operator's core network. RTP localization feature is provisioned and active for the base station BS-1 2503 at the coordinating server 2504. Therefore, the RTP packets are switched locally at the base station BS-1 2503. When the UE2 2502 moves to a different cell and camps on to a base station BS-2 2507, because the UE1 2501 and the UE2 2502 are no longer camped on to the same base station BS-1 2503, RTP localization functionality cannot be continued for the established voice call between the UE1 2501 and the UE2 2502.

Figure 26:
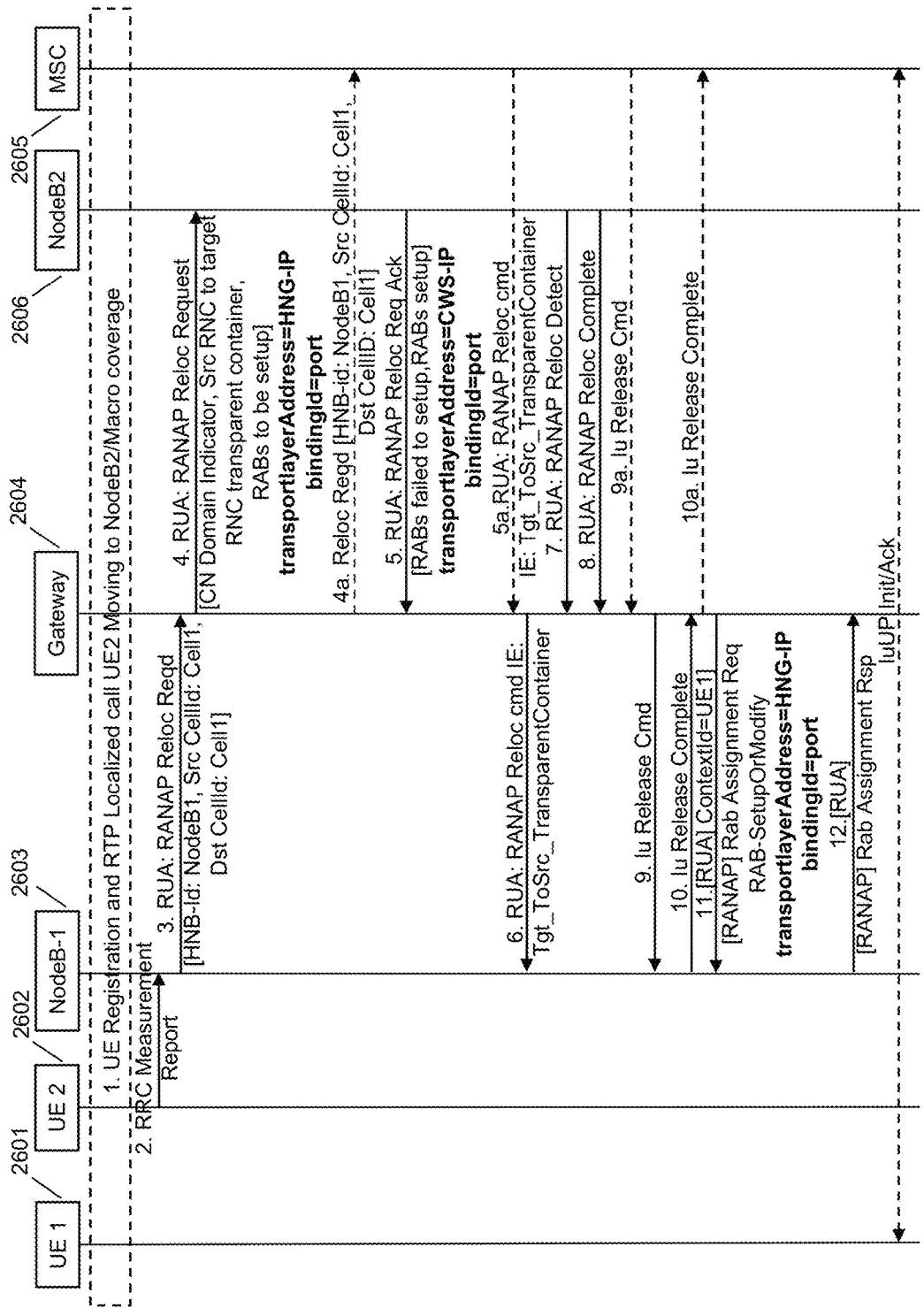
FIG. 26 is a call flow ladder diagram when a RTP localization functionality is terminated, in accordance with some embodiments.

FIG. 26 illustrates a call flow ladder diagram when a RTP localization functionality is terminated as a result of one of party of an established voice call moves to a different cell and camps on to a different base station or NodeB, in accordance with some embodiments.

Table 3 lists the logical steps in accordance with some embodiments.

TABLE 3

| | |
|---|---|
| 1 | UE1 & UE2 Registration and call setup for calls between UE1 & UE2 with RTP localization at BS-1 |
| 2 | Measurement report is sent from UE. Based on measurement report Relocation required message is triggered from BS-1 |
| 3 | As the target cell-id is not managed by coordinating server, the Relocation required message is sent to MSC |
| 4 | MSC sends Relocation Request towards target RNC. In the relocation request, the RABs to be setup will be included. In the transport layer address the MSC IP Address is included. |
| 5 | RNC sends Relocation Request Ack. In the RABs setup, the transport layer IP Address will have RNC IP. |
| 6 | Relocation Command request is send to coordinating server. For CS call, data forwarding list and the associated transport layer address (for forwarding packets) is not included. |
| 7 | The Relocation Command message is sent to BS-1. Again, for CS call data forwarding list is not included |
| 8 | After processing the relocation command, the locally linked RTP will be terminated. This can be done internally by BS-1 or with an explicit message from coordinating server |
| 9 | Relocation complete & Iu Release messages |

In some embodiments, messages are exchanged between a coordinating server 2604 and a base station BS-1 2603 to turn off RTP localization functionality. The coordinating server 2604 is also previously referred as the coordinating server 2104, the coordinating server 2204, the coordinating server 2304, the coordinating server 2404 and the coordinating server 2504. The base station BS-1 2603 is previously referred as the base station 2103, the base station 2203, the base station 2303, the base station 2403 and the base station 2503. A UE1 2601 and a UE2 2602 are in an established voice call and RTP localization is active at the base station the BS-1 2603. The UE1 2601 is previously referred as the UE1 2101, the UE1 2301, the UE1 2401 and the UE1 2501. The UE2 2602 is previously referred as the UE2 2102, the UE2 2202, the UE2 2302, the UE2 2402 and the UE2 2502. The UE2 2602 now moves to a different cell and camps on a different base station BS-2 2606. The base station BS-2 2606 may also be a NodeB managed by the same coordinating server managing the base station BS-1 2603 or a different coordinating server or RNC.

As the UE2 2602 is moving to a different cell, the base station BS-1 2603 receives RRC Measurement Report from the UE2 2602 and the base station BS-1 2603 sends RANAP Relocation Required carrying a source and a destination cell id as well as the base station ID information to the coordinating server 2604. If a base station where the UE2 2602 is moving, a target base station BS-2 2606, is managed by the coordinating server 2604 as well, the coordinating server 2604 sends a RANAP Relocation Request message to the target base station 2606. The RANAP Relocation Request carries information about RAB to be setup and that includes an IP Address of the coordinating server 2604 and a port number allocated at the coordinating server 2604 for the UE2 2602. The target base station 2606 sends response RANAP Relocation Request Ack identifying a success or a failure and includes information of RAB transport layer parameters with IP address as the target base station BS-2 2606's IP address and a port number allocated at the base station BS-2 2606 for RTP. The coordinating server 2604 also sends to the base station 2603 a RANAP RAB Assignment Request for the UE1 2601 carrying new RAB transport layer parameters with IP Address as the coordinating server 2604's IP address and a port number assigned at the coordinating server 2604 for the UE1 801. Also, resources allotted at the base station BS-1 2603 may be freed.

In some embodiments, when the base station BS-2 2606 is managed by a different coordinating server than the coordinating server managing the base station BS-1 2603 or a RNC, as the UE2 2602 is moving to a different cell, the base station BS-1 2603 receives RRC Measurement Report from the UE2 2602 and the base station BS-1 2603 sends RANAP Relocation Required carrying a source and a destination cell id as well as the base station ID information to the coordinating server 2604. If a base station where the UE2 2602 is moving, a target base station BS-2 2606, is managed by a different coordinating server or a RNC, the coordinating server 2604 sends a RANAP Relocation Required carrying a source and a destination cell id as well as the base station ID information to a MSC 2605. The MSC 805 completes the handover or cell relocation procedure. The coordinating server 2604 also sends to the base station BS-1 2603 a RANAP RAB Assignment Request for the UE1 2601 carrying new RAB transport layer parameters with IP Address as the coordinating server 2604's IP address and a port number assigned at the coordinating server 2604 for the UE12601. Also, resources allotted at the base station BS-1 2603 may be freed.

In a scenario where a UE1 is attached to base station BS-1 2503 and UE2 is attached to macro coverage at NodeB-2 2507. After the CS Call is setup, UE2 moves from macro coverage to BS-1's coverage area.

In some embodiments, even though the both UE's are in the same BS-1's coverage area after relocation, RTP Localization function may not be applied. Any new call initiated after hand-in can be localized, in some embodiments.

TABLE 4

1  UE1 is registered with BS-1. UE2 is attached to macro cell coverage with RNC. Initially call is setup between UE1 & UE2
2  Relocation Request is sent from RNC to MSC. The transport layer address will contain RNC IP/Port. MSC Forwards the Relocation Request to coordinating server.
3  Coordinating server send the Relocation Request towards BS-1 by including the transport layer address for coordinating server
4  BS-1 sends Relocation Request Ack. In the RABs setup, the transport layer IP Address/Port of BS-1 will be included.
5  Coordinating server sends Relocation Request Ack. In the RABs setup, the transport layer IP Address/Port of coordinating server will be included.
6  Relocation Detect message is sent to RNC through coordinating server.
7  BS-1 sends UTRAN Mobility Information message to UE to update the C-RNTI & U-RNTI and any other relevant IEs.
8  Relocation complete is sent to RNC from BS-1 (through coordinating server)

In another aspect, a UE1 2501 is attached to a base station BS-1 2503 and a UE2 is initially attached to a base station BS-2 2507 or NodeB-2 2507. The BS-1/NodeB-1 and the BS-2/NodeB-2 are managed by different coordinating servers or BS-1 for example is managed by a coordinating server and the BS-2 is managed by a RNC 2508. A voice call is established between the UE1 and the UE2. The UE2, during the established voice call, moves to a cell served by the BS-1 causing the RNC to send a RANAP Relocation Request to a MSC/SGSN. The RANAP Relocation Request may include CN Domain Indicator, Source RNC to Target RNC transparent container and RAB to be setup specifying RAB Transport Layer Parameter as IP address and port number of RNC. The MSC forwards the RANAP Relocation Request message to the coordinating server and the coordinating server forwards the same to the base station BS-1 but replacing RAB Transport Layer Parameters for IP Address and port Number with the same for coordinating server. The BS-1 responds with a RANAP Relocation Request Ack message and includes RAB Transport Layer parameters with IP Address and port number of the base station BS-1. The coordinating server forwards the RANAP Relocation Request Ack to the MSC but replaces RAB Transport Layer parameters with IP Address and port number of the coordinating server. The MSC forwards the received RANAP Relocation Request Ack to the RNC. The base station BS-1 further sends RANAP Relocation Detect message to the RNC through the coordinating server and the MSC. The base station BS-1 further sends a RRC UTRAN Mobility Information message to the UE2 to update Cell Radio Network Temporary Identities (C-RNTI) and UTRAN Radio Network Temporary Identities (U-RNTI) and other relevant IEs. The UE2 sends RRC UTRAN Mobility Information Confirmation triggering the BS-1 to send a RANAP Relocation Complete to RNC through the coordinating server and the MSC. RTP localization is not enabled in this case even though the UE1 and the UE2 are both camped on to the same base station BS-1.

In some embodiments, the coordinating server 2004 may determine to enable RTP localization at the base station 2003 based on a multi-factor analysis. The coordinating server may perform multi-factor analysis based on what RAT is involved, availability of mesh links from the base station to the core network, need of transcoding between the originating and the terminating leg of the call of the under-surveillance subscriber. The multi-factor analysis at the coordinating server may also depend on computing power at the base station, abilities to store RTP streams at the base status, the base station's power source status, call pattern of the under-surveillance UE, etc. The coordinating server may determine to disable RTP performing cost-benefit analysis based on what RAT is involved, availability of mesh links from the base station to the core network, need of transcoding between the originating and the terminating leg of the call of the subscriber. The multi-factor analysis may be based on policies received from a PCRF, in some embodiments.

Lawful Intercept (LI)

In case a Lawful Intercept is configured for a subscriber on the coordinating server, it may instruct the base station not to handle the RTP traffic locally for this subscriber, so that all the RTP traffic goes to the MSC as shown in FIG. 19. The MSC on receiving this traffic should be able to duplicate the streams towards the LI server.

In some embodiments, when lawful intercept is enabled for either a UE1 or a UE2, the coordinating server 2004 may disable switching of RTP packets locally at the base station for voice calls involving the UE1 or the UE2 even though the UE1 and the UE2 are latched to the same base station and switching of RTP packets locally may be supported in general. When lawful intercept is enabled at the base station level, the coordinating server 2004 may disable switching of RTP packets locally for all calls from UEs latched to the base station. The coordinating server may receive information about lawful intercept for a base station level interception or the subscriber level interception from operator LI platform via a message identifying sequence ID of the message, lawful intercept status. The message may further comprise RAN identifier information identifying the base station. The message may further identify a subscriber by a combination of source or destination IP Addresses and/or source or destination port number. The coordinating server may respond the lawful intercept request message from the operator lawful intercept server with a message comprising success or failure code identifying reasons e.g. resource unavailable, source or destination IP or port not active etc. In some cases, the response message from the coordinating server may further include a reason field clearly identifying the failure reason. The coordinating server may determine to disable RTP performing cost-benefit analysis based on what RAT is involved, availability of mesh links from the base station to the core network, need of transcoding between the originating and the terminating leg of the call of the under-surveillance subscriber.

In some embodiments, when lawful intercept is enabled for either a UE1 or a UE2, the coordinating server 2004 may determine to enable RTP localization at the base station 2003. The coordinating server may perform multi-factor analysis based on what RAT is involved, availability of mesh links from the base station to the core network, need of transcoding between the originating and the terminating leg of the call of the under-surveillance subscriber. The multi-factor analysis at the coordinating server may also depend on computing power at the base station, abilities to store RTP streams at the base status, the base station's power source status, call pattern of the under-surveillance UE, etc. The coordinating server may instruct the base station to clone RTP packets of the RTP localized call for the under-surveillance UE at the base station 2003 and send the cloned RTP packets 2012 over a wireless or wired backhaul to the coordinating server 2004. The coordinating server 2104 then sends the cloned RTP packets from the base station to the LI server or to the MSC in the core network. An interface or endpoint details may be provisioned at the coordinating server to send RTP streams from the under-surveillance UEs through a static or dynamic configuration.

In some embodiments, when lawful intercept is enabled for either a UE1 or a UE2, the coordinating server 2104 may enable RTP localization at the coordinating server based on the multi-factor analysis as described above. The coordinating server may hairpin the RTP streams itself and send compressed RTP streams the LI server or to the MSC in the core network. An interface or endpoint details may be provisioned at the coordinating server to send RTP streams from the under-surveillance UEs through a static or dynamic configuration.

In some embodiments, when lawful intercept is enabled for either a UE1 or a UE2, the coordinating server 2104 may enable RTP localization at the base station based on the multi-factor analysis as described above. The coordinating server may instruct the base station to record and store the RTP streams packets locally and forward later to the coordinating server 2104 as a compressed RTP data streams. The coordinating server may forward the received compressed RTP data streams to the LI server or the core network as provisioned.

Figure 27:
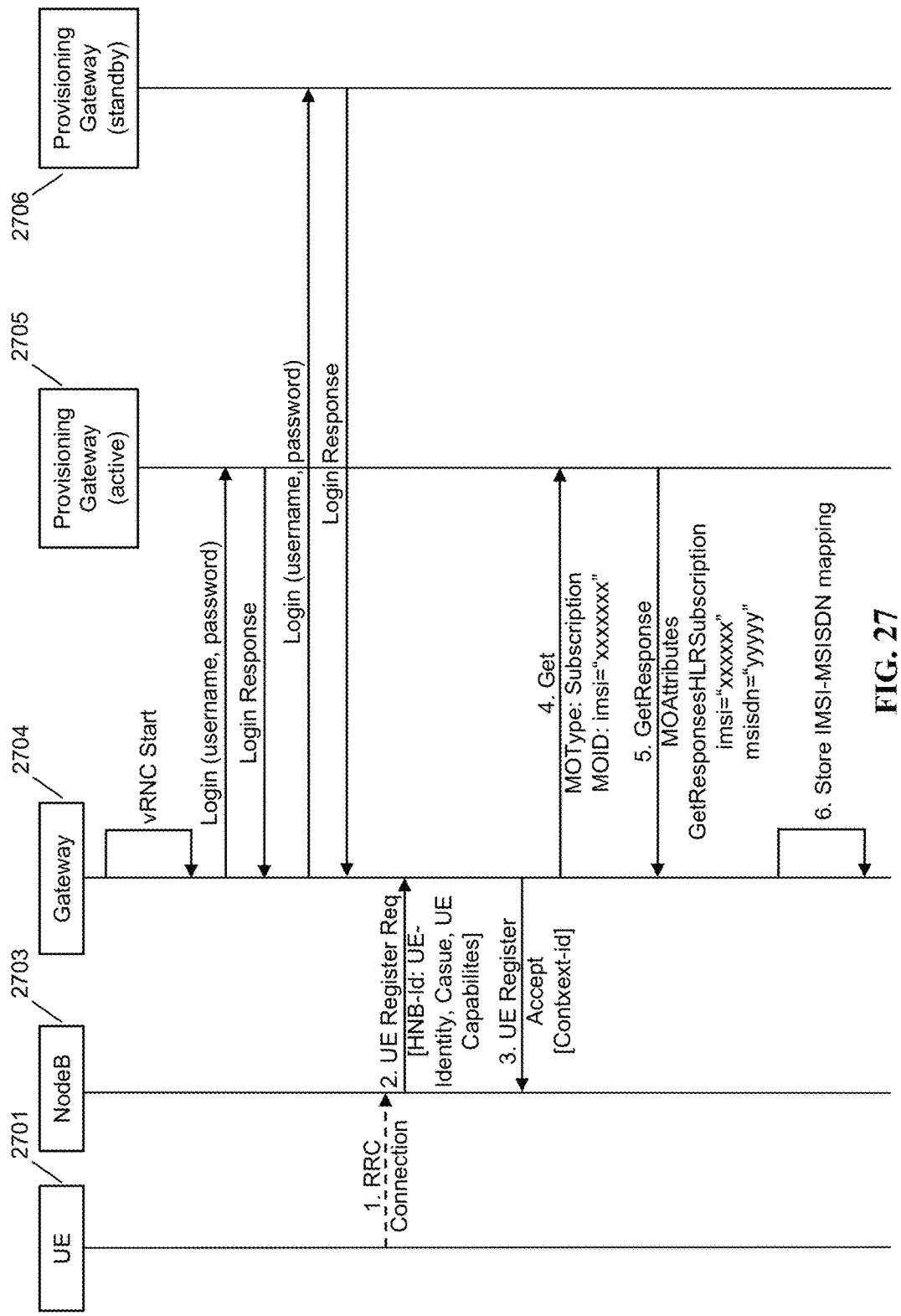
FIG. 27 is call flow ladder diagram for RTP localization, in accordance with some embodiments.

FIG. 27 shows a coordinating server to a provisioning gateway interface creation and the message flow ladder diagram when a RTP localization functionality is enabled for a base station, in accordance with some embodiments.

In some embodiments, as shown in FIG. 27, a coordinating server 2704 that could be a coordinating server of the cluster of coordinating servers initiates a connection to an active PGW 2705 by sending a login request and authenticating with a username and a password. If there is no response from the active provision gateway 2705, the coordinating server 2704 attempts to establish a connection to a standby provisioning gateway 2706. In some aspects of the disclosed subject matter, each coordinating server in the cluster of coordinating servers has its separate interface to the active or standby provisioning gateway or both. In some aspects of the disclosed subject matter, only one of the coordinating server of the cluster of coordinating server has interface to the active or standby provisioning gateway or both.

In some embodiments, as shown in FIG. 27, when a UE 2701 is attached to a base station 2703, the base station 2703 sends a UE Registration Request to a coordinating server 2704. The UE Registration Request contains IMSI information for the UE 2701. The coordinating server 2704 sends a web-service request to a provisioning gateway 2705 to get MSISDN information for the UE 2701. The web-service response from the provisioning gateway 2705 contains a MSISDN and other relevant information for the UE 2701. The coordinating server 2704 creates an association of the IMSI and the MSISDN and stores in a memory or a database. Though, the disclosure describes a web-service request to query the provisioning gateway 2705 from the coordinating server 2704, a person skilled in the art may recognize and use other methods known in the field to query and receive a response. The web-service request may be using SOAP or REST web services to retrieve MSISDN information based on IMSI or IMSI based on MSISDN.

In some embodiments, the coordinating server 2704 queries the provisioning gateway 2703 only for a base station which has RTP localization enabled and thereby reducing the load on the network.

In some embodiments, the coordinating server queries HLR over mobile application part (MAP) interface to create IMSI-MSISDN mapping.

In some embodiments, when a UE is deregistered, an entry in a cache or a database may not be removed immediately.

Figure 28:
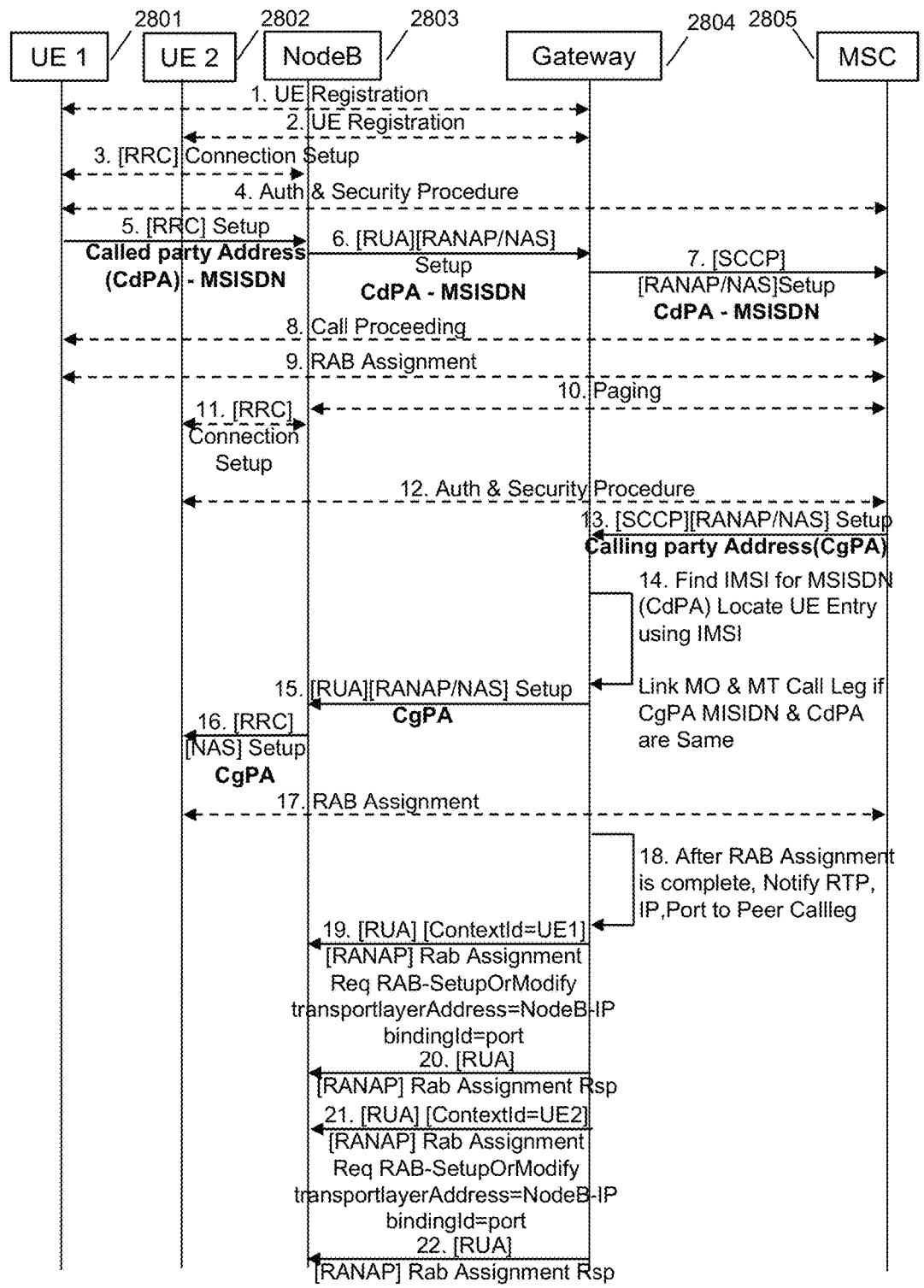
FIG. 28 is a call flow diagram when RTP localization is enabled using an IMSI and a MSISDN mapping, in accordance with some embodiments.

FIG. 28 illustrates a call flow diagram when RTP localization is enabled using an IMSI and a MSISDN mapping, in accordance with some embodiments.

In some embodiments, A UE1 2801 and a UE2 2802 are camped on a base station 2803 following a UE Registration procedure. The base station 2803 is managed by a coordinating server 2804 and a MSC 2805 is in a mobile operator's core network. When the UE1 2801 initiates a voice call, the UE1 2801 sends RRC Setup message carrying Called Party Address (CdPA) MSISDN to the base station 2803. The base station 2803 forwards the message to the coordinating server 2804 as a RANAP/NAS Setup message and includes CdPA MSISDN. The coordinating server 2804 creates an originating MO call leg and forwards the received NAS Setup message to the MSC 2805. The MSC 2805 locates where the CdPA MSISDN subscriber is currently located through paging operation and sends NAS Setup message to the coordinating server 2804 because the CdPA MSISDN is latched at the base station 2803 managed by the coordinating server 2804. The coordinating server 2804 does a lookup for IMSI for the CdPA MSISDN and finds the record. The coordinating server 2804 also does a comparison of a Calling Party Address (CgPA) MSISDN in the received NAS Setup message from the MSC 2805 and Mobile Originated (MO) MSISDN from the originating leg. If the CgPA MSISDN and MO MSISDN are same, the coordinating server 2804 links the MO and MT call legs and instructs the base station 2803 to perform RTP localization as described before, if the IMSI based on CgPA MSISDN indicates that the UE1 2801 and the UE2 2802 are at the same base station 2803.

In some embodiments, a call correlation-id can be exchanged across originating and terminating legs using dynamic RTP payload type instead of a User-User IE in the RANAP Initial UE message from the coordinating server 2104 to the MSC 2105 in the core network in accordance with some embodiments. For example, dynamic RTP payload type 121 can be used as shown below Real-Time Transport Protocol
   10.. ....=Version: RFC 1889 Version (2)
   ..0. ....=Padding: False
   ...0....=Extension: False
   ....0000=Contributing source identifiers count: 0
   0... ....=Marker: False
   Payload type: DynamicRTP-Type-121 (121)
   Sequence number: 25330
   Timestamp: 0
   Synchronization Source identifier: 0x00000000 (0)

In some embodiments, RTP Payload type 96 through 127 can be used for dynamic payload types. One payload type (assume payload type 121) can be used by the coordinating server 2104 to exchange the call correlation-id information after the call is connected. For use of dynamic payload types for associating the originating and terminating leg of the call, a media gateway in a mobile operator's core network may be required to transparently pass a RTP payload to the coordinating server 2104. The RTP payload may include IP Address for the UE1 2101 as received from the base station 2103 to pass the call correlation across the originating and the terminating legs. The IP Address for the UE1 2101 is only used here as an example and the coordinating server can use any information as a cookie for associating the originating and the terminating call legs. After the correlation of the originating and terminating legs, if the coordinating server 2104 determines that the originating and the terminating UEs are latched to the same base station, RAB modification process may be initiated at the base station. The coordinating server 2104 sends a transport network layer (TNL) Update request to the base station 2103 to update RAB transport parameters for UE1 2101 with the base station IP Address and Port for the UE2 2102 and TNL Update request to the base station 2103 to update RAB transport parameters for the UE2 2102 with the base station IP Address and Port for the UE1 2101. Upon successful RAB modification process, RTP packets between the UE1 2101 and the UE2 2102 are switched locally at the base station 2103. The coordinating server 2104 transmits comfort noise to the MSC 2105 in the core network and thus helps saving backhaul bandwidth and getting Iu connections released.

In accordance with some embodiments, the call correlation-id between the originating and terminating leg can be exchanged using CSRC list in the RTP header. CSRC list identifies the contributing sources for the payload contained in the packet and SSRC identifies all sources that were mixed together create a packet and allows the correct source indication at the receiver. After the call is connected, the coordinating server 2104 will add CSRC in the RTP packet to the core network. When the coordinating server 2104 receives the RTP packet back from the core network for the terminating leg, based on the CSRC value, the coordinating server 2104 determines that a originating and a terminating base station for this voice call is same and RTP streams needs to be switched locally. The coordinating server 2104 therefore initiates RAB Modification procedure as described above.

In some embodiments, the coordinating server 304 may transmit comfort noise towards the core network using a different SSRC. It is also required that MSC supports User-User IE in the CC Setup message in the terminating leg towards the coordinating server. In addition, the base station 2103 may also support jitter buffer management. If RTP frames with multiple SSRC is presented to the base station 2103, it will be able to play the RTP stream. While RAB modification is initiated by the coordinating server for switching RTP streams locally at the base station, there may be a loss of initial RTP payload packets.

Figure 29:
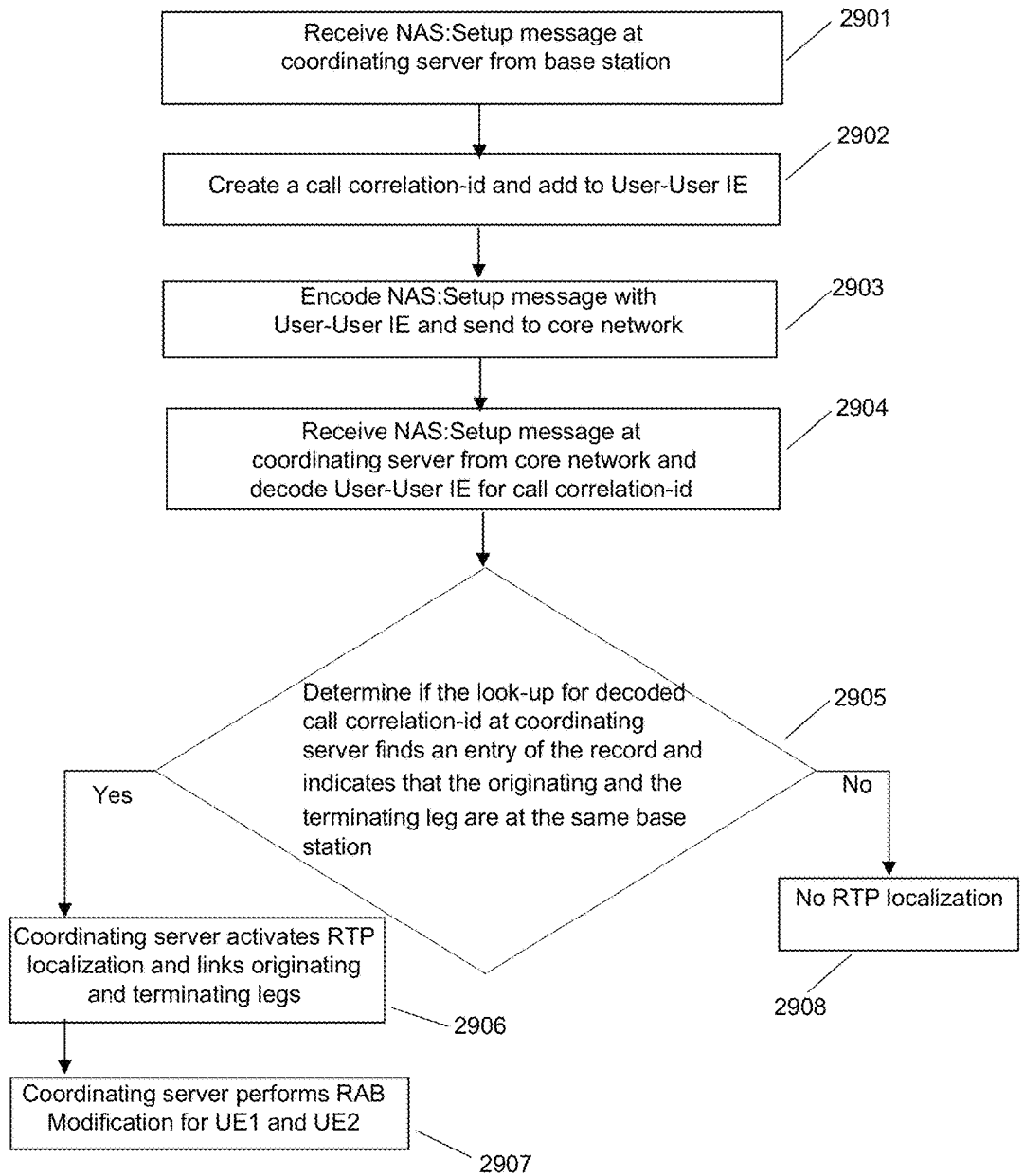
FIG. 29 is a flowchart of RTP localization activation procedure, in accordance with some embodiments.

FIG. 29 is a flowchart of RTP localization activation procedure, in accordance with some embodiments. User Equipments UE1 and UE2 are camped on to the base station referenced in the flowchart of FIG. 29. The base station is further managed by a coordinating server that appears as a radio network controller to the base station. The base station may also be referenced by other names such as a NodeB, a small cell, a femto cell or etc. At step 2901, when the UE1 initiates a voice call to the UE2, the coordinating server receives NAS Setup message from the base station. At step 2902, the coordinating server processes the received NAS Setup message and creates a call correlation-id. The call correlation-id is a unique identifier that helps to identify and link a mobile originated leg with a mobile terminated leg as the call correlation-id is passed from the mobile originated leg to the mobile terminated leg through the core network. The call correlation-id can be generated based on various information that may help identify the base station where the call was originated. The information, therefore, available to build call correlation-id may be a IP address of the base station, radio access network (RAN) identifier of the base station. The call correlation-id may be generated based on calling party MSISDN, calling party IMSI, time stamp of the call origination etc. The call correlation-id is stored for a limited time in a cache or database. At step 2903, the coordinating server encodes NAS Setup message to send to the core network with the call correlation-id set in a User-User IE field and sends the NAS Setup message to a MSC in the core network. At step 2904, as the coordinating receives NAS Setup message for a called mobile subscriber camped on to the base station identified at step 2901, the coordinating server decodes the received NAS Setup Message's User-User IE to get a call correlation-id value. At step 2905, the coordinating server performs a search for the decoded call correlation-id to find a record of an entry so that the coordinating server may determine whether the mobile originating and mobile terminating legs are processed at the same coordinating server. Upon finding a valid record and determining that the mobile originating and the mobile terminating legs are at the same coordinating server, further inquiry is made to find if the base station is same where a calling mobile subscriber, the UE1, and a called mobile subscriber, the UE2, are camped on. The call correlation-id identifies the base station where the calling mobile subscriber is camped on and a paging operation to set up a mobile terminated leg identifies the base station where the called mobile subscriber is camped on. Therefore, based on the call correlation-id, the coordinating server can successfully decide to activate RTP localization if the UE1 and the UE2 are at the same base station or to continue its normal call setup procedure without RTP localization, as shown at step 2908. At step 2906, if the coordinating server determined to activate RTP localization, it links originating and terminating legs i.e. identifies that the call legs are in RTP localized call, for a subsequent action later as discussed further in this disclosure. At step 2907, the coordinating server initiates RAB modification procedure for the UE1 and the UE2. The coordinating servers sends RAB assignment request messages for the UE1 and the UE2 to the base station and include transport network layer parameters as the IP address of the base station. The RAB assignment request sent to the base station for the UE1 includes port number of the UE2's RTP connection at the base station; the RAB assignment request sent to the base station for the UE2 includes port number of the UE1's RTP connection at the base station. The coordinating server may send comfort noise packets to the core network to avoid release of the Iu connection.

At step 2905, the coordinating server may consider additional criteria to activate RTP localization. The additional criteria may be based on various factors. The factors affecting RTP stream's route selection and RTP localization for example are cost associated with routing the RTP traffic over the backhaul system, QoS over the selected route, contracts among various operators for billing and usage of their network resources, time of the day etc. Whether the coordinating server enables RTP localization at the base station may also depends upon transcoding requirement based on the negotiated RTP codecs. If transcoding needed, the coordinating server may enable RTP localization either at the base station or at the coordinating server. The coordinating server may act as a media gateway controller and provide transcoding service using media gateways. The coordinating server may also act as a media gateway and provide transcoding. The coordinating server, due to its unique position in the network, positioned between the radio access network and the core network, may enable RTP localization based on models generated considering network topology, types of traffic, traffic load from various base stations managed by the coordinating server, network outages, availability of backhaul for internet breakout, session encryption requirements etc. The models may be generated based on each factor computed alone or in any combination of the factors. For RTP localization among base stations with different RAT in a base station group, the coordinating server may perform localization of RTP at the coordinating server instead of the base station.

Figure 30:
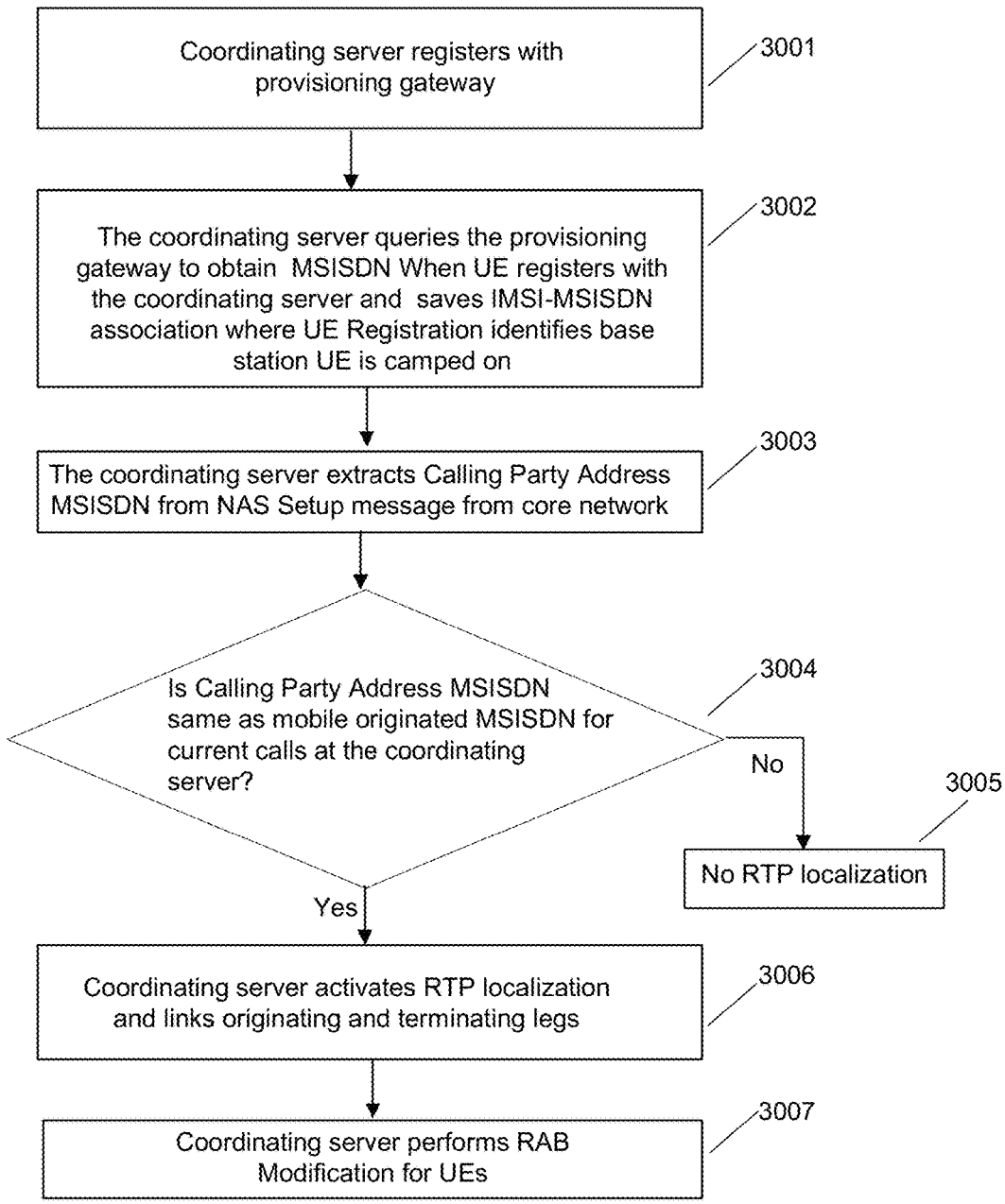
FIG. 30 is a flowchart of RTP localization activation procedure, in accordance with some embodiments.

FIG. 30 is a flowchart of RTP localization activation procedure, in accordance with some embodiments. At step 3001, a coordinating server registers with a provisioning gateway by authenticating itself with a user and password to create an interface to the provisioning gateway. The provisioning gateway is in communication to a home location register (HLR) of a mobile operators' core networks. The provisioning gateway receives information about mobile subscribers' IMSI and MSISDN from the HLR. Mobile subscriber may also be referred by other names such as a user equipment (UE), mobile device etc. At step 3002, the coordinating server receives a registration request from a mobile subscriber as the mobile subscriber camps on a base station managed by the coordinating server. Upon successful registration of the mobile subscriber at the coordinating server, the coordinating server queries the provisioning gateway to receive the registered mobile subscriber's MSISDN information to associate with the IMSI of the mobile subscriber received in the registration request. The query from the coordinating server to the provision gateway may be a web-service request using Simple Object Access Protocol (SOAP) or Representational State Transfer (REST). The coordinating server may query the provision gateway over Mobile Application Part (MAP) interface as well to receive the registered mobile subscriber's MSISDN information to associate with the IMSI of the mobile subscriber received in the registration request. Upon receiving response from the provisioning gateway, the coordinating server creates an association between IMSI and MSISDN for the mobile subscriber. The coordinating server may store the association in RAM, in database, or may implement using any well-known methods such as list, hash-table, map etc. IMSI may also identify the base station where the mobile subscriber is currently latched. At step 3003, when the coordinating server receives a NAS Setup message from the core network, it extracts calling party address (CgPA) MSISDN from the NAS Setup message. At step 3004, it performs search for the (CgPA) MSISDN in a list of CgPA MSISDN for the mobile originating legs at the coordinating server. At step 3005, if no entry found in the list of CgPA MSISDN for the mobile originated legs at the coordinating server having the CgPA MSISDN as received in the NAS Setup message from the core network, the coordinating server decides that RTP localization feature cannot be activated and continues processing normally as per the standards. At Step 3006, the coordinating server further verifies by finding IMSI based on the calling mobile subscriber's and called mobile subscriber's MSISDN to determine if the calling and called mobile subscribers are camped on the same base station. If the calling and called mobile subscriber are camped on the same base station, the coordinating server activates RTP localization and links the mobile terminated leg with the mobile originating leg for subsequent operation as discussed below in this disclosure. At step 3007, the coordinating server performs RAB modification for the calling and called mobile subscribers at the base station. The coordinating servers sends RAB assignment request messages for the calling and the called mobile subscribers to the base station and include transport network layer parameters as the ip address of the base station. The RAB assignment request sent to the base station for the calling mobile subscriber includes port number of the called mobile subscriber's RTP connection at the base station; the RAB assignment request sent to the base station for the called mobile subscriber includes port number of the calling mobile subscriber's RTP connection at the base station. The coordinating server may send comfort noise packets to the core network to avoid release of the Iu connection.

Figure 31:
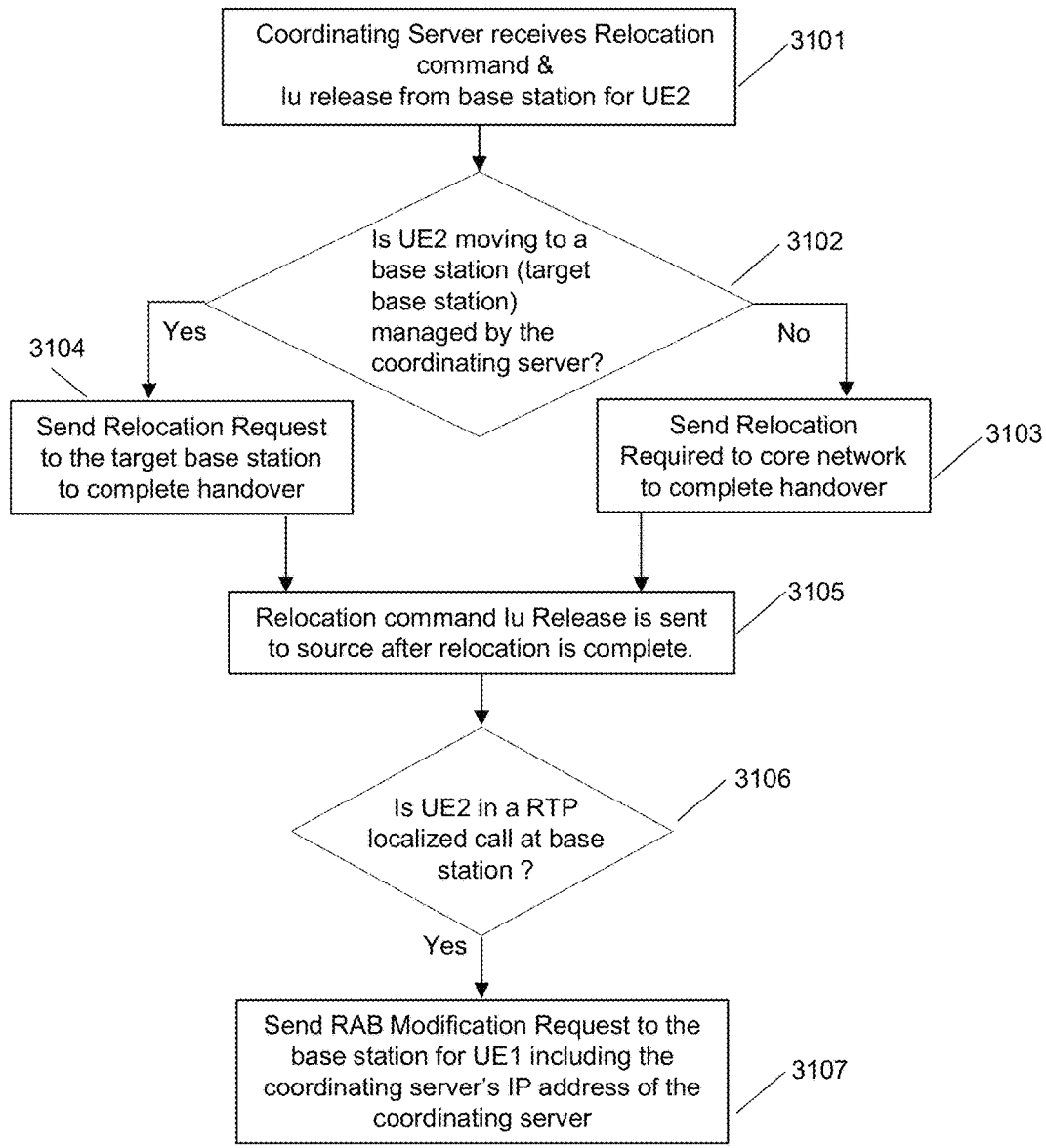
FIG. 31 is a flowchart of RTP localization deactivation procedure, in accordance with some embodiments.

FIG. 31 is a flowchart of RTP localization deactivation procedure, in accordance with some embodiments. At step 3101, a coordinating server receives Relocation command and Iu release from a base station where a UE1 and UE2 are in a RTP localized call. At Step 3102, the coordinating server determines if a target base station where the UE2 is moving is managed by the coordinating server. If no, at step 3103, the coordinating server sends Relocation Required to core network to complete handover, else the coordinating server sends Relocation Request to the target base station to complete handover at Step 3104. At step 3105, the coordinating server sends Relocation Command to the base station and also sends Iu Release upon completion of handover. At step 3106, the coordinating server checks whether the UE2 was in a RTP localized call, and if yes, at step 3107, the coordinating server sends RAB medication request to the base station for UE1. RAB modification Request to the base station for UE1 follows RAB modification for the originating leg as described above and includes the coordinating server's IP address and port in RAB Modify list.

Alternatives

In the present disclosure, the words "NodeB" or "eNodeB" are used to refer to a cellular base station or a base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), as well as any equivalents.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes including 2G/3G/4G/Wi-Fi/LTE, indoor cells, outdoor cells, etc.

Once the coordinating server enabled RTP localization based on the multi-factor analysis, the coordinating server may be in communication with the policy server or policy engine and receives rules for enabling RTP localization functionality. The coordinating server, may still instruct the base station to perform the billing operation and send billing record and other relevant analytics data such as QoS, call completion success rate, interference etc. for radio network management by the core network.

Various alternative embodiments are also contemplated by the inventors. For example, certain functions may be performed at a multi-radio access technology node (multi-RAT) node, instead of at a base station management gateway. The base station management gateway may substantially take the form of the described Parallel Wireless coordinating server. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the base station management gateway, within a function performing radio resource allocation and coding selection, or at another location. In some embodiments, a base station management gateway may identify and initiate power adjustments to improve channel quality.

In some embodiments, the mesh network nodes may provide complete or partial guesses at what paths are the optimal or best paths during a particular time interval, and may be enabled to send messages back to the base station management gateway to communicate these complete or partial guesses.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
    at a coordinating server situated as a gateway between a first base station and a core network,
        receiving an originating leg setup message for an originating leg bearer from the first base station for a first user equipment (UE) attached to the first base station, the first UE registered with the coordinating server, sent when the first UE initiates a voice call to a second UE, the second UE also registered with the coordinating server;
        creating a first call correlation identifier based on a called party MSISDN and storing the first call correlation identifier in association with the first UE;
        creating, at the coordinating server, an association between an International Mobile Subscriber Identity (IMSI) of the second UE and a Mobile Station International Subscriber Directory Number (MSISDN) of the second UE;
        extracting a second call correlation identifier from a terminating leg setup message containing the IMSI of the second UE for a terminating leg bearer received from the core network by retrieving the MSISDN of the second UE based on the association of the IMSI of the second UE and the MSISDN of the second UE at the coordinating server;
        determining a real time protocol (RTP) localization status for the originating leg bearer and the terminating leg bearer based on performing a comparison between the second call correlation identifier of the terminating leg and the stored first call correlation identifier of the originating leg; and
        sending transport layer assignment messages to the first base station to redirect RTP packets from the first UE to the second UE via the terminating leg bearer without the RTP packets transiting the core network, thereby localizing the RTP packets.

2. The method of claim 1, further comprising encoding the first call correlation identifier into the originating leg setup message.

3. The method of claim 1, wherein the setup message is a non-access stratum (NAS) setup message, the first base station is a NodeB, the bearer modification message is a Universal Mobile Telecommunications Service (UMTS) radio access bearer (RAB) modification message.

4. The method of claim 1, wherein the first call correlation identifier is encoded in a User-User information element (IE) in the originating leg setup message, and further comprising forwarding, by the core network, the originating leg setup message as the terminating leg setup message.

5. The method of claim 1, wherein the transport layer assignment messages to the first base station include an Internet Protocol (IP) address of a serving base station for the second UE, and further comprising sending transport layer assignment messages to the serving base station for the second UE to redirect second RTP packets from the second UE to the first UE via the originating leg bearer without the second RTP packets transiting the core network.

6. The method of claim 1, further comprising performing radio access bearer (RAB) modification based on the determination of the RTP localization status by sending RAB assignment requests to the base station for the first UE, and wherein the transport layer assignment messages are RAB modification messages.

7. The method of claim 1, wherein the second UE is also attached to the first base station, and further comprising performing radio access bearer (RAB) modification based on the determination of the RTP localization status by sending RAB assignment requests to the base station for the first UE and the second UE.

8. The method of claim 1, wherein the second UE is also attached to the first base station and the RTP packets are redirected internally within the first base station.

9. The method of claim 1, wherein the first base station and the second base station are a single base station using a single radio access technology.

10. The method of claim 1, further comprising redirecting the RTP packets as an RTP stream routed from the first base station to a second base station via a mesh network.

11. The method of claim 1, further comprising sending comfort noise RTP packets to the core network from the coordinating server based on the determination of the RTP localization status.

12. The method of claim 1, wherein the first call correlation identifier is generated based on an equipment identifier of, or an Internet Protocol (IP) address of, a caller and a called party.

13. The method of claim 1, wherein the first call correlation identifier is generated based on a radio area network (RAN) identifier of the base station.

14. The method of claim 1, further comprising receiving a Relocation Required message from the first base station for the first UE in a RTP localized call between the first UE and the second UE, caused by the first UE being handed over to a second base station.

15. The method of claim 1, further comprising providing an inter-RAT handover of the first UE to one of a Wi-Fi radio access technology (RAT), a Long Term Evolution RAT using Voice over LTE (VoLTE), or a 2G RAT, and providing transcoding of the RTP packets to enable the inter-RAT handover.

16. The method of claim 1, further comprising requesting an International Mobile Subscriber Identity (IMSI) of the first UE and a Mobile Station International Subscriber Directory Number (MSISDN) of the first UE from a provisioning server using a HyperText Transfer Protocol web services protocol.

17. The method of claim 1, further comprising providing billing and policy enforcement of the RTP packets without the RTP packets transiting the core network.

18. The method of claim 1, further comprising providing lawful intercept of the RTP packets by copying the RTP packets and sending the copied RTP packets to the core network asynchronously.

19. The method of claim 1, further comprising providing lawful intercept of the RTP packets by sending compressed RTP packets to the core network.

20. A non-transitory computer-readable medium, which, when executed on a processor, causes the processor to perform steps at a coordinating server situated as a gateway between a first base station and a core network, comprising:

receiving an originating leg setup message for an originating leg bearer from the first base station for a first user equipment (UE) attached to the first base station, the first UE registered with the coordinating server, sent when the first UE initiates a voice call to a second UE, the second UE also registered with the coordinating server;

creating a first call correlation identifier based on a called party MSISDN and storing the first call correlation identifier in association with the first UE;

creating, at the coordinating server, an association between an International Mobile Subscriber Identity (IMSI) of the second UE and a Mobile Station International Subscriber Directory Number (MSISDN) of the second UE;

extracting a second call correlation identifier from a terminating leg setup message containing the IMSI of the second UE for a terminating leg bearer received from the core network by retrieving the MSISDN of the second UE based on the association of the IMSI and MSISDN of the second UE at the coordinating server;

determining a real time protocol (RTP) localization status for the originating leg bearer and the terminating leg bearer based on performing a comparison between the second call correlation identifier of the terminating leg and the stored first call correlation identifier of the originating leg; and sending transport layer assignment messages to the first base station to redirect RTP packets from the first UE to the second UE via the terminating leg bearer without the RTP packets transiting the core network, thereby localizing the RTP packets.

* * * * *